US009235891B2

(12) United States Patent
Madabhushi et al.

(10) Patent No.: US 9,235,891 B2
(45) Date of Patent: Jan. 12, 2016

(54) BOOSTED CONSENSUS CLASSIFIER FOR LARGE IMAGES USING FIELDS OF VIEW OF VARIOUS SIZES

(75) Inventors: Anant Madabhushi, South Plainfield, NJ (US); Ajay Basavanhally, Skillman, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 337 days.

(21) Appl. No.: 13/978,927

(22) PCT Filed: Jan. 10, 2012

(86) PCT No.: PCT/US2012/020821
§ 371 (c)(1),
(2), (4) Date: Nov. 19, 2013

(87) PCT Pub. No.: WO2012/096992
PCT Pub. Date: Jul. 19, 2012

(65) Prior Publication Data
US 2014/0064581 A1    Mar. 6, 2014

Related U.S. Application Data

(60) Provisional application No. 61/431,286, filed on Jan. 10, 2011, provisional application No. 61/435,607, filed on Jan. 24, 2011.

(51) Int. Cl.
*G06K 9/00* (2006.01)
*G06T 7/00* (2006.01)
*G06K 9/62* (2006.01)

(52) U.S. Cl.
CPC ............ *G06T 7/0012* (2013.01); *G06K 9/6256* (2013.01); *G06T 7/0083* (2013.01);
(Continued)

(58) Field of Classification Search
CPC .............. G06T 7/0012–7/0016; G06T 7/0083; G06T 7/0089; G06K 9/6256
See application file for complete search history.

(56) References Cited

U.S. PATENT DOCUMENTS 6,165,734 A    12/2000  Garini et al.
2003/0174873 A1*  9/2003  Giger .................. G06K 9/3233
                                                382/128
(Continued)

FOREIGN PATENT DOCUMENTS

WO    2010/027476 A1    3/2010
WO    2010/088672       8/2010
(Continued)

OTHER PUBLICATIONS

A.N. Basavanhally et al. "Computerized Image-Based Detection and Grading of Lymphocytic Infiltration in HER2+ Breast Cancer Histopathology", IEEE, Mar. 2010, vol. 57, No. 3, pp. 642-653.*
(Continued)

*Primary Examiner* — Vu Le
*Assistant Examiner* — Samah Beg
(74) *Attorney, Agent, or Firm* — Fox Rothschild LLP

(57) ABSTRACT

A system and method for predicting disease outcome by analyzing a large, heterogeneous image by a boosted, multi-field-of-view (FOV) framework, based on image-based features from multi-parametric heterogeneous images, comprises (a) inputting the heterogeneous image; (b) generating a plurality of FOVs at a plurality of fixed FOV sizes, the method for generating the plurality of FOVs at a plurality of fixed FOV sizes comprising dividing simultaneously, via the computing device, the large, heterogeneous image into (i) a plurality of FOVs at a first fixed FOV size from among the plurality of fixed FOV sizes; and (ii) a plurality of FOVs at a second fixed FOV size from among the plurality of fixed FOV sizes; (c) producing simultaneously for the heterogeneous image a combined class decision for: (i) the plurality of FOVs at the first fixed FOV size, and (ii) the plurality of FOVs at the second fixed FOV size.

31 Claims, 8 Drawing Sheets

(52) U.S. Cl.
CPC .......... *G06T 7/0089* (2013.01); *G06K 2209/05* (2013.01); *G06T 2207/20072* (2013.01); *G06T 2207/30024* (2013.01); *G06T 2207/30068* (2013.01)

(56) References Cited

U.S. PATENT DOCUMENTS

| | | | |
|---|---|---|---|
| 2008/0069445 A1 | 3/2008 | Weber | |
| 2008/0082468 A1 | 4/2008 | Long et al. | |
| 2008/0118124 A1* | 5/2008 | Madabhushi | G06K 9/469 382/128 |
| 2008/0292194 A1 | 11/2008 | Schmidt et al. | |
| 2010/0098306 A1* | 4/2010 | Madabhushi | G06K 9/0014 382/128 |
| 2010/0111396 A1 | 5/2010 | Boucheron | |
| 2010/0169024 A1* | 7/2010 | Madabhushi | G06T 7/0012 702/19 |
| 2010/0266179 A1* | 10/2010 | Ramsay | G06T 7/0012 382/131 |
| 2010/0329529 A1* | 12/2010 | Feldman | G06K 9/6252 382/131 |
| 2011/0255741 A1* | 10/2011 | Jung | G06K 9/00805 382/103 |
| 2011/0289043 A1 | 11/2011 | Suresh et al. | |
| 2012/0106821 A1* | 5/2012 | Madabhushi | G06T 7/0012 382/133 |
| 2014/0037172 A1* | 2/2014 | Madabhushi | G06K 9/6232 382/131 |
| 2014/0064581 A1 | 3/2014 | Madabhushi et al. | |
| 2014/0180977 A1* | 6/2014 | Cosatto | G06N 99/005 706/12 |
| 2014/0200433 A1* | 7/2014 | Choi | A61B 5/4887 600/407 |
| 2014/0314286 A1* | 10/2014 | Madabhushi | G06T 7/0012 382/128 |

FOREIGN PATENT DOCUMENTS

| | | |
|---|---|---|
| WO | 2011/005570 | 1/2011 |
| WO | 2011/044513 | 4/2011 |

OTHER PUBLICATIONS

A. Basavanhally et al. "Computer-Aided Prognosis of ER+ Breast Cancer Histopathology and Correlating Survival Outcomewith Oncotype DX Assay", IEEE, ISBI 2009, pp. 851-854.*
A. Basavanhally et al. "A Boosted Classifier for Integrating Multiple Fields of View: Breast Cancer Grading in Histopathology", IEEE, ISBI 2011, pp. 125-128.*
S. Doyle and A. Madabhushi. "Consensus of Ambiguity: Theory and Application of Active Learning for Biomedical Image Analysis", PRIB 2010, pp. 313-324.*
J. Kong et al. "Computer-Aided Grading of Neuroblastic Differentiation: Multi-Resolution and Multi-Classifier Approach", IEEE, ICIP 2007, pp. 525-528.*
S. Petushi et al., "Large-scale computations on histology images reveal grade-differentiating parameters for breast cancer", BMC Medical Imaging 2006, vol. 6:14, pp. 1-11.*
Intenational Search Report for PCT/US2012/060002, dated Jan. 24, 2013.
Basavanhally et al., "A boosted classifier for integrating multiple fields of view: Breast cancer grading in histopathology," Biomedical Imaging: From Nano to Macro, 2011 IEEE International Symposium, (2011), pp. 125-127 (Abstract only).
Bloom et al, "Histological grading and prognosis in breast cancer; a study of 1409 cases of which 359 have been followed for 15 years." Br. J. Cancer, (Sep. 1957) vol. 11, Issue 3, pp. 359-377.
Breiman, L., "Random forests," Machine Learning, (2001) vol. 45, pp. 5-32 (Abstract only).
Doyle et al., "Automated grading of prostate cancer using architectural and textural image features," In Proc. 4th IEEE Int. Symp. Biomedical Imaging: From Nano to Macro ISBI 2007, pp. 1284-1287 (Abstract only).
Doyle et al., "Detecting prostatic adenocarcinoma from digitized histology using a multi-scale hierarchial classification approach," IEEE EMBS, (2006) vol. 1, pp. 4759-4762 (Abstract only).
Duda et al., "Pattern Classification," John Wiley & Sons (2001) (Book description only).
Erovic et al., "Quantitation of micro vessel density in squamous cell carcinoma of the head and neck by computer-aided image analysis," Wien Klin Wochenschr, (Jan. 2005) vol. 117, Issue 1-2, pp. 53-57 (Abstract only).
Madabhushi, "Quanititative Integration of Radiology, Pathology and Omics Data: Methods and Use Cases," Laboratory for Computational Imagin & Bioinformatics, (2011).
Nassif et al., "Immunohistochemistry expression of tumor markers CD34 and P27 as a prognostic factor of clinically localized prostate adenocarcinoma after radical prostatectomy.", Rev. Col. Bras. Cir., (Oct. 2010) vol. 37, Issue 5, pp. 338-344.
Paik et al., "A Multigene Assay to Predict Recurrence of Tamoxifen-Treated, Node-Negative Breast Cancer." N. Engl. J. Med., (Dec. 2004) vol. 351, Issue 27, pp. 2817-2826.
Ruifrok et al., "Quantification of histochemical staining by color deconvolution," Anal. Quant. Cytol. Histol., (Aug. 2001) vol. 23, Issue 4, pp. 291-299 (Abstract only).
Sertel et al., "Computer-aided Prognosis of Neuroblastoma on Whole-slide Images: Classification of Stromal Development," Pattern Recognit., (Jun. 2000) vol. 42, Issue 6, pp. 1093-1103.
Sudbø et al., "Prognostic Value of Graph Theory-Based Tissue Architecture Analysis in Carcinomas of the Tongue.", Lab. Invest., (Dec. 2000) vol. 80, Issue 12, pp. 1881-1889.
Torres L. et al., "Intratumor genomic heterogeneity in breast cancer with clonal divergence between primary carcinomas and lymph node metastases", Breast Cancer Res. Treat., (Apr. 2007) vol. 102, Issue 2, pp. 143-155 (Abstract only).
Weidner et al., "Tumor angiogenesis and metastasis-correlation in invasive breast carcinoma.", N. Engl. J. Med., (Jan. 1991) vol. 324, Issue 1, pp. 1-8.
Weigelt et al., "Molecular profiling currently offers no more than tumor morphology and basic immunohistochemistry." Br. Can. Res., (2010) vol. 12(Suppl 4):S5.

* cited by examiner (a)

(b)

BOOSTED CONSENSUS CLASSIFIER FOR LARGE IMAGES USING FIELDS OF VIEW OF VARIOUS SIZES

CROSS-REFERENCE TO RELATED APPLICATIONS

This application is the U.S. National Phase of International Patent Application Serial No. PCT/US2012/020821, filed Jan. 10, 2012, which claims priority to U.S. provisional application No. 61/431,286, filed on Jan. 10, 2011, titled "Boosted Consensus Classifier for Large Images using Fields of View of Various Sizes", and U.S. provisional No. 61/435,607, filed on Jan. 24, 2011, titled "Boosted Consensus Classifier for Large Images using Fields of View of Various Sizes", the disclosures of which are incorporated herein by reference in their entireties.

FIELD OF THE INVENTION

The described invention relates to methods and systems of predicting classification grading, disease aggressiveness and outcome.

BACKGROUND OF THE INVENTION

Breast cancer (BCa) is an increasingly common cancer diagnosis in women. Advancements in screening, diagnostic, and therapeutic techniques in BCa have improved survival rates in recent years. (Jemal, A. et al., "Declining death rates reflect progress against cancer," *PLoS One*, vol. 5, no. 3, p. e9584, 2010. Available at dx.doi.org/10.1371/journal.pone.0009584) One of the earliest and most popular diagnostic criteria is the Bloom-Richardson (BR) grade. (Bloom, H. J. et al., "Histological grading and prognosis in breast cancer; a study of 1409 cases of which 359 have been followed for 15 years," *Br J Cancer*, September 1957, 11(3): 359-377). The BR grade is determined by a pathologist via visual analysis of hematoxylin and eosin (H & E) stained histopathology. The importance of the BR grading system for the purpose of predicting disease outcome has been widely studied. (Contesso, G. et al., "The importance of histologic grade in long-term prognosis of breast cancer: a study of 1,010 patients, uniformly treated at the institut gustaveroussy," *J Clin Oncol*, September 1987, 5(9): 1378-1386; Henson, D. E. et al., "Relationship among outcome, stage of disease, and histologic grade for 22,616 cases of breast cancer. the basis for a prognostic index," *Cancer*, November 1991, 68(10): 2142-2149; Elston, C. W. et al., "Pathological prognostic factors in breast cancer. i. the value of histological grade in breast cancer: experience from a large study with long-term follow-up," *Histopathology*, November 1991, 19(5): 403-410). Yet clinical usage of the BR grading system is often limited by concerns about intra- and inter-rater variability. Meyer et al. found that agreement between seven pathologists is only moderately reproducible (k=0.50-0.59). (Meyer, J. S. et al., "Breast carcinoma malignancy grading by bloom-richardson system vs proliferation index: reproducibility of grade and advantages of proliferation index," *Mod Pathol*, August 2005, 18(8): 1067-1078). Dalton et al. further noted the suboptimal treatment that can result from incorrect BR grading. (Dalton L. W. et al., "Histologic grading of breast cancer: linkage of patient outcome with level of pathologist agreement." *Mod Pathol*, July 2000, 13(7): 730-735). Boiesen et al. showed similar levels of reproducibility (=0.50-0.54) across a number of pathology departments. (Boiesen, P. et al., "Histologic grading in breast cancer—reproducibility between seven pathologic departments. south Sweden breast cancer group," *Acta Oncol*, 2000, 39(1): 41-45). A possible reason for such variability is that pathologists currently lack the automated image analysis tools to accurately and efficiently quantify BR grade in histopathology. There thus is a need for an inexpensive image-based computerized grading scheme for predicting disease outcome.

The BR grading system encompasses three visual signatures (degree of tubule formation, nuclear pleomorphism, and mitotic activity), each of which is scored on a scale of 1 to 3 to produce a combined BR scale ranging from 3 to 9. Computerized modeling of the phenotypic appearance of BCa histopathology has traditionally focused on the size and shape of nuclei (Wolberg, W. H. et al., "Computer-derived nuclear features distinguish malignant from benign breast cytology," *Hum Pathol*, July 1995, 26(7): 792-796; Doyle, S. et al., "Automated grading of breast cancer histopathology using spectral clustering with textural and architectural image features," in *Proc. 5th IEEE International Symposium on Biomedical Imaging: From Nano to Macro*, 2008, pp. 496-499) as well as various textural representations (Wolberg, W. H. et al., "Computer-derived nuclear features distinguish malignant from benign breast cytology," *Hum Pathol*, July 1995, 26(7): 792-796; Weyn, B. et al., "Automated breast tumor diagnosis and grading based on wavelet chromatin texture description," *Cytometry*, September 1998, 33(1): 32-40; Petushi, S. et al., "Large-scale computations on histology images reveal grade differentiating parameters for breast cancer," *BMC Med Imaging*, 2006, 6: 14; Karaali, B. et al., "Automated detection of regions of interest for tissue microarray experiments: an image texture analysis," *BMC Med Imaging*, 2007: 2; and Hall, B. H. et al., "Computerassisted assessment of the human epidermal growth factor receptor 2 immunohistochemical assay in imaged histologic sections using a membrane isolation algorithm and quantitative analysis of positive controls," *BMC Med Imaging*, 2008, 8: 11).

Nuclear architecture refers to the 2D spatial arrangement of cancer nuclei, whose variations allow clinicians to distinguish between normal and cancerous tissues. This concept is modeled by the construction of graphs, whereby individual cancer nuclei are used as vertices and statistics related to the size, shape, and length of the graphs are then extracted from each image. A method using such graph-based features to distinguish variations of lymphocytic infiltration was described by Basavanhally et al. (Basavanhally, A. N. et al., "Computerized image-based detection and grading of lymphocytic infiltration in her2+ breast cancer histopathology," *IEEE Trans Biomed Eng, March* 2010, 57(3): 642-653). Doyle et al. described a method to distinguish variations in tumor grade extracting such graph-based features (Doyle, S. et al., "Automated grading of breast cancer histopathology using spectral clustering with textural and architectural image features," in *Proc. 5th IEEE International Symposium on Biomedical Imaging: From Nano to Macro*, 2008, pp. 496-499). Basavanhally et al. described a method to use such graph based featured for prognosis using digitized BCa histopathology, and hierarchical tissue structure (Basavanhally, A. et al., "Computer aided prognosis of er+ breast cancer histopathology and correlating survival outcome with oncotype dx assay," in *Proc. IEEE Int. Symp. Biomedical Imaging: From Nano to Macro ISBI '09*, 2009, pp. 851-854). Such studies have been shown in glioma, as described by Demir et al. (Demir, C. et al., "Augmented cell-graphs for automated cancer diagnosis," Bioinformatics, September 2005, 21(Suppl 2): i7-i12) and in distinguishing tumor grade in prostate cancer, as described by Doyle et al. (Doyle, S. et al., "Automated grading of prostate cancer using architectural and textural image features," in *IEEE International Symposium on Biomedical Imaging (ISBI)*, Washington D.C., 2007, pp. 1284-87). The extraction of textural information from nuclear regions (i.e. nuclear texture) represents the variation in chromatin arrangement, as described by Weyn et al. (Weyn, B. et al., "Automated breast tumor diagnosis and grading based on wavelet chromatin texture description." *Cytometry*, September 1998 33(1): 32-40). Such variation of chromatin structure is related to different stages in the cell cycle. Here, this concept is modeled via segmentation of all nuclear regions within an image, from which Haralick texture features are calculated, as described by Haralick (Haralick, R. M. et al., "Textural features for image classification," *IEEE Transactions on Systems, Man and Cybernetics*, November 1973, 3(6): 610-621) [19]. Weyn et al. described a method using wavelet, Haralick, and densitometric features to distinguish nuclei from low, intermediate, and high BCa tissues (Weyn, B. et al., "Automated breast tumor diagnosis and grading based on wavelet chromatin texture description," *Cytometry*, September 1998, 33(1): 32-40). Doyle et al. also utilized Haralick texture features to discriminate low and high grade BCa histopathology (Doyle, S. et al., "Automated grading of breast cancer histopathology using spectral clustering with textural and architectural image features," in *Proc. 5th IEEE International Symposium on Biomedical Imaging: From Nano to Macro*, 2008, pp. 496-499).

The extraction of relevant features is important to a computerized BCa grading system; however, the selection of appropriate fields of view (FOVs) must also be considered in the analysis of large histopathology slides. This step is important due to the heterogeneous nature of BCa, whereby predictions based on isolated FOVs may not accurately reflect the level of malignancy or heterogeneity in an entire histopathology slide, as described in Connor et al. (Connor, A. J. M. et al., "Intratumoural heterogeneity of proliferation in invasive breast carcinoma evaluated with mibi antibody," The Breast, 1997, 6(4): 171-176). The heterogeneous nature of BCa histopathology is illustrated in FIG. 1. Prior work in histological image analysis has traditionally involved empirical selection of individual FOVs at a fixed size based on experimental results, as described by Doyle et al. (Doyle, S. et al., "Automated grading of breast cancer histopathology using spectral clustering with textural and architectural image features," in *Proc. 5th IEEE International Symposium on Biomedical Imaging: From Nano to Macro*, 2008, pp. 496-499), Weyn et al. (Weyn, B. et al., "Automated breast tumor diagnosis and grading based on wavelet chromatin texture description." *Cytometry*, September 1998, 33(1): 32-40), Petushi et al. (Petushi, S. et al., "Large-scale computations on histology images reveal grade differentiating parameters for breast cancer." *BMC Med Imaging*, 2006, 6: 14), Basavanhally et al. (Basavanhally, A. N. et al., "Computerized image-based detection and grading of lymphocytic infiltration in her2+ breast cancer histopathology." *IEEE Trans Biomed Eng*, March 2010, 57(3): 642-653), Basavanhally et al. (Basavanhally, A. et al., "Computer aided prognosis of er+ breast cancer histopathology and correlating survival outcome with oncotype dx assay," in *Proc. IEEE Int. Symp. Biomedical Imaging: From Nano to Macro ISBI '09*, 2009, pp. 851-854), Gurcan et al. (Gurcan, M. N. et al., "Histopathological image analysis: A review." *IEEE Rev Biomed Eng*, 2009, 2: 147-171), and (Sertel, O. et al., "Computer-aided prognosis of neuroblastoma on whole slide images: Classification of stromal development." *Pattern Recognit*, June 2009, 42(6): 1093-1103).

In image processing, multi-scale (i.e. multi-resolution) frameworks are traditionally used to interpret contextual information at different scales of an image scene. (Doyle, S. et al., "Detecting prostatic adenocarcinoma from digitized histology using a multi-scale hierarchical classification approach," *IEEE EMBS*, 2006, 1: 4759-4762). While clinicians perform this task implicitly, the a priori selection of an optimal FOV (i.e. image patch) size for computerized analysis of entire histopathology slides is not straightforward. Most multi-scale frameworks operate by exposing a single field of view (FOV) to classifiers at multiple image resolutions, for example as described in Doyle et al. (Doyle, S. et al., "A boosted bayesian multi-resolution classifier for prostate cancer detection from digitized needle biopsies," *Biomedical Engineering, IEEE Transactions* on, 2010, PP(99): 1). FIG. 2($a$) is an illustration of a multi-scale framework that is useful for quantifying large-scale image patterns. However, analyzing domain-specific image architecture is more challenging, since it remains invariant to changes in scale (although our visual perception and ability to detect objects within the image will vary). Contrary to a multi-scale framework, a multi-field of view (multi-FOV) framework uses a fixed scale (i.e. resolution) and extracts features at FOVs of different sizes. FIG. 2($b$) is an illustration of a multi-FOV scheme. A multi-FOV framework is advantageous for highly heterogeneous images, where it is not clear which FOV sizes will produce discriminatory features.

For example, in the context of a breast cancer digital slide, in an exemplary histological image from a breast cancer digital slide shown in FIG. 2($b$), while the smallest FOV (i.e. leftmost image) simply looks like necrotic tissue, the medium-sized FOV (i.e. center image) would be accurately classified as ductal carcinoma in situ (DCIS). At the other end of the spectrum, the largest FOV (i.e. rightmost image) containing both DCIS and invasive cancer would be classified ambiguously since it is too heterogeneous.

Hierarchical classifiers are commonly used in conjunction with multi-scale frameworks, such as described in Doyle et al. (Doyle, S. et al., "Detecting prostatic adenocarcinoma from digitized histology using a multi-scale hierarchical classification approach," *IEEE EMBS*, 2006, 1: 4759-4762). In hierarchical classifiers, data inputted at a zero level are analyzed for feature extraction and a zero level classifier is used to output a zero-level level prediction. The zero level prediction is then inputted to the first level for analysis, feature extraction and a first level prediction by the first level classifier. Such a sequential mode hierarchical decision making continues depending on the number of levels of the hierarchical classifier until the final level classifier outputs the class decision. FIG. 3($a$) is an illustration of a hierarchical classifier that involves three hierarchical levels of decision making, a zero level, a first level and a second level. In such a multi-scale scheme, the data $S_1$ exposed to classifier $C_1$ is dependent on the prediction $C_0$ made at the previous level. Hierarchical classifiers are able to increase computational efficiency by analyzing only relevant data. However, they are inherently serial processes that cannot leverage integration techniques (e.g. consensus) to more effectively combine predictions returned by $C_0$, $C_1$, and $C_2$.

On the other hand, parallel classifiers simultaneously expose different amounts of data to extract relevant features, and perform classification independently before finding a consensus ($\Sigma$) among the individual predictors. FIG. 3($b$) is an illustration of a parallel classifier using three parallel/simultaneous classifiers. In such a parallel classifier, different amounts of data, $S_0$, $S_1$, and $S_2$, are inputted in parallel, corresponding features, $f_0$, $f_1$, and $f_2$ are extracted simultaneously and the three parallel predictors, $C_0$, $C_1$, and $C_2$ made independent and simultaneous predictions, which are then combined to find a consensus ($\Sigma$) class decision. For instance, Breiman showed that a parallel classifier scheme known as bagging, in which many independent weak learners are aggregated, could lead to improved performance over a majority of the individual weak learners. (Breiman, L. "Bagging predictors," *Machine Learning*, 1996, 24: 123-140). Another popular classifier ensemble scheme is boosting, described in Schapire (R. E. Schapire, "The boosting approach to machine learning: An overview," in *Nonlin. Est. and Class.*, Springer 2003, pp. 1-23), which aims to improve overall performance by identifying and weighting individual weak learners that contain class discriminatory information.

In microscopy, changes in scale (i.e. magnification or resolution) are inextricably linked to changes in FOV size. Thus, pathologists naturally incorporate different scales and FOV sizes before arriving at a diagnosis based on a patient slide. Although clinicians perform this task implicitly, the a priori selection of an optimal FOV (i.e. image patch) size for computerized analysis of an entire histopathology slide is not straightforward. Sertel et al. (Sertel, O. et al., "Computer-aided prognosis of neuroblastoma on whole-slide images: Classification of stromal development," *Patt Recognit*, 2009, 42(6): 1093-1103) and Basavanhally et al. (Basavanhally, A. et al., "Computer-aided prognosis of er+ breast cancer histopathology and correlating survival outcome with oncotype dx assay," in *IEEE ISBI*, 2009, pp. 851-854) described logical image analysis methods for detection or grading that involve selecting a fixed FOV size empirically based on classification results. The application of hierarchical, multi-scale classifiers has been considerably more popular for analysis of large, high-resolution digitized histopathology images. (Doyle, S. et al., "Detecting prostatic adenocarcinoma from digitized histology using a multi-scale hierarchial classification approach," *IEEE EMBS*, 2006, 1: 4759-4762; M. Gurcan et al., "Computerized pathological image analysis for neuroblastoma prognosis," *AMIA Annu Symp Proc, pp.* 304-308, 2007). Petushi et al. (Petushi, S. et al., "Large-scale computations on histology images reveal grade-differentiating parameters for breast cancer," *BMC Med Imaging*, 2006, 6: 14) describe a parallel classifier scheme in which two specific FOV sizes are chosen to help classify breast cancer (BCa) nuclei into morphological categories; however, the choice of FOV sizes was not justified.

The present invention provides a method for analyzing a large, heterogeneous image using a parallel, boosted, multi-field of view (multi-FOV) classifier. The parallel, boosted multi-FOV classifier automatically integrates image features from multiple FOVs at various sizes to differentiate entire ER+BCa histopathology slides based on their BR grades. The multi-FOV framework of the present invention uses a fixed image scale and extracts image features at FOVs of different sizes, a highly desirable attribute in heterogeneous images where it is not clear which FOV sizes will contain class discriminatory information, by automatically extracting image features characterizing both the architecture and texture of BCa cancer nuclei, both of which reflect various aspects of the BR grading system. The present invention circumvents the need for empirically determining an optimal FOV size by calculating image features at multiple FOV sizes by embedding the problem within a boosted framework that combines the best discriminatory information across all FOV sizes

SUMMARY

According to one aspect, the described invention provides a method for analyzing a large, heterogeneous image, using a boosted multi-field-of-view (FOV) framework, comprising: (a) inputting, via a computing device, the large, heterogeneous image; (b) generating, via the computing device, a plurality of field-of-views (FOVs) at a plurality of fixed FOV sizes, the method for generating the plurality of FOVs at a plurality of fixed FOV sizes comprising dividing simultaneously, via the computing device, the large, heterogeneous image into (i) a plurality of field-of-views (FOVs) at a first fixed FOV size from among the plurality of fixed FOV sizes; and (ii) a plurality of field-of-views (FOVs) at a second fixed FOV size from among the plurality of fixed FOV sizes; (c) producing simultaneously for the large, heterogeneous image, via the computing device, a combined class decision for: (i) the plurality of FOVs at the first fixed FOV size, and (ii) the plurality of FOVs at the second fixed FOV size, by: (1) detecting simultaneously, via the computing device, (i) at least one object to yield at least one detected object from each FOV at the first fixed FOV size, and (ii), at least one object to yield at least one detected object from each FOV at the second fixed FOV size; (2) extracting simultaneously, via the computing device, (i) at least one image feature of the at least one detected object from each FOV at the first fixed FOV size, and (ii) at least one image feature of the at least one detected object from each FOV at the second fixed FOV size; (3) training simultaneously, via the computing device, a classifier from: (i) the at least one image feature from each FOV of the plurality of FOVs at the first fixed FOV size, and (ii) the at least one image feature from each FOV for the plurality of FOVs at the second fixed FOV size; (4) making simultaneously, via the computing device, using the classifier, (i) a first class prediction for each FOV of the plurality of FOVs at the first fixed FOV size based on the at least one image feature from each FOV of the plurality of FOVs at the first fixed FOV size, and (ii), a second class prediction for each FOV of the plurality of FOVs at the second fixed FOV size based on the at least one image feature from each FOV for the plurality of FOVs at the second fixed FOV size; and (5) producing simultaneously, via the computing device, (i) the combined class decision for the plurality of FOVs at the first fixed FOV size, and (ii) the combined class decision for the plurality of FOVs at the second fixed FOV size; (d) repeating simultaneously, via the computing device, for each plurality of FOVs at the plurality of fixed FOV sizes to generate a plurality of combined class decisions, detecting step (1), extracting step (2), training step (3), making step (4), and producing step (5); (e) aggregating, via the computing device, using a boosted multi-FOV classifier, the plurality of combined class decisions at each fixed FOV size of the plurality of fixed FOV sizes to yield an aggregated boosted multi-FOV decision, wherein the boosted, multi-field-of-view (multi-FOV) classifier finds optimal FOV sizes for aggregating the plurality of combined class decisions that are outputs of the ensembles at each of the plurality of fixed FOV sizes; and (f) producing, via the computing device, a consensus classification for the large, heterogeneous image, based on the aggregated multi-FOV decision. According to one embodiment, the large, heterogeneous image is a microscopic image. According to another embodiment, the large, heterogeneous image is a histopathologic image. According to another embodiment, the large, heterogeneous image is a histopathologic image of a cancer. According to another embodiment, the cancer is a breast cancer. According to another embodiment, the at least one detected object is a nucleus. According to another embodiment, the at least one detected object is a cancer nucleus. According to another embodiment, the at least one image feature describes spatial arrangement of the at least one detected object. According to another embodiment, the at least one image feature is nuclear architecture. According to another embodiment, extracting step (2) further comprises: (I) quantifying simultaneously, via the computing device, (i) the at least one image feature of the at least one detected object from each FOV at the first fixed FOV size to yield a quantifiable signature feature of the at least one detected object from each FOV at the first fixed FOV size, and (ii) the at least one image feature of the at least one detected object from each FOV at the second fixed FOV size to yield a quantifiable signature feature of the at least one detected object from each FOV at the second fixed FOV size; (II) selecting, via the computing device, at least one reference feature in a dataset comprising reference features according to a minimum Redundancy Maximum Relevance (mRMR) feature selection scheme to identify a selected subset of reference features; and (III) discriminating simultaneously, via the computing device, (i) the quantifiable signature feature from each FOV at the first fixed FOV size from the selected subset of reference features, and (ii) the quantifiable signature feature from each FOV at the second fixed FOV size from the selected subset of reference features; wherein the at least one image feature is nuclear architecture. According to another embodiment, quantifying step (I) of extracting step (2) comprises quantifying the at least one image feature using the at least one detected object as at least one vertex for the construction of a graph, wherein the graph is selected from the group consisting of a Voronoi Diagram (VD), a Delaunay Triangulation (DT) graph, a Minimum Spanning Tree (MST), a Nearest Neighbor (NN) graph, or a combination thereof. According to another embodiment, the at least one image feature is nuclear texture. According to another embodiment, extracting step (2) further comprises: (I) segmenting simultaneously, via the computing device, (i) the at least one detected object from each FOV at the first fixed FOV size to yield at least one segmented object from each FOV at the first fixed FOV size, and (ii) the at least one detected object from each FOV at the second fixed FOV size to yield at least one segmented object from each FOV at the second fixed FOV size; (II) quantifying simultaneously, via the computing device, (i) the at least one image feature of the at least one segmented object from each FOV at the first fixed FOV size to yield a quantifiable signature feature from each FOV at the first fixed FOV size, and (ii) the at least one image feature of at least one segmented object from each FOV at the second fixed FOV size to yield a quantifiable signature feature from each FOV at the second fixed FOV size; (III) selecting, via the computing device, at least one reference feature in a dataset comprising reference features according to a minimum Redundancy Maximum Relevance (mRMR) feature selection scheme to identify a selected subset of reference features; and (IV) discriminating simultaneously, via the computing device, (i) the quantifiable signature feature from each FOV at the first fixed FOV size from the selected subset of reference features, and (ii) the quantifiable signature feature from each FOV at the second fixed FOV size from the selected subset of reference features; wherein the at least one image feature is nuclear texture. According to another embodiment, segmenting step (I) of extracting step (2) comprises: (A) initializing, via the computing device, a color gradient-based geodesic active contour (CGAC) model by simultaneously (i) using the stain color channel for the at least one detected object from each FOV at the first fixed FOV size to compute initial object boundaries, and (ii) using the stain color channel for the at least one detected object from each FOV at the second fixed FOV size to compute initial object boundaries; and (B) computing simultaneously, via the computing device, (i) final object boundaries based on the initial object boundaries computed in step (A) by defining a mask surrounding the at least one detected object from each FOV at the first fixed FOV size to yield the at least one segmented object from each FOV at the first fixed FOV size, and (ii) final object boundaries based on the initial object boundaries computed in step (A) by defining a mask surrounding the at least one detected object from each FOV at the second fixed FOV size to yield the at least one segmented object from each FOV at the second fixed FOV size. According to another embodiment, the consensus classification of the large, heterogeneous image is selected from the group consisting of a low Bloom-Richardson (BR) grade, an intermediate Bloom-Richardson (BR) grade, or a high Bloom-Richardson (BR) grade.

According to another aspect, the described invention provides a system for analyzing a large, heterogeneous image, using a boosted multi-field-of-view (FOV) framework, comprising: (a) a computing device configured to input the large, heterogeneous image; (b) the computing device configured to generate a plurality of field-of-views (FOVs) at a plurality of fixed FOV sizes by dividing simultaneously the large, heterogeneous image into (i) a plurality of field-of-views (FOVs) at a first fixed FOV size from among the plurality of fixed FOV sizes; and (ii) a plurality of field-of-views (FOVs) at a second fixed FOV size from among the plurality of fixed FOV sizes; (c) the computing device configured to produce a combined class decision simultaneously for: (i) the plurality of FOVs at the first fixed FOV size, and (ii) the plurality of FOVs at the second fixed FOV size, wherein the computing device is further configured: (1) to detect simultaneously (i) at least one object to yield at least one detected object from each FOV at the first fixed FOV size, and (ii), at least one object to yield at least one detected object from each FOV at the second fixed FOV size; (2) to extract simultaneously (i) at least one image feature of the at least one detected object from each FOV at the first fixed FOV size, and (ii) at least one image feature of the at least one detected object from each FOV at the second fixed FOV size; (3) to train a classifier capable of identifying simultaneously: (i) the at least one image feature from each FOV of the plurality of FOVs at the first fixed FOV size, and (ii) the at least one image feature from each FOV for the plurality of FOVs at the second fixed FOV size; (4) to make simultaneously, using the classifier, (i) a first class prediction for each FOV of the plurality of FOVs at the first fixed FOV size based on the at least one image feature from each FOV of the plurality of FOVs at the first fixed FOV size, and (ii), a second class prediction for each FOV of the plurality of FOVs at the second fixed FOV size based on the at least one image feature from each FOV for the plurality of FOVs at the second fixed FOV size; and (5) to produce simultaneously (i) the combined class decision for the plurality of FOVs at the first fixed FOV size, and (ii) the combined class decision for the plurality of FOVs at the second fixed FOV size; (d) the computing device configured to generate a plurality of combined class decisions by repeating simultaneously, for each plurality of FOVs at the plurality of fixed FOV sizes, detecting step (1); extracting step (2), training step (3), making step (4) and producing step (5) in (c); (e) the computing device configured to aggregate the plurality of combined class decisions at each fixed FOV size of the plurality of fixed FOV sizes to yield an aggregated boosted multi-FOV decision, using a boosted multi-FOV classifier, wherein the boosted multi-FOV classifier finds optimal FOV sizes for aggregating the plurality of combined class decisions that are outputs of the ensembles at each of the plurality of fixed FOV sizes; and (f) the computing device configured to produce a consensus classification for the large heterogeneous image, based on the aggregated multi-FOV decision. According to one embodiment, the large, heterogeneous image is a microscopic image. According to another embodiment, the large, heterogeneous image is a histopathologic image. According to another embodiment, the large, heterogeneous image is a histopathologic image of a cancer. According to another embodiment, the cancer is a breast cancer. According to another embodiment, the at least one detected object is a nucleus. According to another embodiment, the at least one detected object is a cancer nucleus. According to another embodiment, the at least one image feature describes spatial arrangement of the at least one detected object. According to another embodiment, the at least one image feature is nuclear architecture. According to another embodiment, the computing device (c) configured to produce a combined class decision, further configured (2) to extract simultaneously (i) at least one image feature of the at least one detected object from each FOV at the first fixed FOV size, and (ii) at least one image feature of the at least one detected object from each FOV at the second fixed FOV size is further configured: (I) to quantify simultaneously (i) the at least one image feature of the at least one detected object from each FOV at the first fixed FOV size to yield a quantifiable signature feature of the at least one detected object from each FOV at the first fixed FOV size, and (ii) the at least one image feature of the at least one detected object from each FOV at the second fixed FOV size to yield a quantifiable signature feature of the at least one detected object from each FOV at the second fixed FOV size; (II) to select at least one reference feature in a dataset comprising reference features according to a minimum Redundancy Maximum Relevance (mRMR) feature selection scheme to identify a selected subset of reference features; and (III) to discriminate simultaneously (i) the quantifiable signature feature from each FOV at the first fixed FOV size from the selected subset of reference features, and (ii) the quantifiable signature feature from each FOV at the second fixed FOV size from the selected subset of reference features; wherein the at least one image feature is nuclear architecture. According to another embodiment, the computing device (c) configured to produce a combined class decision, further configured (2) to extract simultaneously (i) at least one image feature of the at least one detected object from each FOV at the first fixed FOV size, and (ii) at least one image feature of the at least one detected object from each FOV at the second fixed FOV size and further configured (II) to quantify simultaneously (i) the at least one image feature of the at least one segmented object from each FOV at the first fixed FOV size to yield a quantifiable signature feature from each FOV at the first fixed FOV size, and (ii) the at least one image feature of at least one segmented object from each FOV at the second fixed FOV size to yield a quantifiable signature feature from each FOV at the second fixed FOV size, is further configured to quantify the at least one image feature using the at least one detected object as at least one vertex for the construction of a graph, wherein the graph is selected from the group consisting of a Voronoi Diagram (VD), a Delaunay Triangulation (DT) graph, a Minimum Spanning Tree (MST), a Nearest Neighbor (NN) graph, or a combination thereof, wherein the at least one image feature is nuclear architecture. According to another embodiment, the at least one image feature is nuclear texture. According to another embodiment, the computing device (c) configured to produce a combined class decision, and further configured (2) to extract simultaneously (i) at least one image feature of the at least one detected object from each FOV at the first fixed FOV size, and (ii) at least one image feature of the at least one detected object from each FOV at the second fixed FOV size is further configured: (I) to segment simultaneously (i) the at least one detected object from each FOV at the first fixed FOV size to yield at least one segmented object from each FOV at the first fixed FOV size, and (ii) the at least one detected object from each FOV at the second fixed FOV size to yield at least one segmented object from each FOV at the second fixed FOV size; (II) to quantify simultaneously (i) the at least one image feature of the at least one segmented object from each FOV at the first fixed FOV size to yield a quantifiable signature feature from each FOV at the first fixed FOV size, and (ii) the at least one image feature of at least one segmented object from each FOV at the second fixed FOV size to yield a quantifiable signature feature from each FOV at the second fixed FOV size; (III) to select at least one reference feature in a dataset comprising reference features according to a minimum Redundancy Maximum Relevance (mRMR) feature selection scheme to identify a selected subset of reference features; and (IV) to discriminate simultaneously (i) the quantifiable signature feature from each FOV at the first fixed FOV size from the selected subset of reference features, and (ii) the quantifiable signature feature from each FOV at the second fixed FOV size from the selected subset of reference features; wherein the at least one image feature is nuclear texture. According to another embodiment, the computing device (c) configured to produce a combined class decision, further configured (2) to extract simultaneously (i) at least one image feature of the at least one detected object from each FOV at the first fixed FOV size, and (ii) at least one image feature of the at least one detected object from each FOV at the second fixed FOV size and further configured (I) to segment simultaneously (i) the at least one detected object from each FOV at the first fixed FOV size to yield at least one segmented object from each FOV at the first fixed FOV size, and (ii) the at least one detected object from each FOV at the second fixed FOV size to yield at least one segmented object from each FOV at the second fixed FOV size; is further configured: (A) to initialize a color gradient-based geodesic active contour (CGAC) model by simultaneously (i) using the stain color channel for the at least one detected object from each FOV at the first fixed FOV size to compute initial object boundaries, and (ii) using the stain color channel for the at least one detected object from each FOV at the second fixed FOV size to compute initial object boundaries; and (B) to compute simultaneously (i) final object boundaries based on the initial object boundaries computed in step (A) by defining a mask surrounding the at least one detected object from each FOV at the first fixed FOV size to yield the at least one segmented object from each FOV at the first fixed FOV size, and (ii) final object boundaries based on the initial object boundaries computed in step (A) by defining a mask surrounding the at least one detected object from each FOV at the second fixed FOV size to yield the at least one segmented object from each FOV at the second fixed FOV size. According to another embodiment, (c) the computing device configured to produce a combined class decision simultaneously for: (i) the plurality of FOVs at the first fixed FOV size, and (ii) the plurality of FOVs at the second fixed FOV size, further configured (5) to assign simultaneously, using a second Boosted classifier, (i) a weight to each FOV of the plurality of FOVs at the first fixed FOV size based on the first class prediction for each FOV of the plurality of FOVs at the first fixed FOV size, and (ii) a weight to each FOV of the plurality of FOVs at the second fixed FOV size based on the second class prediction for each FOV of the plurality of FOVs at the second fixed FOV size; is further configured to apply simultaneously (i) the weight to each FOV of the plurality of FOVs at the first fixed FOV size based on relative importance of each FOV of the plurality of FOVs at the first fixed FOV size in discriminating between at least two image classes, and (ii), the weight to each FOV of the plurality of FOVs at the second fixed FOV size based on relative importance of each FOV of the plurality of FOVs at the second fixed FOV size, in discriminating between at least two image classes. According to another embodiment, the consensus classification of the large, heterogeneous image is selected from the group consisting of a low Bloom-Richardson (BR) grade, an intermediate Bloom-Richardson (BR) grade, and a high Bloom-Richardson (BR) grade.

BRIEF DESCRIPTION OF THE DRAWINGS

FIG. 7($d$) shows centroid of nuclei isolated from the hematoxylin channel and used as vertices for the construction of graphs such as the (e)-(g) Delaunay Triangulation at various FOV sizes. Subsequently, features describing nuclear architecture are extracted from each graph.

DETAILED DESCRIPTION

Glossary

Figure 1:
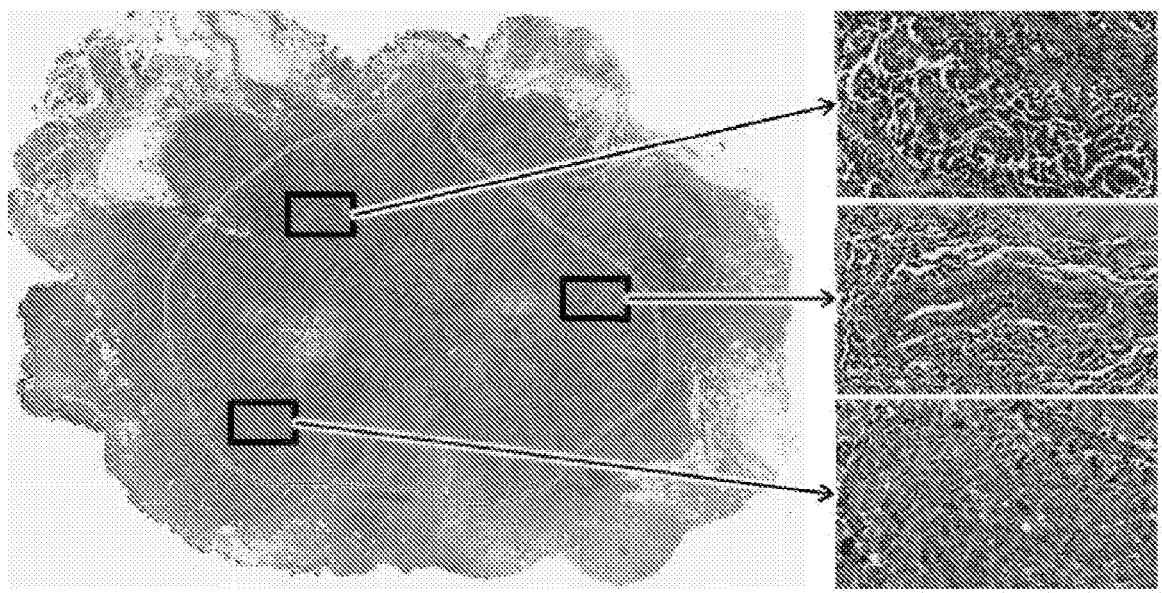
FIG. 1 shows a snapshot of an image from a single ER+BCa histopathology slide outlining three FOVs that illustrate the high level of intratumoral heterogeneity. The grey outline that encloses the three FOVs represents a region of invasive cancer, as determined by an expert pathologist. Note the disorganized tissue structure of FOVs with higher malignancy (top, bottom) compared to the FOV with lower malignancy (middle).
Figure 2:
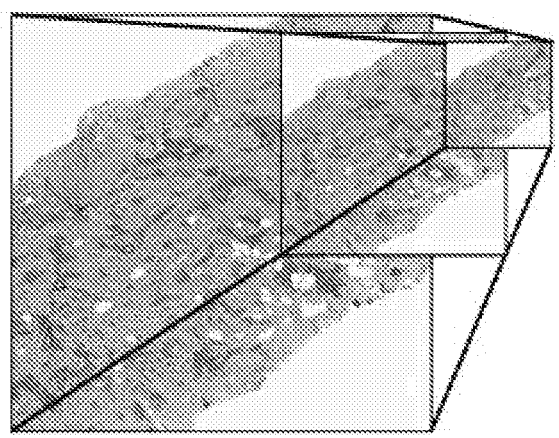
FIG. 2 shows snapshots of images from ER+BCa histopathology slides illustrating differences between (a) a multiscale framework, which maintains a fixed FOV while examining different scales (i.e., spatial resolutions); and (b) a multi-FOV framework, which maintains a fixed scale while analyzing several FOV sizes.
Figure 2:
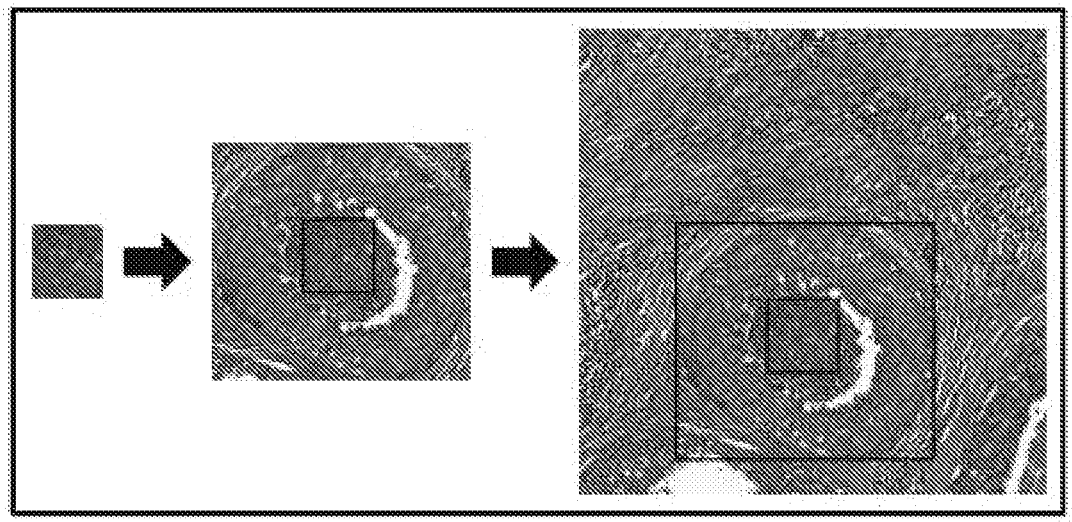
Figure 3:
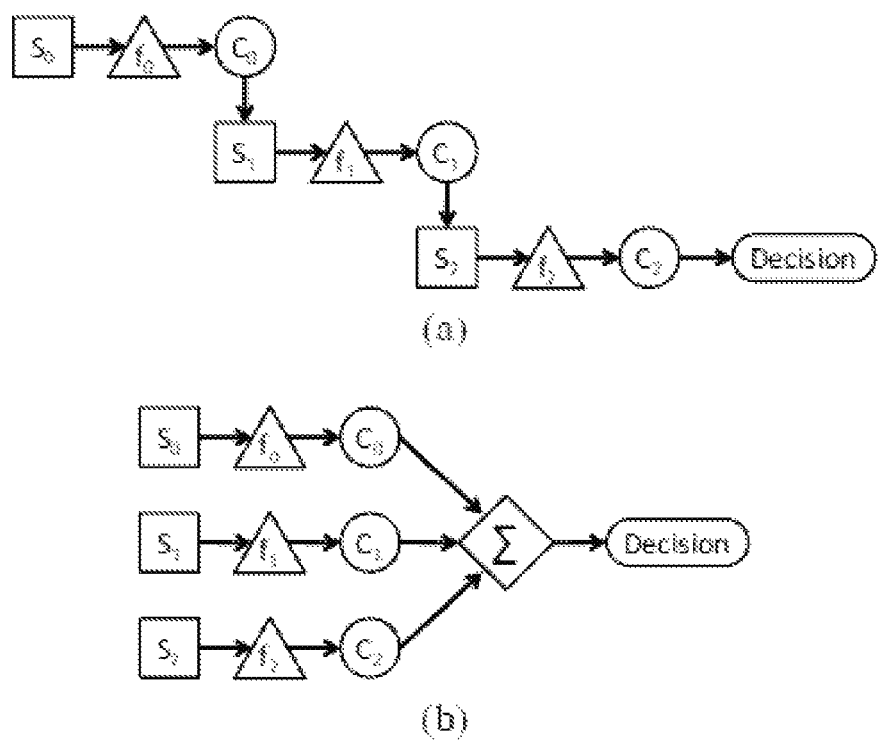
FIG. 3 depicts illustrations showing the difference between (a) a hierarchical classifier framework and (b) a parallel classifier framework. S is the data exposed to analysis, f represents features extracted from S, and C is the classifier that generates a class prediction for S. For a parallel framework, the integration of individual classifiers is denoted $\Sigma$.

The term "active contour" as used herein refers to a mathematical model for delineating an object outline/boundary from a noisy two-dimensional image.

The Bloom-Richardson (BR) grading system is used for grading breast cancer. It encompasses three visual signatures (degree of tubule formation, nuclear pleomorphism, and mitotic activity), each of which is scored on a scale of 1 to 3 to produce a combined BR scale ranging from 3 to 9. Commonly accepted clinical cutoffs used to define the low, intermediate, and high grade classes are low (BR 3-5), intermediate (BR 6-7), and high (BR 8-9) BR grade.

The term "Boosted classifier" as used herein refers to a classifier described as $\hat{h}_{B_0}(H,T)=\Sigma_{j=1}^{T}\alpha_j^{T}H(D^T,T)$ that is generated using an Adaboost algorithm, as described by Schapire (Schapire, R. E. "The boosting approach to machine learning: An overview," in *Nonlin. Est. and Class.*, 2002). The Adaboost algorithm maintains a set of internal weights, D, for each of the training samples which is iteratively updated to choose classifiers that correctly classify "difficult" samples (i.e. samples that are often misclassified). The algorithm is run for $\psi$ iterations to output (1) a modified set of $\phi$ pixel-wise classifiers $h_1, h_2, \ldots, h_\phi$, where $h_i \in \{1, 0\}$ indicates the output of the highest-weighted classifier, and (2) $\phi$ associated weights $\alpha_1, \alpha_2, \ldots, \alpha_T$ for each classifier. Note that $\alpha_1, \alpha_2, \ldots, \alpha_\phi$ reflect the importance of each of the individual features (classifiers) in discriminating cancer malignancy. The result of the ensemble classifier at a specific FOV size is denoted as:

$$A^{Ada} = \sum_{i=1}^{\psi} \alpha_i h_i ..$$

The term "boosted, multi-field-of-view (multi-FOV)" classifier as used herein refers to a classifier that finds optimal FOV sizes for aggregating the plurality of combined class decisions that are outputs of the ensembles at each of the plurality of fixed FOV sizes.

The term "BrCa" as used herein refers to breast cancer.

The term "classifier" as used herein refers to a computational device capable of performing a classification function. A classification function is a discrete value output function, such as for example prediction of disease outcome. According to the described invention, each of the parameters has its own separate classifiers. These classifiers are then combined to create a meta-classifier (combined classifier) which yields the final risk score.

The term "color gradient active contour (CGAC) model" as used herein refers to a model that enhances the traditional GAC model by using a local structure tensor-based color gradient instead of the grayscale gradient. This change results in an improvement in edge detection and final segmentation.

The term "contour" as used herein refers to shape of an object that segments object boundaries. An object in an image scene is inherently associated with a contour.

The abbreviation DT as used herein signifies Delaunay Triangulation graph

The abbreviation "ER+BrCa" as used herein signifies estrogen receptor-positive breast cancer.

The abbreviation "FOV" as used herein signifies field-of-vision.

The abbreviation MST as used herein signifies a Minimum Spanning Tree.

The abbreviation NN as used herein signifies a Nearest Neighbor graph.

The abbreviation ROC as used herein signifies receiver operating characteristic (ROC) curves.

The abbreviation RS as used herein signifies Oncotype DX Recurrence Scores.

The abbreviation VD as used herein signifies Voronoi Diagram.

The term "field of view" as used herein refers to part of space or plane imaged by an optical system, such for example, a microscope. The size of the field of view is determined by the components of the optical system, such as, for example, lenses, prisms and mirrors that regulate the beam of light entering a microscope.

The term "GAC" as used herein refers to a Geodesic Active Contour model, such as described in Caselles et al. (Caselles, V. et al., "Geodesic active contours," Int. J. Comput. Vision, 1997, 22(1): 61-79).

The term "graph" as used herein refers to a set of vertices (e.g. each vertex corresponding to a BCa nucleus) with corresponding edges connecting all detected objects, e.g. nuclei.

The term "histopathologic image" as used herein refers to an image, such as a microscopic image of a histopathologic slide prepared from an animal tissue for diagnosis of disease. Histopathologic sample preparation includes steps such as processing, embedding, sectioning, fixing, staining, etc.

The term "HSV color space" as used herein refers to a cylindrical-coordinate representation of points in an RGB color model, which rearrange the geometry of the RGB model.

The term "image feature" as used herein refers to features of an image that can be observed, detected, and/or measured or quantified.

The term "mRMR" as used herein refers to a minimum Redundancy Maximum Relevance (mRMR) feature selection scheme as described by Peng et al. (Peng, H. et al., "Feature selection based on mutual information criteria of max-dependency, max-relevance, and min-redundancy," *IEEE Trans. Pattern Anal. Mach. Intell.*, 2005, 27(8): 1226-1238), which is used to identify an ensemble of features, for example to allow for optimal classification of a histological sample.

The term "RGB color space" as used herein refers to an additive color model in which red, green, and blue light is added together in various ways to reproduce a broad array of colors.

The term "staining" and its various grammatical forms as used herein refers to a general method of increasing contrast of a tissue for microscopic examination.

The terms "vertex" or its plural "vertices" as used herein refer to the centroids of detected nuclei.

Method for Image-Based Outcome Prediction

According to one aspect, the present invention provides a method for analyzing a large, heterogeneous image by a boosted, multi-field-of-view (FOV) framework, comprising:

(a) inputting, via a computing device, the large, heterogeneous image;

(b) generating, via the computing device, a plurality of field-of-views (FOVs) at a plurality of fixed FOV sizes, the method for generating the plurality of FOVs at a plurality of fixed FOV sizes comprising dividing simultaneously, via the computing device, the large, heterogeneous image into (i) a plurality of field-of-views (FOVs) at a first fixed FOV size from among the plurality of fixed FOV sizes; and (ii) a plurality of field-of-views (FOVs) at a second fixed FOV size from among the plurality of fixed FOV sizes;

(c) producing simultaneously for the large, heterogeneous image, via the computing device, a combined class decision for: (i) the plurality of FOVs at the first fixed FOV size, and (ii) the plurality of FOVs at the second fixed FOV size, by:

(1) detecting simultaneously, via the computing device, (i) at least one object to yield at least one detected object from each FOV at the first fixed FOV size, and (ii), at least one object to yield at least one detected object from each FOV at the second fixed FOV size;

(2) extracting simultaneously, via the computing device, (i) at least one image feature of the at least one detected object from each FOV at the first fixed FOV size, and (ii) at least one image feature of the at least one detected object from each FOV at the second fixed FOV size;

(3) training simultaneously, via the computing device, a classifier from: (i) the at least one image feature from each FOV of the plurality of FOVs at the first fixed FOV size, and (ii) the at least one image feature from each FOV for the plurality of FOVs at the second fixed FOV size;

(4) making simultaneously, via the computing device, using the classifier, (i) a first class prediction for each FOV of the plurality of FOVs at the first fixed FOV size based on the at least one image feature from each FOV of the plurality of FOVs at the first fixed FOV size, and (ii) a second class prediction for each FOV of the plurality of FOVs at the second fixed FOV size based on the at least one image feature from each FOV for the plurality of FOVs at the second fixed FOV size; and (5) producing simultaneously, via the computing device, (i) the combined class decision for the plurality of FOVs at the first fixed FOV size, and (ii) the combined class decision for the plurality of FOVs at the second fixed FOV size;

(d) repeating simultaneously, via the computing device, for each plurality of FOVs at the plurality of fixed FOV sizes to generate a plurality of combined class decisions, detecting step (1), extracting step (2), training step (3), making step (4), and producing step (5);

(e) aggregating, via the computing device, using a boosted multi-FOV classifier, the plurality of combined class decisions at each fixed FOV size of the plurality of fixed FOV sizes to yield an aggregated boosted multi-FOV decision, wherein the boosted, multi-field-of-view (multi-FOV) classifier finds optimal FOV sizes for aggregating the plurality of combined class decisions that are outputs of the ensembles at each of the plurality of fixed FOV sizes; and (f) producing, via the computing device, a consensus classification for the large, heterogeneous image, based on the aggregated multi-FOV decision.

(a) Inputting an Image Step

According to some embodiments, the method for analyzing a large, heterogeneous image by a boosted, multi-field-of-view (FOV) framework, comprises step (a) inputting, via a computing device, the large, heterogeneous image.

According to some such embodiments, the large, heterogeneous image is a microscopic image. In some such embodiments, the large, heterogeneous image is a histopathologic image. In some embodiments, the large, heterogeneous image is a histopathologic image of a diseased tissue. Exemplary diseased tissue includes, but is not limited to, a cancer, an inflammatory disease, Crohn's disease, rheumatoid arthritis, microbial infections, etc. Exemplary cancers include, but are not limited to, prostate cancer, breast cancer, pancreatic cancer, colon cancer, leukemia, lymphoma, myeloma, ovarian cancer, melanoma, lung cancer, glioma, renal-cell cancer, etc. In some such embodiments, the breast cancer is characterized by the presence of at least one immunohistochemical (IHC) marker. Exemplary IHC markers include but are not limited to, estrogen receptor (ER), progesterone receptor (PR), human epidermal growth factor receptor 2 (HER2), Cancer Antigen 15-3 (CA 15-3), Cancer Antigen 27.29 (CA 27.29), carcinoembroyonic antigen (CEA), progesterone receptor (PgR), urokinase (uPA), plasminogen activator inhibitor-1 (PAI-1), Cancer Antigen Ki-67 (CA Ki-67), etc.

According to some embodiments, the histopathologic image is stained by a histochemical staining method. Exemplary histochemical staining methods include, but are not limited to, a monoclonal antibody, a polyclonal antibody, CD34, hematoxylin, eosin, Hoeschst stain, 4', 6-diamidino-2-phenylindole (DAPI), etc.

(b) Generating a plurality of FOVs Step

According to some embodiments, the method for analyzing a large, heterogeneous image by a boosted, multi-field-of-view (FOV) framework, comprises step (b) generating, via the computing device, a plurality of field-of-views (FOVs) at a plurality of fixed FOV sizes, the method for generating the plurality of FOVs at a plurality of fixed FOV sizes comprising dividing simultaneously, via the computing device, the large, heterogeneous image into (i) a plurality of field-of-views (FOVs) at a first fixed FOV size from among the plurality of fixed FOV sizes; and (ii) a plurality of field-of-views (FOVs) at a second fixed FOV size from among the plurality of fixed FOV sizes.

(c) Producing a Combined Class Decision Step

According to some embodiments, the method for analyzing a large, heterogeneous image by a boosted, multi-field-of-view (FOV) framework, comprises step (c) producing simultaneously for the large, heterogeneous image, via the computing device, a combined class decision for: (i) the plurality of FOVs at the first fixed FOV size, and (ii) the plurality of FOVs at the second fixed FOV size, by:

(1) detecting simultaneously, via the computing device, (i) at least one object to yield at least one detected object from each FOV at the first fixed FOV size, and (ii), at least one object to yield at least one detected object from each FOV at the second fixed FOV size;

(2) extracting simultaneously, via the computing device, (i) at least one image feature of the at least one detected object from each FOV at the first fixed FOV size, and (ii) at least one image feature of the at least one detected object from each FOV at the second fixed FOV size;

(3) training simultaneously, via the computing device, a classifier from: (i) the at least one image feature from each FOV of the plurality of FOVs at the first fixed FOV size, and (ii) the at least one image feature from each FOV for the plurality of FOVs at the second fixed FOV size;

(4) making simultaneously, via the computing device, using the classifier, (i) a first class prediction for each FOV of the plurality of FOVs at the first fixed FOV size based on the at least one image feature from each FOV of the plurality of FOVs at the first fixed FOV size, and (ii), a second class prediction for each FOV of the plurality of FOVs at the second fixed FOV size based on the at least one image feature from each FOV for the plurality of FOVs at the second fixed FOV size; and (5) producing simultaneously, via the computing device, (i) the combined class decision for the plurality of FOVs at the first fixed FOV size, and (ii) the combined class decision for the plurality of FOVs at the second fixed FOV size.

(1) Detecting at Least One Object Step

According to some embodiments, producing step (c) comprises step (1) detecting simultaneously, via the computing device, (i) at least one object to yield at least one detected object from each FOV at the first fixed FOV size, and (ii), at least one object to yield at least one detected object from each FOV at the second fixed FOV size.

According to some embodiments, the at least one object is selected from the group consisting of cells, nuclei, lumen, tubules, adipose, stroma, and a combination thereof. Exemplary cells include but are not limited to epithelial cells, breast cancer cells, prostate cancer cells, lung cancer cells, pancreatic cancer cells, colon cancer cells, bone cancer cells, lymphocytes, and any other pluripotent cancer cells. According to some such embodiments, the at least one object include nuclei.

According to some embodiments, the at least one object is automatically detected by using a color deconvolution to isolate a stain used to stain the image, such as described in Ruifrok et al. (Ruifrok A. C. et al., "Quantification of histochemical staining by color deconvolution.," Anal Quant Cytol Histol, August 2001, 23(4): 291-299) and Basavanhally et al. (Basavanhally, A. et al., "Incorporating domain knowledge for tubule detection in breast histopathology using o'callaghan neighborhoods," in *SPIE Medical Imaging, ser. Computer-Aided Diagnosis*, 2011, 7963(1): 10). Color deconvolution is an image processing technique for color space transformation, that converts each FOV from a Red-Green-Blue (RGB) color space to a new color space defined by a stain channel (e.g. hematoxylin, eosin), and a background channel (i.e. white). Centroids of individual nuclei are then identified by applying a morphological opening operation to the resulting stain channel.

Color deconvolution converts an RGB space g to a new color space a comprising hematoxylin H (i.e. purple), eosin E (i.e. pink), and background K (i.e. white) channels. The relationship between color spaces g and a is defined as f=Ma, where the transformation matrix is given by $$M = \begin{bmatrix} \hat{H}_R & \hat{H}_G & \hat{H}_B \\ \hat{E}_R & \hat{E}_G & \hat{E}_B \\ \hat{K}_R & \hat{K}_G & \hat{K}_B \end{bmatrix},$$

where $\hat{H}_R$, $\hat{H}_G$, and $\hat{H}_B$ denote the pre-defined, normalized red, green, and blue values,
respectively, for the H channel. The second and third rows of M are defined analogously for the E and K channels, respectively. The intensity of a pixel c in the new color space is defined as $a(c)=M^{-1}(c)g(c)$, where g and a are 3×1 column vectors.

According to one embodiment, the at least one object is automatically detected by using color deconvolution to isolate a stain used to stain the image, wherein the stain is hematoxylin.

According to some embodiments, detecting step (1) comprises simultaneously (i) converting each FOV at the first fixed FOV size to a stain color channel, and a background channel, to yield the at least one detected object from each FOV at the first fixed FOV size, and (ii) converting each FOV at the second fixed FOV size to the stain color channel, and the background channel to yield the at least one detected object from each FOV at the second fixed FOV size. According to some such embodiments, the stain color channel is selected from the group consisting of a hematoxylin channel, an eosin channel, a 6-diamidino-2-phenylindole (DAPI) channel, a Hoeschst stain channel, and a combination thereof. According to one embodiment, the stain color channel comprises a hematoxylin channel. According to one embodiment, the stain color channel comprises an eosin channel. According to one embodiment, the stain color channel comprises a 6-diamidino-2-phenylindole (DAPI) channel. According to one embodiment, the stain color channel comprises a Hoeschst stain channel. According to one embodiment, the background channel comprises a white channel. [Inventors please advise other possible background colors you wish to include].

According to one embodiment, FOVs are disqualified from further analysis if (a) at least 50% of the FOV does not fall within an annotation denoting invasive cancer or (b) a minimum of 20 objects, such as nuclei, are not found. FIG. 1 illustrates an exemplary annotation enclosing a region of a breast cancer histopathologic image denoting invasive cancer.

(2) Extracting at Least One Image Feature Step

According to some embodiments, producing step (c) comprises step (2) extracting simultaneously, via the computing device, (i) at least one image feature of the at least one detected object from each FOV at the first fixed FOV size, and (ii) at least one image feature of the at least one detected object from each FOV at the second fixed FOV size.

According to some embodiments, the at least one detected object is selected from the group consisting of cells, nuclei, lumen, tubules, adipose, stroma, and a combination thereof. Exemplary cells include but are not limited to epithelial cells, breast cancer cells, prostate cancer cells, lung cancer cells, pancreatic cancer cells, colon cancer cells, bone cancer cells, lymphocytes, and any other pluripotent cancer cells. According to some such embodiments, the at least one detected object includes nuclei. According to one embodiment, the at least one detected object includes cancer nuclei.

According to some embodiments, for each FOV denoted as $d^{\tau}_m$, at least one image feature denoted as $f(d^{\tau}_m)$ is extracted, where d denotes an individual FOV, $\tau$ denotes the number of pixels within the FOV and m denotes the $m^{th}$ FOV. According to some embodiments, the at least one image feature is a quantitative image feature. Exemplary quantitative image features include, but are not limited to, nuclear architecture (denoted as $f_{NA}$) and nuclear texture (denoted as $f_{NT}$). Nuclear architecture and nuclear texture reflect the phenotypic variations seen across BCa grades.

According to some embodiments, the at least one image feature of the at least one detected object from each FOV describes a spatial arrangement of the at least one detected object.

Extracting Nuclear Architecture Step

According to some embodiments, the at least one image feature of the at least one detected object from each FOV is nuclear architecture. According to one embodiment, the at least one image feature of the at least one detected object from each FOV at the first fixed FOV size is nuclear architecture. According to one embodiment, the at least one image feature of the at least one detected object from each FOV at the second fixed FOV size is nuclear architecture.

According to some such embodiments, extracting step (2) comprises:

(I) quantifying simultaneously, via the computing device,
(i) the at least one image feature of the at least one detected object from each FOV at the first fixed FOV size to yield a quantifiable signature feature of the at least one detected object from each FOV at the first fixed FOV size, and (ii) the at least one image feature of the at least one detected object from each FOV at the second fixed FOV size to yield a quantifiable signature feature of the at least one detected object from each FOV at the second fixed FOV size;

(II) selecting, via the computing device, at least one reference feature in a dataset comprising reference features according to a minimum Redundancy Maximum Relevance (mRMR) feature selection scheme to identify a selected subset of reference features; and (III) discriminating simultaneously, via the computing device, (i) the quantifiable signature feature from each FOV at the first fixed FOV size from the selected subset of reference features, and (ii) the quantifiable signature feature from each FOV at the second fixed FOV size from the selected subset of reference features; wherein the at least one image feature is nuclear architecture.

According to some such embodiments, extracting step (2) comprises step (I) quantifying simultaneously, via the computing device, (i) the at least one image feature of the at least one detected object from each FOV at the first fixed FOV size to yield a quantifiable signature feature of the at least one detected object from each FOV at the first fixed FOV size, and (ii) the at least one image feature of the at least one detected object from each FOV at the second fixed FOV size to yield a quantifiable signature feature of the at least one detected object from each FOV at the second fixed FOV size.

(I) Quantifying Nuclear Architecture Step

According to one embodiment, quantifying step (I) comprises quantifying the at least one image feature using the at least one detected object as at least one vertex for the construction of a graph, wherein the graph is selected from the group consisting of a Voronoi Diagram (VD), a Delaunay Triangulation (DT) graph, a Minimum Spanning Tree (MST), a Nearest Neighbor (NN) graph, or a combination thereof, wherein the at least one image feature is nuclear architecture. The term "vertex" or its plural "vertices" as used herein refer to the centroids of detected nuclei. According to one embodiment, quantifying step (I) comprises using the at least one detected object as at least one vertex for the construction of a Voronoi Diagram (VD). According to one embodiment, quantifying step (I) comprises using the at least one detected object as at least one vertex for the construction of a Delaunay Triangulation (DT) graph. According to one embodiment, quantifying step (I) comprises using the at least one detected object as at least one vertex for the construction of a Minimum Spanning Tree (MST). According to one embodiment, quantifying step (I) comprises using the at least one detected object as at least one vertex for the construction of a Nearest Neighbor (NN) graph.

The term "graph" as used herein refers to a set of vertices (e.g. each vertex corresponding to a BCa nucleus) with corresponding edges connecting all detected objects, e.g. nuclei. For a particular FOV, the Voronoi Diagram (VD) constructs a polygon around each nucleus such that each pixel in the image falls into the polygon associated with the nearest nucleus. The Delaunay Triangulation (DT) graph is a dual graph of the Voronoi Diagram and is constructed such that nuclei with adjacent regions are connected by an edge (FIGS. 7(e)-(g)). The Minimum Spanning Tree (MST) connects all nuclei in the image while minimizing the total length of all edges. A nearest neighbor (NN) graph is constructed by creating edges between a given vertex and neighboring vertices. Neighboring vertices may be defined in a number of ways, including, without limitation, the selection of k-nearest neighbors or by a fixed maximum distance constraint.

According to some embodiments, at least one image feature for each FOV is extracted from the Voronoi Diagram (VD). Exemplary image features extracted from the Voronoi Diagram (VD) include, but are not limited to, total area of polygons, polygon area (e.g., mean, standard deviation, minimum ratio, maximum ratio, disorder, etc.), polygon perimeter (e.g. mean, standard deviation, minimum ratio, maximum ratio, disorder, etc.), and polygon chord length (e.g. mean, standard deviation, minimum ratio, maximum ratio, disorder, etc.). According to some embodiments, at least one image feature for each FOV is extracted from the Delaunay Triangulation (DT) graph. Exemplary image features extracted from the Delaunay Triangulation (DT) graph include but is not limited to triangle side length (e.g. mean, standard deviation, minimum ratio, maximum ratio, disorder, etc.), and triangle area length (e.g. mean, standard deviation, minimum ratio, maximum ratio, disorder, etc.). According to some embodiments, at least one image feature for each FOV is extracted from the Minimum Spanning Tree (MST) graph. Exemplary image features extracted from the Minimum Spanning Tree (MST) graph include, but are not limited to, edge length (e.g. mean, standard deviation, minimum ratio, maximum ratio, disorder, etc.). According to some embodiments, at least one image feature for each FOV is extracted from the Nearest Neighbor (NN) graph. Exemplary image features extracted from the Nearest Neighbor (NN) graph include, but are not limited to, nuclear density, distance to 2 nearest nuclei (e.g. mean, standard deviation, disorder, etc.), distance to 3 nearest nuclei (e.g. mean, standard deviation, disorder, etc.), distance to 4 nearest nuclei (e.g. mean, standard deviation, disorder, etc.), distance to 5 nearest nuclei (e.g. mean, standard deviation, disorder, etc.), distance to 6 nearest nuclei (e.g. mean, standard deviation, disorder, etc.), distance to 7 nearest nuclei (e.g. mean, standard deviation, disorder, etc.), distance to 8 nearest nuclei (e.g. mean, standard deviation, disorder, etc.), distance to 9 nearest nuclei (e.g. mean, standard deviation, disorder, etc.), distance to 10 nearest nuclei (e.g. mean, standard deviation, disorder, etc.), the number of nuclei in a 5 µm radius (e.g. mean, standard deviation, disorder, etc.), the number of nuclei in a 10 µm radius (e.g. mean, standard deviation, disorder, etc.), the number of nuclei in a 15 µm radius (e.g. mean, standard deviation, disorder, etc.), the number of nuclei in a 20 µm radius (e.g. mean, standard deviation, disorder, etc.), the number of nuclei in a 25 µm radius (e.g. mean, standard deviation, disorder, etc.), the number of nuclei in a 30 µm radius (e.g. mean, standard deviation, disorder, etc.), the number of nuclei in a 35 µm radius (e.g. mean, standard deviation, disorder, etc.), the number of nuclei in a 40 µm radius (e.g. mean, standard deviation, disorder, etc.), the number of nuclei in a 45 µm radius (e.g. mean, standard deviation, disorder, etc.), and the number of nuclei in a 50 µm radius (e.g. mean, standard deviation, disorder, etc.).

(II) Feature Selection Step for Nuclear Architecture

According to one embodiment, extracting step (2) comprises step (II) selecting, via the computing device, at least one reference feature in a dataset comprising reference features according to a minimum Redundancy Maximum Relevance (mRMR) feature selection scheme to identify a selected subset of reference features, wherein the at least one image feature is nuclear architecture.

A large number of image descriptive features is highly desirable in terms of distinguishing patients based on BR grade. However, large feature sets present practical limitations in data classification such as dimensionality, which calls for an exponential growth in the data cohort for each additional feature used, as described by Bellman R. (Bellman R. and R. Corporation, Dynamic programming, ser. Rand Corporation research study. Princeton University Press, 1957). Such large feature sets also have redundant features that do not provide additional class discriminatory information.

According to one embodiment, the minimum Redundancy Maximum Relevance (mRMR) feature selection scheme is used to identify a selected subset of reference features, as described by Peng et al. (Peng, H. et al., "Feature selection based on mutual information criteria of max-dependency, max-relevance, and min-redundancy," IEEE Trans. Pattern Anal. Mach. Intell., 2005, 27(8): 1226-1238). According to one embodiment, the minimum Redundancy Maximum Relevance (mRMR) feature selection scheme used to identify a selected subset of reference features address both limitations for using large features sets including dimensionality and redundant features. A minimum Redundancy Maximum Relevance (mRMR) method previously has been described for use in various biomedical applications ranging from the isolation of salient genes in microarray data, as described by Ding et al. (Ding, C. et al. "Minimum redundancy feature selection from microarray gene expression data," J Bioinform Comput Biol, April 2005, 3(2): 185-205) to insight into drug interactions of various protein groups, as described by He et al. (He, Z. et al., "Predicting drug-target interaction networks based on functional groups and biological features," PLoS ONE, 2010, 5(3): e9603).

According to one embodiment, the minimum Redundancy Maximum Relevance (mRMR) feature selection scheme selects, in a set f comprising a reference feature, a subset $\tilde{f} \in f$ that maximizes "relevance" and minimizes "redundancy" between individual image features. According to one embodiment, a reference feature fj is incrementally included in subset $\tilde{f}$ based on the criteria described in Equation (1):

$$f_j = \underset{f_j \in 1-\tilde{1}}{\mathrm{argmax}} \left[ I(f_j, y) - \frac{1}{|\tilde{f}|-1} \sum_{f_i \in \tilde{f}} I(f_j, f_i) \right], \quad (1)$$

where I is mutual information, y is the class label associated with a given sample, and $|\tilde{f}|$ represents cardinality of the selected feature subset $\tilde{f}$. According to one embodiment, the reference feature subset $\tilde{f}_{NA} \in f_{NA}$ comprises features related to nuclear architecture based on their ability to distinguish BCa histopathology slides with low, intermediate, and high BR grades.

(III) Discriminating Quantifiable Signature

According to one embodiment, extracting step (2) comprises the step (III) discriminating simultaneously, via the computing device, (i) the quantifiable signature feature of the at least one detected object from each FOV at the first fixed FOV size from the selected subset of reference features, and (ii) the quantifiable signature feature of the at least one detected object from each FOV at the second fixed FOV size from the selected subset of reference features, wherein the at least one image feature is nuclear architecture.

Extracting Nuclear Texture Step

According to one embodiment, the at least one image feature describing spatial distribution of at least one object from each FOV is nuclear texture.

According to some such embodiments, extracting step (2) comprises:
  (I) segmenting simultaneously, via the computing device, (i) the at least one detected object from each FOV at the first fixed FOV size to yield at least one segmented object from each FOV at the first fixed FOV size, and (ii) the at least one detected object from each FOV at the second fixed FOV size to yield at least one segmented object from each FOV at the second fixed FOV size;
  (II) quantifying simultaneously, via the computing device, (i) the at least one image feature of the at least one segmented object from each FOV at the first fixed FOV size to yield a quantifiable signature feature from each FOV at the first fixed FOV size, and (ii) the at least one image feature of at least one segmented object from each FOV at the second fixed FOV size to yield a quantifiable signature feature from each FOV at the second fixed FOV size;
  (III) selecting, via the computing device, at least one reference feature in a dataset comprising reference features according to a minimum Redundancy Maximum Relevance (mRMR) feature selection scheme to identify a selected subset of reference features; and (IV) discriminating simultaneously, via the computing device, (i) the quantifiable signature feature from each FOV at the first fixed FOV size from the selected subset of reference features, and (ii) the quantifiable signature feature from each FOV at the second fixed FOV size from the selected subset of reference features; wherein the at least one image feature is nuclear texture.

(I) Segmenting the at least one Detected Object from Each FOV

According to some such embodiments, extracting step (2) comprises step (I) segmenting simultaneously, via the computing device, (i) the at least one detected object from each FOV at the first fixed FOV size to yield at least one segmented object from each FOV at the first fixed FOV size, and (ii) the at least one detected object from each FOV at the second fixed FOV size to yield at least one segmented object from each FOV at the second fixed FOV size.

According to one embodiment, segmenting step (I) comprises:
  (A) initializing, via the computing device, a color gradient-based geodesic active contour (CGAC) model by simultaneously (i) using the stain color channel for the at least one detected object from each FOV at the first fixed FOV size to compute initial object boundaries, and (ii) using the stain color channel for the at least one detected object from each FOV at the second fixed FOV size to compute initial object boundaries; and
  (B) computing simultaneously, via the computing device, (i) final object boundaries based on the initial object boundaries computed in step (A) by defining a mask surrounding the at least one detected object from each FOV at the first fixed FOV size to yield the at least one segmented object from each FOV at the first fixed FOV size, and (ii) final object boundaries based on the initial object boundaries computed in step (A) by defining a mask surrounding the at least one detected object from each FOV at the second fixed FOV size to yield the at least one segmented object from each FOV at the second fixed FOV size.

According to one embodiment, initializing step (I) comprises using the color gradient-based geodesic active contour (CGAC) model to combine gradient information from each channel in the RGB color space, as described in Xu et al. (Xu, J. et al., "A high throughput active contour scheme for segmentation of histopathological imagery," Medical Image Analysis, vol. In Press, p. Corrected Proof, 2011. [Online]. Available at sciencedirect.com/science/article/pii/ $S_{136184151100048}X$). In contrast, traditional geodesic active contour (GAC) models are driven by the less informative grey scale gradient. The final boundaries of the CGAC model are used to define a mask denoting nuclear regions. The color gradient-based geodesic active contour (CGAC) model enhances the traditional GAC model by using a local structure tensor-based color gradient instead of the grayscale gradient. This change results in a clear improvement in edge detection and final segmentation.

(II) Quantifying Nuclear Texture

According to some such embodiments, extracting step (2) comprises step (II) quantifying simultaneously, via the computing device, (i) the at least one image feature of the at least one segmented object from each FOV at the first fixed FOV size to yield a quantifiable signature feature from each FOV at the first fixed FOV size, and (ii) the at least one image feature of the at least one segmented object from each FOV at the second fixed FOV size to yield a quantifiable signature feature from each FOV at the second fixed FOV size, wherein the at least one image feature is nuclear texture.

According to one embodiment, quantifying step (II) comprises extracting Haralick co-occurrence features from each FOV using the mask surrounding the at least one detected object from each FOV, according to a method described in Gurcan et al. (Gurcan, M. N. et al., "Histopathological image analysis: A review," IEEE Rev Biomed Eng, 2009, 2: 147-171) and Doyle et al. (Doyle, S. et al., "A boosted bayesian multi-resolution classifier for prostate cancer detection from digitized needle biopsies," Biomedical Engineering, IEEE Transactions on, 2010, PP(99): 1), comprising the steps: (i) transforming each FOV at the first fixed FOV size and each FOV at the second fixed FOV size from the Red-Green-Blue (RGB) color space to a Hue-Saturation-Value (HSV) color space; (ii) constructing a co-occurrence matrix at each relevant pixel of each FOV at the first fixed FOV size for each of the three channels of the HSV color space and a co-occurrence matrix at each relevant pixel of each FOV at the second fixed FOV size for each of the three channels of the HSV color space to quantify the frequency of pixel intensities in a fixed neighborhood; and (iii) extracting a set of Haralick features from the co-occurrence matrices for each of the three channels of the HSV color space by repeating constructing step (ii) and extracting step (iii) for each of the three channels of the HSV color space. According to one embodiment, transforming step (i) comprises transforming each FOV from the RGB color space to a HSV color space, according to a method described by Jain (A. K. Jain, Fundamentals of Digital Image Processing. Prentice Hall, 1989). A method for extracting Haralick features is described by (Haralick, R. M. et al., "Textural features for image classification," IEEE Transactions on Systems, Man and Cybernetics, November 1973, 3(6): 610-621).

Exemplary Haralick features extracted from the co-occurrence matrices include, but are not limited to, angular second Moment described as:

$$f_1 = \sum_i \sum_j \{p(i,j)\}^2;$$

contrast described as:

$$f_2 = \sum_{n=0}^{N_g-1} n^2 \left\{ \sum_{\substack{i=1 \\ |i-j|=n}}^{N_g} \sum_{j=1}^{N_g} p(i,j) \right\}$$

correlation described as $$f_3 = \frac{\sum_i \sum_j (i,j) p(i,j) - \mu_x \mu_y}{\sigma_x \sigma_y}$$

where $\mu_x$, $\mu_y$, $\sigma_x$, and $\sigma_y$ are the means and standard deviations of $p_x$ and $p_y$; sum of squares (variance) described as $$f_4 = \sum_i \sum_j (i-\mu)^2 p(i,j)$$

inverse difference moment described as $$f_5 = \sum_i \sum_j \frac{1}{1+(i-j)^2} p(i,j)$$

sum average described as $$f_6 = \sum_{i=2}^{2N_g} i p_{x+y}(i)$$

sum variance described as $$f_7 = \sum_{i=2}^{2N_g} (i-f_8)^2 p_{x+y}(i)$$

sum entropy described as $$f_8 = -\sum_{i=2}^{2N_g} p_{x+y}(i) \log(p_{x+y}(i))$$

entropy described as $$f_9 = -\sum_i \sum_j p(i,j) \log(p(i,j))$$

difference variance described as $f_{10}$=variance of $p_{x-y}$; difference entropy described as $$f_{11} = -\sum_{i=0}^{N_g-1} p_{x-y}(i) \log(p_{x-y}(i))$$

information measures of correlation described as $$f_{12} = \frac{HXY - HXY1}{\max(HX, HY)}$$

$$f_{13} = (1 - \exp[-2.0(HXY2 - HXY)])^{1/2}$$

$$HXY = -\sum_i \sum_j p(i,j) \log(p(i,j))$$

where HX and HY are entropies of $p_x$ and $p_y$, and $$HXY1 = -\sum_i \sum_j p(i,j) \log\{p_x(i) p_y(j)\}$$

$$HXY2 = -\sum_i \sum_j p_x(i) p_y(j) \log\{p_x(i) p_y(j)\}$$

and maximum correlation coefficient described as $f_{14}$=(SecondlargestEigenvalueofQ)$^{1/2}$, where $$Q(i,j) = \sum_k \frac{p(i,k) p(j,k)}{p_x(i) p_y(k)}$$

Notation p(i,j) (i,j)th entry in a normalized gray-tone spatial-dependence matrix, =P(i,j)/R.

$p_x(i)$ ith entry in the marginal-probability matrix obtained by summing the rows of $p(i,j) = \Sigma_{j=1}^{N_g} P(i,j)$.

$N_g$ Number of distinct gray levels in the quantized image.

$$\sum_i \text{ and } \sum_j \sum_{i=1}^{N_g} \text{ and } \sum_{j=1}^{N_g},$$

respectively.

$$p_y(j) = \sum_{i=1}^{N_g} p(i,j),$$

$$p_{x+y}(k) = \sum_{\substack{i=1 \\ i+j=k}}^{N_g} \sum_{j=1}^{N_g} p(i,j) \; k = 2, 3, \ldots, 2N_g,$$

$$p_{x-y}(k) = \sum_{\substack{i=1 \\ i-j=k}}^{N_g} \sum_{j=1}^{N_g} p(i,j) \; k = 0, 1, \ldots, N_g - 1.$$

FIG. 7(h)-(k) shows the Haralick texture "Contrast Variance" for segmented nuclei at different FOV sizes.

The task is repeated for each of the three channels in the HSV color space, resulting in a total of 117 nuclear texture features $f_{NT}(d^\tau_m)$ for each FOV $d^\tau_m$.

(III) Feature Selection Step for Nuclear Texture

According to one embodiment, extracting step (2) comprises step (III) selecting, via the computing device, at least one reference feature in a dataset comprising reference features according to a minimum Redundancy Maximum Relevance (mRMR) feature selection scheme to identify a selected subset of reference features, wherein the at least one image feature is nuclear texture.

According to one embodiment, the minimum Redundancy Maximum Relevance (mRMR) feature selection scheme is used to identify a selected subset of reference features. According to one embodiment, the minimum Redundancy Maximum Relevance (mRMR) feature selection scheme used to identify a selected subset of reference features address both limitations for using large features sets including dimensionality and redundant features. A minimum Redundancy Maximum Relevance (mRMR) method has been previously described for use in various biomedical applications ranging from the isolation of salient genes in microarray data, as described by Ding et al. (Ding, C. et al. "Minimum redundancy feature selection from microarray gene expression data," *J Bioinform Comput Biol, April* 2005, 3(2): 185-205) to insight into drug interactions of various protein groups, as described by He et al. (He, Z. et al., "Predicting drug-target interaction networks based on functional groups and biological features," *PLoS ONE,* 2010, 5(3): e9603).

According to one embodiment, the minimum Redundancy Maximum Relevance (mRMR) feature selection scheme used to identify a selected subset of reference features, according to a method described by Peng et al. (Peng, H. et al., "Feature selection based on mutual information criteria of max-dependency, max-relevance, and min-redundancy," *IEEE Trans. Pattern Anal. Mach. Intell.,* 2005, 27(8): 1226-1238) can be used. The minimum Redundancy Maximum Relevance (mRMR) feature selection scheme selects, in a set f comprising reference feature, a subset $\bar{f} \epsilon f$ that maximizes "relevance" and minimizes "redundancy" between individual image features. According to one embodiment, a reference feature $f_j$ is incrementally included in subset $\bar{f}$ based on the criteria described in Equation (1):

$$f_j = \underset{f_j \in 1-\bar{f}}{\mathrm{argmax}} \left[ I(f_j, y) - \frac{1}{|\bar{f}|-1} \sum_{f_i \in \bar{f}} I(f_j, f_i) \right], \quad (1)$$

where I is mutual information, y is the class label associated with a given sample, and $|\bar{f}|$ represents cardinality of the selected feature subset $\bar{f}$. According to one embodiment, the reference feature subset $\bar{f}_{NT} \epsilon f_{NT}$ comprises features related to nuclear texture based on their ability to distinguish BCa histopathology slides with low, intermediate, and high BR grades.

(IV) Discriminating Quantifiable Signature

According to one embodiment, extracting step (2) comprises step (IV) discriminating simultaneously, via the computing device, (i) the quantifiable signature feature from each FOV at the first fixed FOV size from the selected subset of reference features, and (ii) the quantifiable signature feature from each FOV at the second fixed FOV size from the selected subset of reference features, wherein the at least one image feature is nuclear texture.

(3) Training a Classifier Step

According to some embodiments, producing step (c) comprises step (4) training simultaneously, via the computing device, a classifier from: (i) the at least one image feature from each FOV of the plurality of FOVs at the first fixed FOV size, and (ii) the at least one image feature from each FOV for the plurality of FOVs at the second fixed FOV size.

(4) Making a Class Prediction Step

According to some embodiments, producing step (c) comprises step (5) making simultaneously, via the computing device, using the classifier, (i) a first class prediction for each FOV of the plurality of FOVs at the first fixed FOV size based on the at least one image feature from each FOV of the plurality of FOVs at the first fixed FOV size, and (ii), a second class prediction for each FOV of the plurality of FOVs at the second fixed FOV size based on the at least one image feature from each FOV for the plurality of FOVs at the second fixed FOV size.

(5) Producing the Combined Class Decision Step

According to some embodiments, producing step (c) comprises step (5) producing simultaneously, via the computing device, (i) the combined class decision for the plurality of FOVs at the first fixed FOV size, and (ii) the combined class decision for the plurality of FOVs at the second fixed FOV size.

(d) Repeating the Steps to Produce Combined Class Decisions for all FOV Sizes Step According to some embodiments, the method for analyzing a large, heterogeneous image by a boosted, multi-field-of-view (FOV) framework, comprises step (d) repeating simultaneously, via the computing device, for each plurality of FOVs at the plurality of fixed FOV sizes to generate a plurality of combined class decisions, detecting step (1), extracting step (2), training step (3), making step (4), and producing step (5).

(e) Aggregating the Combined Class Decisions to Yield the Boosted, Multi-field-of-view (Multi-FOV) Decision Step According to some embodiments, the method for analyzing a large, heterogeneous image, using a boosted, multi-field-of-view (multi-FOV) framework, comprises step (e) aggregating, via the computing device, using a boosted multi-FOV classifier, the plurality of combined class decisions at each fixed FOV size of the plurality of fixed FOV sizes to yield an aggregated boosted multi-FOV decision, wherein the boosted, multi-field-of-view (multi-FOV) classifier finds optimal FOV sizes for aggregating the plurality of combined class decisions that are outputs of the ensembles at each of the plurality of fixed FOV sizes.

(f) Producing a Consensus Classification Step

According to some embodiments, the method for analyzing a large, heterogeneous image, using a boosted, multi-field-of-view (multi-FOV) framework, comprises step (f) producing, via the computing device, a consensus classification for the large, heterogeneous image, based on the aggregated multi-FOV decision.

According to some embodiments, the consensus classification is a low Bloom-Richardson (BR) grade. According to some such embodiments, the consensus classification is a Bloom-Richardson (BR) grade 3. According to some such embodiments, the consensus classification is a Bloom-Richardson (BR) grade 4. According to some such embodiments, the consensus classification is a Bloom-Richardson (BR) grade 5. According to some embodiments, the consensus classification is an intermediate Bloom-Richardson (BR) grade. According to some such embodiments, the consensus classification is a Bloom-Richardson (BR) grade 6. According to some such embodiments, the consensus classification is a Bloom-Richardson (BR) grade 7. According to some embodiments, the consensus classification is a high Bloom-Richardson (BR) grade. According to some such embodiments, the consensus classification is a Bloom-Richardson (BR) grade 8. According to some such embodiments, the consensus classification is a Bloom-Richardson (BR) grade 9.

Boosted, Multi-FOV Framework

Figure 4:
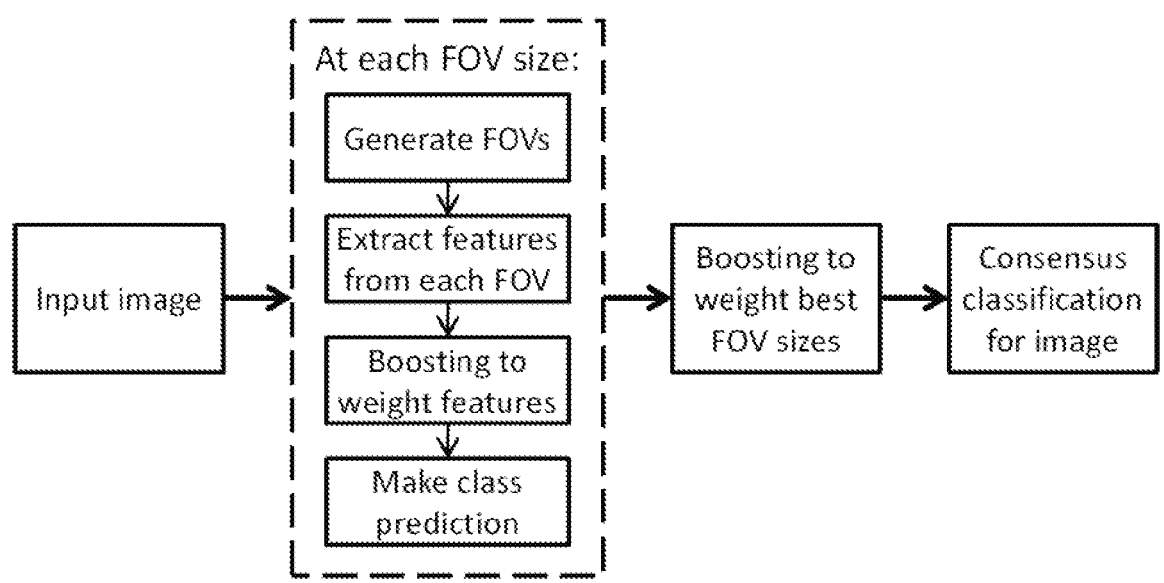
FIG. 4 shows a flowchart outlining the methodological steps contained in the boosted, multi-field-of-view (multi-FOV) classifier.

According to one embodiment, the boosted, multi-field-of-view (multi-FOV) framework comprises the steps according to a flowchart depicted in FIG. 4.

Figure 5:
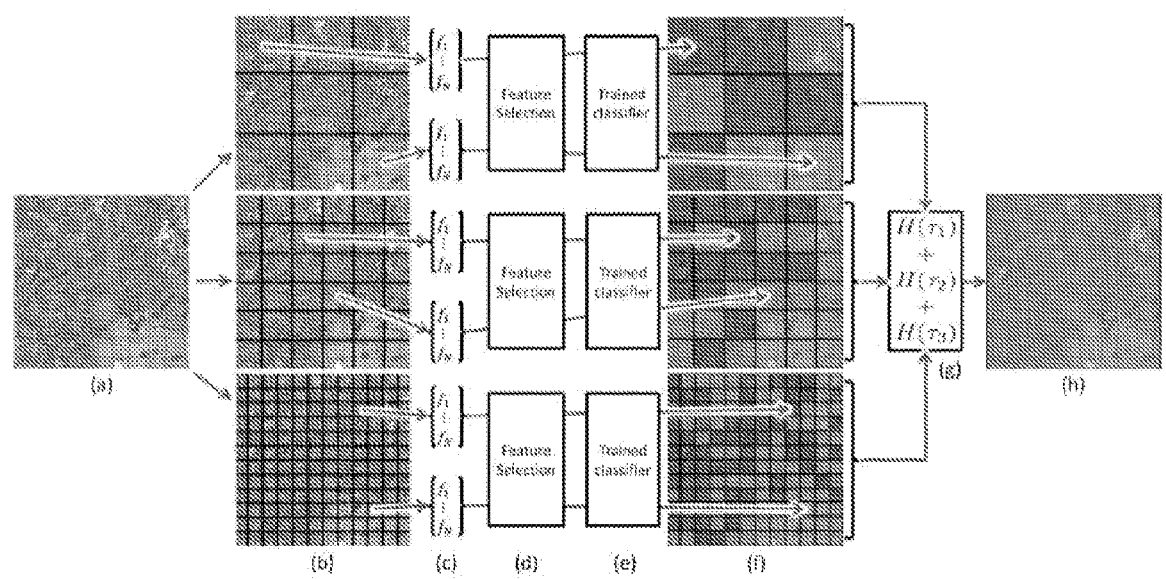
FIG. 5 shows a flowchart outlining the methodological steps of the automated BCa grading system, whereby (a) an ER+BCa histopathology slide is first divided into (b) fields of view (FOVs) of various sizes. (c) Image features that quantify BR grade phenotype are extracted from each FOV and (d) a feature selection scheme is used to identify salient features at each FOV size. (e) Pre-trained classifiers are used to predict (f) BR grade for each FOV (illustrated by light grey and dark grey squares). (g) Predictions for individual FOVs are aggregated to achieve a class prediction H($\tau$) for an entire FOV size $\tau$. (h) Class predictions from FOV sizes are combined to achieve a final classification result for the entire ER+BCa histopathology slide.

According to one embodiment, the boosted, multi-field-of-view (multi-FOV) framework comprises the steps according to a flowchart depicted in FIG. 5, to produce a consensus classification for a breast cancer histopathology slide into a breast cancer grade, whereby (a) an ER+BCa histopathology slide is first divided into (b) fields of view (FOVs) of various sizes. (c) Image features that quantify BR grade phenotype are extracted from each FOV and (d) a feature selection scheme is used to identify salient features at each FOV size. (e) Pre-trained classifiers are used to predict (f) BR grade for each FOV (illustrated by light grey and dark grey squares). (g) Predictions for individual FOVs are aggregated to achieve a class prediction $H(\tau)$ for an entire FOV size $\tau$. (h) Class predictions from FOV sizes are combined to achieve a final classification result for the entire ER+BCa histopathology slide.

According to some embodiments, the large, heterogeneous image C=(C, g) is defined as a 2D set of pixels c∈C with associated intensity function g and class label y∈{0,1}. For each C and FOV size $\tau$∈T, a grid containing FOVs $D^\tau = \{d_1^\tau, d_2^\tau, \ldots, d_M^\tau\}$ is constructed, where $d_m^\tau \in C$, m∈{1,2, ..., M} is a square FOV with edge length of $\mathcal{T}$ pixels. The function that extracts features from each $d_m^\tau$ is defined as $f(d_m^\tau)$. Grid construction and feature extraction are repeated likewise for each FOV size $\tau$∈T. According to one embodiment, the large, heterogeneous image is a histopathologic image derived from a single histopathologic slide.

According to one embodiment, for the single histopathologic slide C=(C, g), a pre-trained classifier $h(d_m^T; \mathcal{T}; f) \in \{0, 1\}$ is first used to assign an initial class prediction for each individual FOV $d_m^T$ with associated features f. The initial class predictions are then aggregated (i.e. mean prediction) for all FOVs $D^\mathcal{T}$ at a single size $\mathcal{T} \in T$ to achieve a combined prediction $H(D^\mathcal{T}; \mathcal{T}; f)$, according to Algorithm 1:

Input: Image C. FOV sizes T = {$t_1, t_2, \ldots, t_N$}. Classifier $h(d_m^\tau, f)$.
Output: Aggregate prediction $H(D^\tau, \tau)$ for each FOV size $\tau \in T$.
1:   for all $\tau \in T$ do
2:         From C, define M, $\tau \times \tau$ FOVs $D^\tau = \{d_1^\tau, d_2^\tau, \ldots, d_M^\tau\}$.
3:         Extract features f from $d_m^\tau$, $\forall m \in M$.
4:         Apply classifier $h(d_m^\tau, f)$ for initial classification of each $d_m^\tau$.
5:
$$\text{Make aggregate prediction } H(D^\tau, \tau) = \frac{1}{M}\sum_{m=1}^{M} h(d_m^\tau, f) \text{ over all FOVs } D^\tau.$$
6:   end for According to one embodiment, a consensus classification H(D; f), where D={$D^\mathcal{T}: \forall_\mathcal{T} \in T$} is the collective data over all FOV sizes, $H(D^\tau, \tau)$ is a meta-classifier for each $\tau$, and $E_\tau$ is the expectation of $H(D^\tau, \tau)$ at FOV size $\tau$∈T. The mean squared error of classification at individual FOV sizes is given by $e_\tau = E_\tau[y - H(D^\tau, \tau)]^2$ and the error of the consensus predictor is given by $e_A = [y - H(D)]^2$. The consensus classification (i.e., the multi-FOV prediction) H(D; f) is achieved via a consensus prediction across over all FOV sizes. According to one embodiment, the multi-FOV classifier, using as Inputs, Image c, FOV sizes T={$t_1, t_2, \ldots, t_N$}, and Classifier $h(d_m^T; \mathcal{T}; f)$, outputs a consensus classification (i.e., a multi-FOV prediction) H(D; f) for Image c, following the steps described in Algorithm 2:

1:   for all $\tau \in T$ do
2:         From C, define M, $\tau \times \tau$ FOVs $D^\tau = \{d_1^\tau, d_2^\tau, \ldots, d_M^\tau\}$.
3:         Extract features f from $d_m^\tau$, $\forall m \in M$.
4:         Apply classifier $h(d_m^\tau, f)$ for initial classification of each $d_m^\tau$.
5:
$$\text{Make prediction } H(D^\tau; \tau, f) = \frac{1}{M}\sum_{m=1}^{M} h(d_m^\tau; \tau, f) \text{ over all FOVs } D^\tau.$$
6:   end for
7:
$$\text{Make multi-FOV prediction } H(D; f) = \frac{1}{M}\sum_{\tau \in T} H(D^\tau; \tau, f).$$

Proposition 1. Given independent classifiers at FOV sizes $\tau \in T$, $e_\tau \geq e_A$.

Proof $$e_\tau = E_\tau[y - H(D^\tau, \tau)]^2 = y^2 - 2yE_\tau[H(D^\tau, \tau)] + E_\tau[H^2(D^\tau, \tau)]$$

Since $E_\tau[H^2(D^\tau, \tau)] \geq [E_\tau[H(D^\tau, \tau)]]^2$, $$\geq y^2 - 2yE_\tau[H(D^\tau, \tau)] + [E_\tau[H(D^\tau, \tau)]]^2$$
$$\geq y^2 - 2yH(D) + H^2(D)$$
$$\geq [y - H(D)]^2$$
$$\geq e_A$$

Independent predictors at different FOV sizes (reasonable assumption since different information is discernible at different FOV sizes in heterogeneous images) are used as the "weak" classifiers used to build the "strong" consensus result. To this end, Proposition 1 ensures that the consensus error $e_A$ will always be less than the mean error $e_\tau$ of individual FOV size classifiers.

Application of Boosting to Determine Optimal FOV sizes

According to one embodiment, a boosted, multi-FOV classifier $\hat{h}_{B_0}(H, D^\mathcal{T}) = \sum_{j=1}^{I} \alpha_j^T H(\mathcal{T}, \mathcal{T})$ is generated for each FOV size $\tau$∈T, where $H(D^\mathcal{T}, \mathcal{T})$ is the aggregate class prediction at FOV size $\tau$∈T, $\alpha^T$ is used to calculate the weight associated with $H(D^\mathcal{T}, \mathcal{T})$ and I is the number of iterations using a Adaboost algorithm, as described by Schapire (Schapire, R. E. "The boosting approach to machine learning: An overview," in *Nonlin. Est. and Class.*, 2002). The Adaboost algorithm maintains a set of internal weights, D, for each of the training samples which is iteratively updated to choose classifiers that correctly classify "difficult" samples (i.e. samples that are often misclassified). The algorithm is run for ψ iterations to output (1) a modified set of φ pixel-wise classifiers $h_1, h_2, \ldots, h_\phi$, where $h_i \in \{1,0\}$ indicates the output of the highest-weighted classifier, and (2) φ associated weights $\alpha_1, \alpha_2, \ldots, \alpha_T$ for each classifier. Note that $\alpha_1, \alpha_2, \ldots, \alpha_\phi$ reflect the importance of each of the individual features (classifiers) in discriminating cancer maligancy. The result of the ensemble classifier at a specific FOV size is denoted as:

$$A^{Ada} = \sum_{i=1}^{\psi} \alpha_i h_i.$$

Integrated FOV size Prediction via Boosted multi-FOV Classifier

The Adaboost method, described by Schapire (R. E. Schapire, "The boosting approach to machine learning: An overview," in *Nonlin. Est. and Class.*, 2002), allows for weighting of each FOV based on the performance of the boosted classifier at each FOV size. According to one embodiment, a Boosted multi-FOV classifier $h(d_m^\tau, f) = \sum_{j=1}^{T} \alpha_j^f h(d^\tau, f)$, where $h \in \{0,1\}$ is a weak classifier for FOV $d^\tau$ and $\alpha_f$ is used to weight individual features in f based on class discriminability, according to Algorithm 3:

---

Input: Image C. FOV sizes $T = \{t_1, t_2, \ldots, t_N\}$. Strong classifier $h(d_m^\tau, f)$.
Output: Aggregate prediction $H(D^\tau, \tau)$ for each FOV size $\tau \in T$.
1:   for all $\tau \in T$ do
2:        From C, define M, $\tau \times \tau$ FOVs $D^\tau = \{d_1^\tau, d_2^\tau, \ldots, d_M^\tau\}$.
3:        Extract features f from $d_m^\tau$, $\forall m \in M$.
4:        Apply strong classifier $h(d_m^\tau, f)$ for Boosted classification of each $d_m^\tau$.

5:
       Make aggregate prediction $H(D^\tau, \tau) = \dfrac{1}{M} \sum_{m=1}^{M} h(d_m^\tau, f)$ over all FOVs $D^\tau$.

6:   end for

---

System for Image-Based Outcome Prediction

According to another aspect, According to one aspect, the present invention provides a method for analyzing a large, heterogeneous image by a boosted, multi-field-of-view (FOV) framework, comprising:

(a) inputting, via a computing device, the large, heterogeneous image;

(b) generating, via the computing device, a plurality of field-of-views (FOVs) at a plurality of fixed FOV sizes, the method for generating the plurality of FOVs at a plurality of fixed FOV sizes comprising dividing simultaneously, via the computing device, the large, heterogeneous image into (i) a plurality of field-of-views (FOVs) at a first fixed FOV size from among the plurality of fixed FOV sizes; and (ii) a plurality of field-of-views (FOVs) at a second fixed FOV size from among the plurality of fixed FOV sizes;

(c) producing simultaneously for the large, heterogeneous image, via the computing device, a combined class decision for: (i) the plurality of FOVs at the first fixed FOV size, and (ii) the plurality of FOVs at the second fixed FOV size, by:

(1) detecting simultaneously, via the computing device, (i) at least one object to yield at least one detected object from each FOV at the first fixed FOV size, and (ii), at least one object to yield at least one detected object from each FOV at the second fixed FOV size;

(2) extracting simultaneously, via the computing device, (i) at least one image feature of the at least one detected object from each FOV at the first fixed FOV size, and (ii) at least one image feature of the at least one detected object from each FOV at the second fixed FOV size;

(3) training simultaneously, via the computing device, a classifier from: (i) the at least one image feature from each FOV of the plurality of FOVs at the first fixed FOV size, and (ii) the at least one image feature from each FOV for the plurality of FOVs at the second fixed FOV size;

(4) making simultaneously, via the computing device, using the classifier, (i) a first class prediction for each FOV of the plurality of FOVs at the first fixed FOV size based on the at least one image feature from each FOV of the plurality of FOVs at the first fixed FOV size, and (ii) a second class prediction for each FOV of the plurality of FOVs at the second fixed FOV size based on the at least one image feature from each FOV for the plurality of FOVs at the second fixed FOV size; and (5) producing simultaneously, via the computing device, (i) the combined class decision for the plurality of FOVs at the first fixed FOV size, and (ii) the combined class decision for the plurality of FOVs at the second fixed FOV size;

(d) repeating simultaneously, via the computing device, for each plurality of FOVs at the plurality of fixed FOV sizes to generate a plurality of combined class decisions, detecting step (1), extracting step (2), training step (3), making step (4), and producing step (5);

(e) aggregating, via the computing device, using a boosted multi-FOV classifier, the plurality of combined class decisions at each fixed FOV size of the plurality of fixed FOV sizes to yield an aggregated boosted multi-FOV decision, wherein the boosted, multi-field-of-view (multi-FOV) classifier finds optimal FOV sizes for aggregating the plurality of combined class decisions that are outputs of the ensembles at each of the plurality of fixed FOV sizes; and (f) producing, via the computing device, a consensus classification for the large, heterogeneous image, based on the aggregated multi-FOV decision.

(a) A Computing Device Configured to Input the Large, Heterogeneous Image

According to some embodiments, the system for analyzing a large, heterogeneous image, using a boosted multi-field-of-view (FOV) framework, comprises (a) a computing device configured to input the large, heterogeneous image.

According to some such embodiments, the large, heterogeneous image is a microscopic image. In some such embodiments, the large, heterogeneous image is a histopathologic image. In some embodiments, the large, heterogeneous image is a histopathologic image of a diseased tissue. Exemplary diseased tissue includes, but is not limited to, a cancer, an inflammatory disease, Crohn's disease, rheumatoid arthritis, microbial infections, etc. Exemplary cancers include, but are not limited to, prostate cancer, breast cancer, pancreatic cancer, colon cancer, leukemia, lymphoma, myeloma, ovarian cancer, melanoma, lung cancer, glioma, renal-cell cancer, etc. In some such embodiments, the breast cancer is characterized by the presence of at least one immunohistochemical (IHC) marker. Exemplary IHC markers include but are not limited to, estrogen receptor (ER), progesterone receptor (PR), human epidermal growth factor receptor 2 (HER2), Cancer Antigen CA 15-3, Cancer Antigen CA 27.29, carcinoembryonic antigen (CEA), progesterone receptor (PgR), urokinase (uPA), plasminogen activator inhibitor-1 (PAI-1), Cancer Antigen Ki-67, etc.

According to some embodiments, the histopathologic image is stained by a histochemical staining method. Exemplary histochemical staining methods include, but are not limited to, a monoclonal antibody, a polyclonal antibody, CD34, hematoxylin, eosin, Hoeschst stain, 4', 6-diamidino-2-phenylindole (DAPI), etc.

(b) The Computing Device Configured to Generate a plurality of FOVs

According to some embodiments, the system for analyzing a large, heterogeneous image, using a boosted multi-field-of-view (FOV) framework, comprises (b) the computing device configured to generate a plurality of field-of-views (FOVs) at a plurality of fixed FOV sizes by dividing simultaneously the large, heterogeneous image into (i) a plurality of field-of-views (FOVs) at a first fixed FOV size from among the plurality of fixed FOV sizes; and (ii) a plurality of field-of-views (FOVs) at a second fixed FOV size from among the plurality of fixed FOV sizes.

(c) The Computing Device Configured to Produce a Combined Class Decision

According to some embodiments, the system for analyzing a large, heterogeneous image, using a boosted multi-field-of-view (FOV) framework, comprises (c) the computing device configured to produce a combined class decision simultaneously for: (i) the plurality of FOVs at the first fixed FOV size, and (ii) the plurality of FOVs at the second fixed FOV size, wherein the computing device is further configured:

(1) to detect simultaneously (i) at least one object to yield at least one detected object from each FOV at the first fixed FOV size, and (ii), at least one object to yield at least one detected object from each FOV at the second fixed FOV size;

(2) to extract simultaneously (i) at least one image feature of the at least one detected object from each FOV at the first fixed FOV size, and (ii) at least one image feature of the at least one detected object from each FOV at the second fixed FOV size;

(3) to train a classifier capable of identifying simultaneously: (i) the at least one image feature from each FOV of the plurality of FOVs at the first fixed FOV size, and (ii) the at least one image feature from each FOV for the plurality of FOVs at the second fixed FOV size;

(4) to make simultaneously, using the classifier, (i) a first class prediction for each FOV of the plurality of FOVs at the first fixed FOV size based on the at least one image feature from each FOV of the plurality of FOVs at the first fixed FOV size, and (ii), a second class prediction for each FOV of the plurality of FOVs at the second fixed FOV size based on the at least one image feature from each FOV for the plurality of FOVs at the second fixed FOV size; and (5) to produce simultaneously (i) the combined class decision for the plurality of FOVs at the first fixed FOV size, and (ii) the combined class decision for the plurality of FOVs at the second fixed FOV size.

(1) The Computing Device Configured to Detect at Least One Object

According to some embodiments, (c) the computing device configured to produce a combined class decision is further configured (1) to detect simultaneously (i) at least one object to yield at least one detected object from each FOV at the first fixed FOV size, and (ii), at least one object to yield at least one detected object from each FOV at the second fixed FOV size.

According to some embodiments, the at least one object is selected from the group consisting of cells, nuclei, lumen, tubules, adipose, stroma, and a combination thereof. Exemplary cells include but are not limited to epithelial cells, breast cancer cells, prostate cancer cells, lung cancer cells, pancreatic cancer cells, colon cancer cells, bone cancer cells, lymphocytes, and any other pluripotent cancer cells. According to some such embodiments, the at least one object include nuclei.

According to some embodiments, the at least one object is automatically detected by using a color deconvolution to isolate a stain used to stain the image, such as described in Ruifrok et al. (Ruifrok A. C. et al., "Quantification of histochemical staining by color deconvolution.," Anal Quant Cytol Histol, August 2001, 23(4): 291-299) and Basavanhally et al. (Basavanhally, A. et al., "Incorporating domain knowledge for tubule detection in breast histopathology using o' callaghan neighborhoods," in SPIE Medical Imaging, ser. Computer-Aided Diagnosis, 2011, 7963(1): 10). Color deconvolution is an image processing technique for color space transformation, that converts each FOV from a Red-Green-Blue (RGB) color space to a new color space defined by a stain channel (e.g. hematoxylin, eosin), and a background channel (i.e. white). Centroids of individual nuclei are then identified by applying a morphological opening operation to the resulting stain channel.

Color deconvolution converts an RGB space g to a new color space a comprising hematoxylin H (i.e. purple), eosin E (i.e. pink), and background K (i.e. white) channels. The relationship between color spaces g and a is defined as f=Ma, where the transformation matrix is given by $$M = \begin{bmatrix} \hat{H}_R & \hat{H}_G & \hat{H}_B \\ \hat{E}_R & \hat{E}_G & \hat{E}_B \\ \hat{K}_R & \hat{K}_G & \hat{K}_B \end{bmatrix},$$

where $\hat{H}_R$, $\hat{H}_G$, and $\hat{H}_B$ denote the pre-defined, normalized red, green, and blue values, respectively, for the H channel. The second and third rows of M are defined analogously for the E and K channels, respectively. The intensity of a pixel c in the new color space is defined as $a(c)=M^{-1}(c)_g(c)$, where g and a are 3×1 column vectors.

According to one embodiment, the at least one object is automatically detected by using color deconvolution to isolate a stain used to stain the image, wherein the stain is hematoxylin.

According to some embodiments, (c) the computing device configured to produce a combined class decision further configured (1) to detect is further configured (i) to simultaneously convert each FOV at the first fixed FOV size to a stain color channel, and a background channel, to yield the at least one detected object from each FOV at the first fixed FOV size, and (ii) to simultaneously convert each FOV at the second fixed FOV size to the stain color channel, and the background channel to yield the at least one detected object from each FOV at the second fixed FOV size. According to some such embodiments, the stain color channel is selected from the group consisting of a hematoxylin channel, an eosin channel, a 6-diamidino-2-phenylindole (DAPI) channel, a Hoeschst stain channel, and a combination thereof. According to one embodiment, the stain color channel comprises a hematoxylin channel. According to one embodiment, the stain color channel comprises an eosin channel. According to one embodiment, the stain color channel comprises a 6-diamidino-2-phenylindole (DAPI) channel. According to one embodiment, the stain color channel comprises a Hoeschst stain channel. According to one embodiment, the background channel comprises a white channel. [Inventors please advise other possible background colors you wish to include].

According to one embodiment, a FOV is disqualified from further analysis if (a) at least 50% of the FOV does not fall within an annotation denoting invasive cancer or (b) a minimum of 20 objects, such as nuclei, are not detected within the FOV. FIG. 1 illustrates an exemplary annotation enclosing a region of a breast cancer histopathologic image denoting invasive cancer.

(2) The Computing Device Configured to Extract at Least One Image Feature

According to some embodiments, (c) the computing device configured to produce a combined class decision is further configured (2) to extract simultaneously (i) at least one image feature of the at least one detected object from each FOV at the first fixed FOV size, and (ii) at least one image feature of the at least one detected object from each FOV at the second fixed FOV size.

According to some embodiments, the at least one detected object is selected from the group consisting of cells, nuclei, lumen, tubules, adipose, stroma, and a combination thereof. Exemplary cells include but are not limited to epithelial cells, breast cancer cells, prostate cancer cells, lung cancer cells, pancreatic cancer cells, colon cancer cells, bone cancer cells, lymphocytes, and any other pluripotent cancer cells. According to some such embodiments, the at least one detected object includes nuclei. According to one embodiment, the at least one detected object includes cancer nuclei.

According to some embodiments, for each FOV denoted as $d^\tau_m$, at least one image feature denoted as $f(d^\tau_m)$ is extracted, where d denotes an individual FOV, τ denotes the number of pixels within the FOV and m denotes the $m^{th}$ FOV. According to some embodiments, the at least one image feature is a quantitative image feature. Exemplary quantitative image features include, but are not limited to, nuclear architecture (denoted as $f_{NA}$) and nuclear texture (denoted as $f_{NT}$). Nuclear architecture and nuclear texture reflect the phenotypic variations seen across BCa grades.

According to some embodiments, the at least one image feature of the at least one detected object from each FOV describes a spatial arrangement of the at least one detected object.

Extracting Nuclear Architecture Step

According to some embodiments, the at least one image feature of the at least one detected object from each FOV is nuclear architecture. According to one embodiment, the at least one image feature of the at least one detected object from each FOV at the first fixed FOV size is nuclear architecture. According to one embodiment, the at least one image feature of the at least one detected object from each FOV at the second fixed FOV size is nuclear architecture.

According to some such embodiments, (c) the computing device configured to produce a combined class decision further configured (2) to extract simultaneously (i) at least one image feature of the at least one detected object from each FOV at the first fixed FOV size, and (ii) at least one image feature of the at least one detected object from each FOV at the second fixed FOV size, is further configured:

(I) to quantify simultaneously (i) the at least one image feature of the at least one detected object from each FOV at the first fixed FOV size to yield a quantifiable signature feature of the at least one detected object from each FOV at the first fixed FOV size, and (ii) the at least one image feature of the at least one detected object from each FOV at the second fixed FOV size to yield a quantifiable signature feature of the at least one detected object from each FOV at the second fixed FOV size;

(II) to select at least one reference feature in a dataset comprising reference features according to a minimum Redundancy Maximum Relevance (mRMR) feature selection scheme to identify a selected subset of reference features; and (III) to discriminate simultaneously (i) the quantifiable signature feature from each FOV at the first fixed FOV size from the selected subset of reference features, and (ii) the quantifiable signature feature from each FOV at the second fixed FOV size from the selected subset of reference features;

wherein the at least one image feature is nuclear architecture.

According to some such embodiments, (c) the computing device configured to produce a combined class decision, further configured (2) to extract simultaneously (i) at least one image feature of the at least one detected object from each FOV at the first fixed FOV size, and (ii) at least one image feature of the at least one detected object from each FOV at the second fixed FOV size, and (I) to quantify simultaneously (i) the at least one image feature of the at least one detected object from each FOV at the first fixed FOV size to yield a quantifiable signature feature of the at least one detected object from each FOV at the first fixed FOV size, and (ii) the at least one image feature of the at least one detected object from each FOV at the second fixed FOV size to yield a quantifiable signature feature of the at least one detected object from each FOV at the second fixed FOV size.

(I) The Computing Device Further Configured to Quantify Nuclear Architecture

According to one embodiment, (c) the computing device configured to produce a combined class decision, further configured (2) to extract simultaneously (i) at least one image feature of the at least one detected object from each FOV at the first fixed FOV size, and (ii) at least one image feature of the at least one detected object from each FOV at the second fixed FOV size, and (I) to quantify simultaneously (i) the at least one image feature of the at least one detected object from each FOV at the first fixed FOV size to yield a quantifiable signature feature of the at least one detected object from each FOV at the first fixed FOV size, and (ii) the at least one image feature of the at least one detected object from each FOV at the second fixed FOV size to yield a quantifiable signature feature of the at least one detected object from each FOV at the second fixed FOV size is further configured to quantify the at least one image feature using the at least one detected object as at least one vertex for the construction of a graph, wherein the graph is selected from the group consisting of a Voronoi Diagram (VD), a Delaunay Triangulation (DT) graph, a Minimum Spanning Tree (MST), a Nearest Neighbor (NN) graph, or a combination thereof, wherein the at least one image feature is nuclear architecture. The term "vertex" or its plural "vertices" as used herein refer to the centroids of detected nuclei.

According to one embodiment, (c) the computing device configured to produce a combined class decision, further configured (2) to extract simultaneously (i) at least one image feature of the at least one detected object from each FOV at the first fixed FOV size, and (ii) at least one image feature of the at least one detected object from each FOV at the second fixed FOV size, and (I) to quantify simultaneously (i) the at least one image feature of the at least one detected object from each FOV at the first fixed FOV size to yield a quantifiable signature feature of the at least one detected object from each FOV at the first fixed FOV size, and (ii) the at least one image feature of the at least one detected object from each FOV at the second fixed FOV size to yield a quantifiable signature feature of the at least one detected object from each FOV at the second fixed FOV size. is further configured to quantify the at least one image feature using the at least one detected object as at least one vertex for the construction of a Voronoi Diagram (VD).

According to one embodiment, (c) the computing device configured to produce a combined class decision, further configured (2) to extract simultaneously (i) at least one image feature of the at least one detected object from each FOV at the first fixed FOV size, and (ii) at least one image feature of the at least one detected object from each FOV at the second fixed FOV size, and (I) to quantify simultaneously (i) the at least one image feature of the at least one detected object from each FOV at the first fixed FOV size to yield a quantifiable signature feature of the at least one detected object from each FOV at the first fixed FOV size, and (ii) the at least one image feature of the at least one detected object from each FOV at the second fixed FOV size to yield a quantifiable signature feature of the at least one detected object from each FOV at the second fixed FOV size, is further configured to quantify the at least one image feature using the at least one detected object as at least one vertex for the construction of a Delaunay Triangulation (DT) graph.

According to one embodiment, (c) the computing device configured to produce a combined class decision, further configured (2) to extract simultaneously (i) at least one image feature of the at least one detected object from each FOV at the first fixed FOV size, and (ii) at least one image feature of the at least one detected object from each FOV at the second fixed FOV size, and (I) to quantify simultaneously (i) the at least one image feature of the at least one detected object from each FOV at the first fixed FOV size to yield a quantifiable signature feature of the at least one detected object from each FOV at the first fixed FOV size, and (ii) the at least one image feature of the at least one detected object from each FOV at the second fixed FOV size to yield a quantifiable signature feature of the at least one detected object from each FOV at the second fixed FOV size is further configured to quantify the at least one image feature using the at least one detected object as at least one vertex for the construction of a Minimum Spanning Tree (MST).

According to one embodiment, (c) the computing device configured to produce a combined class decision, and (2) to extract simultaneously (i) at least one image feature of the at least one detected object from each FOV at the first fixed FOV size, and (ii) at least one image feature of the at least one detected object from each FOV at the second fixed FOV size, and (I) to quantify simultaneously (i) the at least one image feature of the at least one detected object from each FOV at the first fixed FOV size to yield a quantifiable signature feature of the at least one detected object from each FOV at the first fixed FOV size, and (ii) the at least one image feature of the at least one detected object from each FOV at the second fixed FOV size to yield a quantifiable signature feature of the at least one detected object from each FOV at the second fixed FOV size is further configured to quantify the at least one image feature using the at least one detected object as at least one vertex for the construction of a Nearest Neighbor (NN) graph.

The term "graph" as used herein refers to a set of vertices (e.g. each vertex corresponding to a BCa nucleus) with corresponding edges connecting all detected objects, e.g. nuclei. For a particular FOV, the Voronoi Diagram (VD) constructs a polygon around each nucleus such that each pixel in the image falls into the polygon associated with the nearest nucleus. The Delaunay Triangulation (DT) graph is a dual graph of the Voronoi Diagram and is constructed such that nuclei with adjacent regions are connected by an edge (FIGS. 7(e)-(g)). The Minimum Spanning Tree (MST) connects all nuclei in the image while minimizing the total length of all edges. A nearest neighbor (NN) graph is constructed by creating edges between a given vertex and neighboring vertices. Neighboring vertices may be defined in a number of ways including the selection of k-nearest neighbors or by a fixed maximum distance constraint.

According to some embodiments, at least one image feature for each FOV is extracted from the Voronoi Diagram (VD). Exemplary image features extracted from the Voronoi Diagram (VD) include, but are not limited to, total area of polygons, polygon area (e.g., mean, standard deviation, minimum ratio, maximum ratio, disorder, etc.), polygon perimeter (e.g. mean, standard deviation, minimum ratio, maximum ratio, disorder, etc.), and polygon chord length (e.g. mean, standard deviation, minimum ratio, maximum ratio, disorder, etc.). According to some embodiments, at least one image feature for each FOV is extracted from the Delaunay Triangulation (DT) graph. Exemplary image features extracted from the Delaunay Triangulation (DT) graph include but is not limited to triangle side length (e.g. mean, standard deviation, minimum ratio, maximum ratio, disorder, etc.), and triangle area length (e.g. mean, standard deviation, minimum ratio, maximum ratio, disorder, etc.). According to some embodiments, at least one image feature for each FOV is extracted from the Minimum Spanning Tree (MST) graph. Exemplary image features extracted from the Minimum Spanning Tree (MST) graph include, but are not limited to, edge length (e.g. mean, standard deviation, minimum ratio, maximum ratio, disorder, etc.). According to some embodiments, at least one image feature for each FOV is extracted from the Nearest Neighbor (NN) graph. Exemplary image features extracted from the Nearest Neighbor (NN) graph include, but are not limited to, nuclear density, distance to 2 nearest nuclei (e.g. mean, standard deviation, disorder, etc.), distance to 3 nearest nuclei (e.g. mean, standard deviation, disorder, etc.), distance to 4 nearest nuclei (e.g. mean, standard deviation, disorder, etc.), distance to 5 nearest nuclei (e.g. mean, standard deviation, disorder, etc.), distance to 6 nearest nuclei (e.g. mean, standard deviation, disorder, etc.), distance to 7 nearest nuclei (e.g. mean, standard deviation, disorder, etc.), distance to 8 nearest nuclei (e.g. mean, standard deviation, disorder, etc.), distance to 9 nearest nuclei (e.g. mean, standard deviation, disorder, etc.), distance to 10 nearest nuclei (e.g. mean, standard deviation, disorder, etc.), the number of nuclei in a 5 μm radius (e.g. mean, standard deviation, disorder, etc.), the number of nuclei in a 10 μm radius (e.g. mean, standard deviation, disorder, etc.), the number of nuclei in a 15 μm radius (e.g. mean, standard deviation, disorder, etc.), the number of nuclei in a 20 μm radius (e.g. mean, standard deviation, disorder, etc.), the number of nuclei in a 25 μm radius (e.g. mean, standard deviation, disorder, etc.), the number of nuclei in a 30 μm radius (e.g. mean, standard deviation, disorder, etc.), the number of nuclei in a 35 μm radius (e.g. mean, standard deviation, disorder, etc.), the number of nuclei in a 40 μm radius (e.g. mean, standard deviation, disorder, etc.), the number of nuclei in a 45 μm radius (e.g. mean, standard deviation, disorder, etc.), and the number of nuclei in a 50 μm radius (e.g. mean, standard deviation, disorder, etc.).

(II) the Computing Device Configured to Select at Least One Reference Feature for Nuclear Architecture According to one embodiment, (c) the computing device configured to produce a combined class decision, further configured (2) to extract simultaneously (i) at least one image feature of the at least one detected object from each FOV at the first fixed FOV size, and (ii) at least one image feature of the at least one detected object from each FOV at the second fixed FOV size is further configured (II) to select at least one reference feature in a dataset comprising reference features according to a minimum Redundancy Maximum Relevance (mRMR) feature selection scheme to identify a selected subset of reference features, wherein the at least one image feature is nuclear architecture.

A large number of image descriptive features is highly desirable in terms of distinguishing patients based on BR grade. However, large feature sets present practical limitations in data classification such as dimensionality, which calls for an exponential growth in the data cohort for each additional feature used, as described by Bellman R. (Bellman R. and R. Corporation, Dynamic programming, ser. Rand Corporation research study. Princeton University Press, 1957). Such large feature sets also have redundant features that do not provide additional class discriminatory information.

According to one embodiment, the minimum Redundancy Maximum Relevance (mRMR) feature selection scheme is used to identify a selected subset of reference features, as described by Peng et al. (Peng, H. et al., "Feature selection based on mutual information criteria of max-dependency, max-relevance, and min-redundancy," IEEE Trans. Pattern Anal. Mach. Intell., 2005, 27(8): 1226-1238). According to one embodiment, the minimum Redundancy Maximum Relevance (mRMR) feature selection scheme used to identify a selected subset of reference features address both limitations for using large features sets including dimensionality and redundant features. A minimum Redundancy Maximum Relevance (mRMR) method previously has been described for use in various biomedical applications ranging from the isolation of salient genes in microarray data, as described by Ding et al. (Ding, C. et al. "Minimum redundancy feature selection from microarray gene expression data," J Bioinform Comput Biol, April 2005, 3(2): 185-205) to insight into drug interactions of various protein groups, as described by He et al. (He, Z. et al., "Predicting drug-target interaction networks based on functional groups and biological features," PLoS ONE, 2010, 5(3): e9603).

According to one embodiment, the minimum Redundancy Maximum Relevance (mRMR) feature selection scheme selects, in a set f comprising a reference feature, a subset $\bar{f} \in f$ that maximizes "relevance" and minimizes "redundancy" between individual image features. According to one embodiment, a reference feature $f_j$ is incrementally included in subset $\bar{f}$ based on the criteria described in Equation (1):

$$f_j = \underset{f_j \in 1-\bar{1}}{\mathrm{argmax}} \left[ I(f_j, y) - \frac{1}{|\bar{f}|-1} \sum_{f_i \in \bar{f}} I(f_j, f_i) \right], \quad (1)$$

where I is mutual information, y is the class label associated with a given sample, and $|\bar{f}|$ represents cardinality of the selected feature subset $\bar{f}$. According to one embodiment, the reference feature subset $\bar{f}_{NA} \in f_{NA}$ comprises features related to nuclear architecture based on their ability to distinguish BCa histopathology slides with low, intermediate, and high BR grades.

(III) Discriminating Quantifiable Signature

According to one embodiment, (c) the computing device configured to produce a combined class decision, further configured (2) to extract simultaneously (i) at least one image feature of the at least one detected object from each FOV at the first fixed FOV size, and (ii) at least one image feature of the at least one detected object from each FOV at the second fixed FOV size is further configured (III) to discriminate simultaneously (i) the quantifiable signature feature of the at least one detected object from each FOV at the first fixed FOV size from the selected subset of reference features, and (ii) the quantifiable signature feature of the at least one detected object from each FOV at the second fixed FOV size from the selected subset of reference features, wherein the at least one image feature is nuclear architecture.

The Computing Device Configured to Extract Nuclear Texture

According to one embodiment, the at least one image feature describing spatial distribution of at least one object from each FOV is nuclear texture.

According to some such embodiments, (c) the computing device configured to produce a combined class decision, further configured (2) to extract simultaneously (i) at least one image feature of the at least one detected object from each FOV at the first fixed FOV size, and (ii) at least one image feature of the at least one detected object from each FOV at the second fixed FOV size is further configured:

(I) to segment simultaneously (i) the at least one detected object from each FOV at the first fixed FOV size to yield at least one segmented object from each FOV at the first fixed FOV size, and (ii) the at least one detected object from each FOV at the second fixed FOV size to yield at least one segmented object from each FOV at the second fixed FOV size;

(II) to quantify simultaneously (i) the at least one image feature of the at least one segmented object from each FOV at the first fixed FOV size to yield a quantifiable signature feature from each FOV at the first fixed FOV size, and (ii) the at least one image feature of at least one segmented object from each FOV at the second fixed FOV size to yield a quantifiable signature feature from each FOV at the second fixed FOV size;

(III) to select at least one reference feature in a dataset comprising reference features according to a minimum Redundancy Maximum Relevance (mRMR) feature selection scheme to identify a selected subset of reference features; and (IV) to discriminate simultaneously (i) the quantifiable signature feature from each FOV at the first fixed FOV size from the selected subset of reference features, and (ii) the quantifiable signature feature from each FOV at the second fixed FOV size from the selected subset of reference features;

wherein the at least one image feature is nuclear texture.

(I) The Computing Device Configured to Segment the at least one Detected Object from Each FOV According to some such embodiments, (c) the computing device configured to produce a combined class decision, further configured (2) to extract simultaneously (i) at least one image feature of the at least one detected object from each FOV at the first fixed FOV size, and (ii) at least one image feature of the at least one detected object from each FOV at the second fixed FOV size is further configured (I) to segment simultaneously (i) the at least one detected object from each FOV at the first fixed FOV size to yield at least one segmented object from each FOV at the first fixed FOV size, and (ii) the at least one detected object from each FOV at the second fixed FOV size to yield at least one segmented object from each FOV at the second fixed FOV size.

According to one embodiment, (c) the computing device configured to produce a combined class decision, further configured (2) to extract simultaneously (i) at least one image feature of the at least one detected object from each FOV at the first fixed FOV size, and (ii) at least one image feature of the at least one detected object from each FOV at the second fixed FOV and further configured (I) to segment simultaneously (i) the at least one detected object from each FOV at the first fixed FOV size to yield at least one segmented object from each FOV at the first fixed FOV size, and (ii) the at least one detected object from each FOV at the second fixed FOV size to yield at least one segmented object from each FOV at the second fixed FOV size, is further configured (A) to initialize a color gradient-based geodesic active contour (CGAC) model by simultaneously (i) using the stain color channel for the at least one detected object from each FOV at the first fixed FOV size to compute initial object boundaries, and (ii) using the stain color channel for the at least one detected object from each FOV at the second fixed FOV size to compute initial object boundaries; and (B) to compute simultaneously (i) final object boundaries based on the initial object boundaries computed in step (A) by defining a mask surrounding the at least one detected object from each FOV at the first fixed FOV size to yield the at least one segmented object from each FOV at the first fixed FOV size, and (ii) final object boundaries based on the initial object boundaries computed in step (A) by defining a mask surrounding the at least one detected object from each FOV at the second fixed FOV size to yield the at least one segmented object from each FOV at the second fixed FOV size.

According to one embodiment, (c) the computing device configured to produce a combined class decision, further configured (2) to extract simultaneously (i) at least one image feature of the at least one detected object from each FOV at the first fixed FOV size, and (ii) at least one image feature of the at least one detected object from each FOV at the second fixed FOV size; (I) to segment simultaneously (i) the at least one detected object from each FOV at the first fixed FOV size to yield at least one segmented object from each FOV at the first fixed FOV size, and (ii) the at least one detected object from each FOV at the second fixed FOV size to yield at least one segmented object from each FOV at the second fixed FOV size, and (A) to initialize a color gradient-based geodesic active contour (CGAC) model is further configured to combine gradient information from each channel in the RGB color space using the color gradient-based geodesic active contour (CGAC) model. The CGAC model, described in Xu et al. (Xu, J. et al., "A high throughput active contour scheme for segmentation of histopathological imagery," Medical Image Analysis, vol. In Press, p. Corrected Proof, 2011. [Online]. Available at sciencedirect.com/science/article/pii/S136184151100048X) can be used. In contrast, traditional geodesic active contour (GAC) models are driven by the less informative grey scale gradient. The final boundaries of the CGAC model are used to define a mask denoting nuclear regions. The color gradient-based geodesic active contour (CGAC) model enhances the traditional GAC model by using a local structure tensor based color gradient instead of the grayscale gradient. This change results in a clear improvement in edge detection and final segmentation.

(II) The Computing Device Configured to Quantify Nuclear Texture

According to some such embodiments, (c) the computing device configured to produce a combined class decision, further configured (2) to extract simultaneously (i) at least one image feature of the at least one detected object from each FOV at the first fixed FOV size, and (ii) at least one image feature of the at least one detected object from each FOV at the second fixed FOV size, is further configured (II) to quantify simultaneously (i) the at least one image feature of the at least one segmented object from each FOV at the first fixed FOV size to yield a quantifiable signature feature from each FOV at the first fixed FOV size, and (ii) the at least one image feature of at least one segmented object from each FOV at the second fixed FOV size to yield a quantifiable signature feature from each FOV at the second fixed FOV size, wherein the at least one image feature is nuclear texture.

According to one embodiment, (c) the computing device configured to produce a combined class decision, further configured (2) to extract simultaneously (i) at least one image feature of the at least one detected object from each FOV at the first fixed FOV size, and (ii) at least one image feature of the at least one detected object from each FOV at the second fixed FOV size and further configured (II) to quantify simultaneously (i) the at least one image feature of the at least one segmented object from each FOV at the first fixed FOV size to yield a quantifiable signature feature from each FOV at the first fixed FOV size, and (ii) the at least one image feature of at least one segmented object from each FOV at the second fixed FOV size to yield a quantifiable signature feature from each FOV at the second fixed FOV size, is further configured to extract Haralick co-occurrence features from each FOV using the mask surrounding the at least one detected object from each FOV. A method described in Gurcan et al. (Gurcan, M. N. et al., "Histopathological image analysis: A review," *IEEE Rev Biomed Eng*, 2009, 2: 147-171) and Doyle et al. (Doyle, S. et al., "A boosted bayesian multi-resolution classifier for prostate cancer detection from digitized needle biopsies," *Biomedical Engineering, IEEE Transactions on*, 2010, PP(99): 1) to extract Haralick features can be used.

According to one embodiment, (c) the computing device configured to produce a combined class decision, further configured (2) to extract simultaneously (i) at least one image feature of the at least one detected object from each FOV at the first fixed FOV size, and (ii) at least one image feature of the at least one detected object from each FOV at the second fixed FOV size and further configured (II) to quantify simultaneously (i) the at least one image feature of the at least one segmented object from each FOV at the first fixed FOV size to yield a quantifiable signature feature from each FOV at the first fixed FOV size, and (ii) the at least one image feature of at least one segmented object from each FOV at the second fixed FOV size to yield a quantifiable signature feature from each FOV at the second fixed FOV size, is further configured: (i) to transform each FOV at the first fixed FOV size and each FOV at the second fixed FOV size from the Red-Green-Blue (RGB) color space to a Hue-Saturation-Value (HSV) color space; (ii) to construct a co-occurrence matrix at each relevant pixel of each FOV at the first fixed FOV size for each of the three channels of the HSV color space and a co-occurrence matrix at each relevant pixel of each FOV at the second fixed FOV size for each of the three channels of the HSV color space to quantify the frequency of pixel intensities in a fixed neighborhood; and (iii) to extract a set of Haralick features from the co-occurrence matrices for each of the three channels of the HSV color space by repeating constructing step (ii) and extracting step (iii) for each of the three channels of the HSV color space.

According to one embodiment, (c) the computing device configured to produce a combined class decision, further configured (2) to extract simultaneously (i) at least one image feature of the at least one detected object from each FOV at the first fixed FOV size, and (ii) at least one image feature of the at least one detected object from each FOV at the second fixed FOV size, further configured (II) to quantify simultaneously (i) the at least one image feature of the at least one segmented object from each FOV at the first fixed FOV size to yield a quantifiable signature feature from each FOV at the first fixed FOV size, and (ii) the at least one image feature of at least one segmented object from each FOV at the second fixed FOV size to yield a quantifiable signature feature from each FOV at the second fixed FOV size, is further configured: (i) to transform each FOV at the first fixed FOV size and each FOV at the second fixed FOV size from the Red-Green-Blue (RGB) color space to a Hue-Saturation-Value (HSV) color space, according to a method described by Jain (A. K. Jain, Fundamentals of Digital Image Processing. Prentice Hall, 1989). A method for extracting Haralick features is described by (Haralick, R. M. et al., "Textural features for image classification," *IEEE Transactions on Systems, Man and Cybernetics*, November 1973, 3(6): 610-621).

Exemplary Haralick features extracted from the co-occurrence matrices include, but are not limited to, angular second Moment described as $$f_1 = \sum_i \sum_j \{p(i,j)\}^2;$$

contrast described as $$f_2 = \sum_{n=0}^{N_g-1} n^2 \left\{ \sum_{\substack{i=1 \\ |i-j|=n}}^{N_g} \sum_{j=1}^{N_g} p(i,j) \right\}$$

correlation described as $$f_3 = \frac{\sum_i \sum_j (i,j)p(i,j) - \mu_x \mu_y}{\sigma_x \sigma_y}$$

where $\mu_x$, $\mu_y$, $\sigma_x$, and $\sigma_y$ are the means and standard deviations of $p_x$ and $p_y$; sum of squares (variance) described as $$f_4 = \sum_i \sum_j (i-\mu)^2 p(i,j)$$

inverse difference moment described as $$f_5 = \sum_i \sum_j \frac{1}{1+(i-j)^2} p(i,j)$$

sum average described as $$f_6 = \sum_{i=2}^{2N_g} i p_{x+y}(i)$$

sum variance described as $$f_7 = \sum_{i=2}^{2N_g} (i-f_8)^2 p_{x+y}(i)$$

sum entropy described as $$f_8 = -\sum_{i=2}^{2N_g} p_{x+y}(i) \log(p_{x+y}(i))$$

entropy described as $$f_9 = -\sum_i \sum_j p(i,j) \log(p(i,j))$$

difference variance described as $f_{10}$=variance of $p_{x-y}$; difference entropy described as $$f_{11} = -\sum_{i=0}^{N_g-1} p_{x-y}(i) \log(p_{x-y}(i))$$

information measures of correlation described as $$f_{12} = \frac{HXY - HXY1}{\max(HX, HY)}$$

$$f_{13} = (1 - \exp[-2.0(HXY2 - HXY)])^{1/2}$$

$$HXY = -\sum_i \sum_j p(i,j) \log(p(i,j))$$

where HX and HY are entropies of $p_x$ and $p_y$, and $$HXY1 = -\sum_i \sum_j p(i,j) \log\{p_x(i) p_y(j)\}$$

$$HXY2 = -\sum_i \sum_j p_x(i) p_y(j) \log\{p_x(i) p_y(j)\}$$

and maximum correlation coefficient described as $f_{14}$=(SecondlargestEigenvalueofQ)$^{1/2}$, where $$Q(i,j) = \sum_k \frac{p(i,k) p(j,k)}{p_x(i) p_y(k)}.$$

Notation p(i,j) (i,j)th entry in a normalized gray-tone spatial-dependence matrix, =P(i,j)/R.

$p_x$(i)ith entry in the marginal-probability matrix obtained by summing the rows of p(i,j), $=\sum_{j=1}^{N_g} P(i,j)$.

$N_g$ Number of distinct gray levels in the quantized image.

$$\sum_i \text{ and } \sum_j \sum_{i=1}^{N_g} \text{ and } \sum_{j=1}^{N_g}, \text{ respectively.}$$

$$p_y(j) = \sum_{i=1}^{N_g} p(i, j).$$

$$p_{x+y}(k) = \sum_{\substack{i=1 \\ i+j=k}}^{N_g} \sum_{j=1}^{N_g} p(i, j), \quad k = 2, 3, \ldots, 2N_g.$$

$$p_{x-y}(k) = \sum_{\substack{i=1 \\ |i-j|=k}}^{N_g} \sum_{j=1}^{N_g} p(i, j), \quad k = 0, 1, \ldots, N_g - 1.$$

FIG. 7(h)-(k)) shows the Haralick texture "Contrast Variance" for segmented nuclei at different FOV sizes.

The task is repeated for each of the three channels in the HSV color space, resulting in a total of 117 nuclear texture features $f_{NT}(d^\tau_m)$ for each FOV $d^\tau_m$ (III) The Computing Device Configured to Select at least one Reference Feature for Nuclear Texture According to one embodiment, (c) the computing device configured to produce a combined class decision, further configured (2) to extract simultaneously (i) at least one image feature of the at least one detected object from each FOV at the first fixed FOV size, and (ii) at least one image feature of the at least one detected object from each FOV at the second fixed FOV size is further configured (III) to select at least one reference feature in a dataset comprising reference features according to a minimum Redundancy Maximum Relevance (mRMR) feature selection scheme to identify a selected subset of reference features, wherein the at least one image feature is nuclear texture.

The minimum Redundancy Maximum Relevance (mRMR) feature selection scheme is used to identify a selected subset of reference features, as described by Peng et al. (Peng, H. et al., "Feature selection based on mutual information criteria of max-dependency, max-relevance, and min-redundancy," IEEE Trans. Pattern Anal. Mach. Intell., 2005, 27(8): 1226-1238) can be used. According to one embodiment, the minimum Redundancy Maximum Relevance (mRMR) feature selection scheme used to identify a selected subset of reference features address both limitations for using large features sets including dimensionality and redundant features. A minimum Redundancy Maximum Relevance (mRMR) method has been previously described for use in various biomedical applications ranging from the isolation of salient genes in microarray data, as described by Ding et al. (Ding, C. et al. "Minimum redundancy feature selection from microarray gene expression data," J Bioinform Comput Biol, April 2005, 3(2): 185-205) to insight into drug interactions of various protein groups, as described by He et al. (He, Z. et al., "Predicting drug-target interaction networks based on functional groups and biological features," PLoS ONE, 2010, 5(3): e9603).

According to one embodiment, the minimum Redundancy Maximum Relevance (mRMR) feature selection scheme selects, in a set f comprising reference feature, a subset $\bar{f} \in f$ that maximizes "relevance" and minimizes "redundancy" between individual image features. According to one embodiment, a reference feature $f_j$ is incrementally included in subset $\bar{f}$ based on the criteria described in Equation (1):

$$f_j = \underset{f_j \in 1-\bar{1}}{\mathrm{argmax}} \left[ I(f_j, y) - \frac{1}{|\bar{f}|-1} \sum_{f_i \in \bar{f}} I(f_j, f_i) \right], \quad (1)$$

where I is mutual information, y is the class label associated with a given sample, and |$\bar{f}$| represents cardinality of the selected feature subset $\bar{f}$. According to one embodiment, the reference feature subset $\bar{f}_{NT} \in f_{NT}$ comprises features related to nuclear texture based on their ability to distinguish BCa histopathology slides with low, intermediate, and high BR grades.

(IV) the Computing Device Configured to Discriminate Quantifiable Signature

According to one embodiment, (c) the computing device configured to produce a combined class decision, further configured (2) to extract simultaneously (i) at least one image feature of the at least one detected object from each FOV at the first fixed FOV size, and (ii) at least one image feature of the at least one detected object from each FOV at the second fixed FOV size is further configured (IV) to discriminate simultaneously (i) the quantifiable signature feature from each FOV at the first fixed FOV size from the selected subset of reference features, and (ii) the quantifiable signature feature from each FOV at the second fixed FOV size from the selected subset of reference features, wherein the at least one image feature is nuclear texture.

(3) The Computing Device Configured to Train a Classifier

According to some embodiments, (c) the computing device configured to produce a combined class decision, is further configured (3) to train simultaneously, via the computing device, a classifier identifying: (i) the at least one image feature from each FOV of the plurality of FOVs at the first fixed FOV size, and (ii) the at least one image feature from each FOV for the plurality of FOVs at the second fixed FOV size.

(4) The Computing Device Configured to Make a Class Prediction

According to some embodiments, (c) the computing device configured to produce a combined class decision, is further configured (4) to make simultaneously, using the classifier, (i) a first class prediction for each FOV of the plurality of FOVs at the first fixed FOV size based on the at least one image feature from each FOV of the plurality of FOVs at the first fixed FOV size, and (ii), a second class prediction for each FOV of the plurality of FOVs at the second fixed FOV size based on the at least one image feature from each FOV for the plurality of FOVs at the second fixed FOV size.

(5) The Computing Device Configured to Produce the Combined Class Decision

According to some embodiments, (c) the computing device configured to produce a combined class decision, is further configured (5) to produce simultaneously (i) the combined class decision for the plurality of FOVs at the first fixed FOV size, and (ii) the combined class decision for the plurality of FOVs at the second fixed FOV size.

(d) The Computing Device Configured to Repeat the Steps to Produce Combined Class Decisions for all FOV sizes According to some embodiments, the system for analyzing a large, heterogeneous image, using a boosted multi-field-of-view (FOV) framework, comprises computing device (d) configured to generate a plurality of combined class decisions by repeating simultaneously, for each plurality of FOVs at the plurality of fixed FOV sizes, detecting step (1), extracting step (2), training step (3), making step (4), and producing step (5) in (c).

(e) The Computing Device Configured to Aggregate the Combined Class Decisions to Yield the Boosted, Multi-field-of-view (Multi-FOV) Decision According to some embodiments, the system for analyzing a large, heterogeneous image, using a boosted multi-field-of-view (FOV) framework, comprises (e) the computing device configured to aggregate, using a boosted multi-FOV classifier, the plurality of combined class decisions at each fixed FOV size of the plurality of fixed FOV sizes to yield an aggregated boosted multi-FOV decision, wherein the boosted, multi-field-of-view (multi-FOV) classifier finds optimal FOV sizes for aggregating the plurality of combined class decisions that are outputs of the ensembles at each of the plurality of fixed FOV sizes.

(f) The Computing Device Configured to Produce a Consensus Classification

According to some embodiments, the system for analyzing a large, heterogeneous image, using a boosted multi-field-of-view (FOV) framework, comprises (f) the computing device configured to produce a consensus classification for the large, heterogeneous image, based on the aggregated multi-FOV decision.

According to some embodiments, the consensus classification is a low Bloom-Richardson (BR) grade. According to some such embodiments, the consensus classification is a Bloom-Richardson (BR) grade 3. According to some such embodiments, the consensus classification is a Bloom-Richardson (BR) grade 4. According to some such embodiments, the consensus classification is a Bloom-Richardson (BR) grade 5. According to some embodiments, the consensus classification is an intermediate Bloom-Richardson (BR) grade. According to some such embodiments, the consensus classification is a Bloom-Richardson (BR) grade 6. According to some such embodiments, the consensus classification is a Bloom-Richardson (BR) grade 7. According to some embodiments, the consensus classification is a high Bloom-Richardson (BR) grade. According to some such embodiments, the consensus classification is a Bloom-Richardson (BR) grade 8. According to some such embodiments, the consensus classification is a Bloom-Richardson (BR) grade 9.

Boosted, Multi-FOV Framework

According to one embodiment, the boosted, multi-field-of-view (multi-FOV) framework comprises the steps according to a flowchart depicted in FIG. 4.

According to one embodiment, the boosted, multi-field-of-view (multi-FOV) framework comprises the steps according to a flowchart depicted in FIG. 5, to produce a consensus classification for a breast cancer histopathology slide into a breast cancer grade, whereby (a) an ER+BCa histopathology slide is first divided into (b) fields of view (FOVs) of various sizes. (c) Image features that quantify BR grade phenotype are extracted from each FOV and (d) a feature selection scheme is used to identify salient features at each FOV size. (e) Pre-trained classifiers are used to predict (f) BR grade for each FOV (illustrated by light grey and dark grey squares). (g) Predictions for individual FOVs are aggregated to achieve a class prediction $H(\tau)$ for an entire FOV size $\tau$. (h) Class predictions from FOV sizes are combined to achieve a final classification result for the entire ER+BCa histopathology slide.

According to some embodiments, the large, heterogeneous image $C=(C, g)$ is defined as a 2D set of pixels $c \in C$ with associated intensity function g and class label $y \in \{0,1\}$.

For each C and FOV size $\tau \in T$, a grid containing FOVs $D^\tau = \{d_1^\tau, d_2^\tau, \ldots d_M^\tau\}$ is constructed, where $d_m^\tau \in C$, $m \in \{1, 2, \ldots M\}$ is a square FOV with edge length of T pixels. The function that extracts features from each $d_m^\tau$ is defined as $f(d_m^\tau)$. Grid construction and feature extraction are repeated likewise for each FOV size $\tau \in T$. According to one embodiment, the large, heterogeneous image is a histopathologic image derived from a single histopathologic slide. According to one embodiment, for the single histopathologic slide $C=(C, g)$, a pre-trained classifier $h(d_m^T; T; f) \in \{0,1\}$ is first used to assign an initial class prediction for each individual FOV $d_m^T$ with associated features f. The initial class predictions are then aggregated (i.e. mean prediction) for all FOVs $D^T$ at a single size $T \in T$ to achieve a combined prediction $H(D^T; T; f)$, according to Algorithm 1:

```
Input: Image C. FOV sizes T = {t₁, t₂, ..., t_N}. Classifier h(d_m^τ, f).
Output: Aggregate prediction H(D^τ, τ) for each FOV size τ ∈ T.
1:   for all τ ∈ T do
2:       From C, define M, τ × τ FOVs D^τ = {d₁^τ, d₂^τ, ..., d_M^τ}.
3:       Extract features f from d_m^τ, ∀m ∈ M.
4:       Apply classifier h(d_m^τ, f) for initial classification of each d_m^τ.
5:
         Make aggregate prediction H(D^τ, τ) = (1/M) Σ_{m=1}^{M} h(d_m^τ, f) over all FOVs D^τ.

6:   end for
```

According to one embodiment, a consensus classification $H(D; f)$, where $D=\{D^T: \forall_T \in T\}$ is the collective data over all FOV sizes, $H(D^\tau, \tau)$ is a meta-classifier for each $\tau$, and $E_\tau$ is the expectation of $H(D^\tau, \tau)$ at FOV size $\tau \in T$. The mean squared error of classification at individual FOV sizes is given by $e_\tau = E_\tau[y - H(D^\tau, \tau)]^2$ and the error of the consensus predictor is given by $e_A[y - H(D)]^2$. The consensus classification (i.e., the multi-FOV prediction) $H(D; f)$ is achieved via a consensus prediction across over all FOV sizes. According to one embodiment, the multi-FOV classifier, using as Inputs, Image c, FOV sizes $T=\{t_1, t_2, \ldots, t_N\}$, and Classifier $h(d_m^T; T; f)$, outputs a consensus classification (i.e., a multi-FOV prediction) $H(D; f)$ for Image c, following the steps described in Algorithm 2:

```
1:  for all τ ∈ T do
2:      From C, define M, τ × τ FOVs D^τ = {d_1^τ, d_2^τ, ..., d_M^τ}.
3:      Extract features f from d_m^τ, ∀m ∈ M.
4:      Apply classifier h(d_m^τ; τ, f) for initial classification of each d_m^τ.
5:
```
$$\text{Make prediction } H(D^\tau; \tau, f) = \frac{1}{M}\sum_{m=1}^{M} h(d_m^\tau; \tau, f) \text{ over all FOVs } D^\tau.$$
```
6:  end for
7:
```
$$\text{Make multi-FOV prediction } H(D; f) = \frac{1}{M}\sum_{\tau \in T} H(D^\tau; \tau, f).$$

Proposition 1. Given independent classifiers at FOV sizes $\tau \in T$, $e_r \geq e_A$.

Proof $$e_\tau = E_\tau[y - H(D^\tau, \tau)]^2 = y^2 - 2yE_\tau[H(D^\tau, \tau)] + E_\tau[H^2(D^\tau, \tau)]$$

Since $E_\tau[H^2(D^\tau, \tau)] \geq [E_\tau[H(D^\tau, \tau)]]^2$, $$\geq y^2 - 2yE_\tau[H(D^\tau, \tau)] + [E_\tau[H(D^\tau, \tau)]]^2$$
$$\geq y^2 - 2yH(D) + H^2(D)$$
$$\geq [y - H(D)]^2$$
$$\geq e_A$$

Independent predictors at different FOV sizes (reasonable assumption since different information is discernible at different FOV sizes in heterogeneous images) are used as the "weak" classifiers used to build the "strong" consensus result. To this end, Proposition 1 ensures that the consensus error $e_A$ will always be less than the mean error $e_\tau$ of individual FOV size classifiers.

Application of Boosting to Determine Optimal FOV Sizes

According to one embodiment, a boosted, multi-FOV classifier $\hat{h}_{B_0}(H, T) = \sum_{j=1}^{I} \alpha_j^T H(D^T, T)$ is generated for each FOV size $\tau \in T$, where $H(D^T, T)$ is the aggregate class prediction at FOV size $\tau \in T$, $\alpha^T$ is used to calculate the weight associated with $H(D^T, T)$ and I is the number of iterations using a Adaboost algorithm, as described by Schapire (Schapire, R. E. "The boosting approach to machine learning: An overview," in *Nonlin. Est. and Class.*, 2002). The Adaboost algorithm maintains a set of internal weights, D, for each of the training samples which is iteratively updated to choose classifiers that correctly classify "difficult" samples (i.e. samples that are often misclassified). The algorithm is run for φ iterations to output (1) a modified set of φ pixel-wise classifiers $h_1, h_2, \ldots, h_\phi$, where $h_i \in \{1,0\}$ indicates the output of the highest-weighted classifier, and (2) φ associated weights $\alpha_1, \alpha_2, \ldots, \alpha_T$ for each classifier. Note that $\alpha_1, \alpha_2, \ldots, \alpha_\phi$ reflect the importance of each of the individual features (classifiers) in discriminating cancer malignancy. The result of the ensemble classifier at a specific FOV size is denoted as:

$$A^{Ada} = \sum_{i=1}^{\psi} \alpha_i h_i.$$

Integrated FOV Size Prediction Via Boosted Multi-FOV Classifier

The Adaboost method, described by Schapire (R. E. Schapire, "The boosting approach to machine learning: An overview," in *Nonlin. Est. and Class.*, 2002), allows for weighting of each FOV based on the performance of the boosted classifier at each FOV size.

According to one embodiment, a Boosted multi-FOV classifier $h(d_m^T, f) = \sum_{j=1}^{I} \alpha_j h(d^T, f)$, where $h \in \{0,1\}$ is a weak classifier for FOV $d^T$ and $\alpha_f$ is used to weight individual features in f based on class discriminability, according to Algorithm 3:

```
Input: Image C. FOV sizes T = {t_1, t_2, ..., t_N}. Strong classifier h(d_m^τ, f).
Output: Aggregate prediction H(D^τ, τ) for each FOV size τ ∈ T.
1:  for all τ ∈ T do
2:      From C, define M, τ × τ FOVs D^τ = {d_1^τ, d_2^τ, ..., d_M^τ}.
3:      Extract features f from d_m^τ, ∀m ∈ M.
4:      Apply strong classifier h(d_m^τ, f) for Boosted classification of each d_m^τ.
5:
```
$$\text{Make aggregate prediction } H(D^\tau, \tau) = \frac{1}{M}\sum_{m=1}^{M} h(d_m^\tau, f) \text{ over all FOVs } D^\tau.$$
```
6:  end for
```

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges which may independently be included in the smaller ranges is also encompassed within the invention, subject to any specifically excluded limit in the stated range. Where the stated range includes one or both of the limits, ranges excluding either both of those included limits are also included in the invention.

Unless defined otherwise, all technical and scientific terms used herein have the same meaning as commonly understood by one of ordinary skill in the art to which this invention belongs. Although any method and materials similar or equivalent to those described herein can also be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a", "and", and "the" include plural references unless the context clearly dictates otherwise. All technical and scientific terms used herein have the same meaning.

The contents of each publication discussed herein are incorporated by reference herein in their entirety, and are provided solely for their disclosure prior to the filing date of the present application. Nothing herein is to be considered as an admission that the present invention is not entitled to antedate such publication by virtue of prior invention. Further, the dates of publication provided may be different from the actual publication dates which may need to be independently confirmed.

The following is a disclosure by way of example of a computing device which may be used with the presently disclosed subject matter. The description of the various components of a computing device is not intended to represent any particular architecture or manner of interconnecting the components. Other systems that have fewer or more components may also be used with the disclosed subject matter. A communication device may constitute a form of a computing device and may at least include a computing device. The computing device may include an inter-connect (e.g., bus and system core logic), which can interconnect such components of a computing device to a data processing device, such as a processor(s) or microprocessor(s), or other form of partly or completely programmable or pre-programmed device, e.g., hard wired and or application specific integrated circuit ("ASIC") customized logic circuitry, such as a controller or microcontroller, a digital signal processor, or any other form of device that can fetch instructions, operate on pre-loaded/pre-programmed instructions, and/or followed instructions found in hard-wired or customized circuitry to carry out logic operations that, together, perform steps of and whole processes and functionalities as described in the present disclosure.

In this description, various functions, functionalities and/or operations may be described as being performed by or caused by software program code to simplify description. However, those skilled in the art will recognize what is meant by such expressions is that the functions result from execution of the program code/instructions by a computing device as described above, e.g., including a processor, such as a microprocessor, microcontroller, logic circuit or the like. Alternatively, or in combination, the functions and operations can be implemented using special purpose circuitry, with or without software instructions, such as using Application-Specific Integrated Circuit (ASIC) or Field-Programmable Gate Array (FPGA), which may be programmable, partly programmable or hard wired. The application specific integrated circuit ("ASIC") logic may be such as gate arrays or standard cells, or the like, implementing customized logic by metalization(s) interconnects of the base gate array ASIC architecture or selecting and providing metalization(s) interconnects between standard cell functional blocks included in a manufacturer's library of functional blocks, etc. Embodiments can thus be implemented using hardwired circuitry without program software code/instructions, or in combination with circuitry using programmed software code/instructions.

Thus, the techniques are limited neither to any specific combination of hardware circuitry and software, nor to any particular tangible source for the instructions executed by the data processor(s) within the computing device. While some embodiments can be implemented in fully functioning computers and computer systems, various embodiments are capable of being distributed as a computing device including, e.g., a variety of forms and capable of being applied regardless of the particular type of machine or tangible computer-readable media used to actually effect the performance of the functions and operations and/or the distribution of the performance of the functions, functionalities and/or operations.

The interconnect may connect the data processing device to define logic circuitry including memory. The interconnect may be internal to the data processing device, such as coupling a microprocessor to on-board cache memory or external (to the microprocessor) memory such as main memory, or a disk drive or external to the computing device, such as a remote memory, a disc farm or other mass storage device, etc. Commercially available microprocessors, one or more of which could be a computing device or part of a computing device, include a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc, or a 68xxx series microprocessor from Motorola Corporation as examples.

The inter-connect in addition to interconnecting such as microprocessor(s) and memory may also interconnect such elements to a display controller and display device, and/or to other peripheral devices such as input/output (I/O) devices, e.g., through an input/output controller(s). Typical I/O devices can include a mouse, a keyboard(s), a modem(s), a network interface(s), printers, scanners, video cameras and other devices which are well known in the art. The interconnect may include one or more buses connected to one another through various bridges, controllers and/or adapters. In one embodiment the I/O controller includes a USB (Universal Serial Bus) adapter for controlling USB peripherals, and/or an IEEE-1394 bus adapter for controlling IEEE-1394 peripherals.

The memory may include any tangible computer-readable media, which may include but are not limited to recordable and non-recordable type media such as volatile and non-volatile memory devices, such as volatile RAM (Random Access Memory), typically implemented as dynamic RAM (DRAM) which requires power continually in order to refresh or maintain the data in the memory, and non-volatile ROM (Read Only Memory), and other types of non-volatile memory, such as a hard drive, flash memory, detachable memory stick, etc. Non-volatile memory typically may include a magnetic hard drive, a magnetic optical drive, or an optical drive (e.g., a DVD RAM, a CD ROM, a DVD or a CD), or other type of memory system which maintains data even after power is removed from the system.

A server could be made up of one or more computing devices. Servers can be utilized, e.g., in a network to host a network database, compute necessary variables and information from information in the database(s), store and recover information from the database(s), track information and variables, provide interfaces for uploading and downloading information and variables, and/or sort or otherwise manipulate information and data from the database(s). In one embodiment a server can be used in conjunction with other computing devices positioned locally or remotely to perform certain calculations and other functions as may be mentioned in the present application.

At least some aspects of the disclosed subject matter can be embodied, at least in part, utilizing programmed software code/instructions. That is, the functions, functionalities and/or operations techniques may be carried out in a computing device or other data processing system in response to its processor, such as a microprocessor, executing sequences of instructions contained in a memory, such as ROM, volatile RAM, non-volatile memory, cache or a remote storage device. In general, the routines executed to implement the embodiments of the disclosed subject matter may be implemented as part of an operating system or a specific application, component, program, object, module or sequence of instructions usually referred to as "computer programs," or "software." The computer programs typically comprise instructions stored at various times in various tangible memory and storage devices in a computing device, such as in cache memory, main memory, internal or external disk drives, and other remote storage devices, such as a disc farm, and when read and executed by a processor(s) in the computing device, cause the computing device to perform a method(s), e.g., process and operation steps to execute an element(s) as part of some aspect(s) of the method(s) of the disclosed subject matter.

A tangible machine readable medium can be used to store software and data that, when executed by a computing device, causes the computing device to perform a method(s) as may be recited in one or more accompanying claims defining the disclosed subject matter. The tangible machine readable medium may include storage of the executable software program code/instructions and data in various tangible locations, including for example ROM, volatile RAM, non-volatile memory and/or cache. Portions of this program software code/instructions and/or data may be stored in any one of these storage devices. Further, the program software code/instructions can be obtained from remote storage, including, e.g., through centralized servers or peer to peer networks and the like. Different portions of the software program code/instructions and data can be obtained at different times and in different communication sessions or in a same communication session.

The software program code/instructions and data can be obtained in their entirety prior to the execution of a respective software application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a single machine readable medium in entirety at any particular instance of time.

In general, a tangible machine readable medium includes any tangible mechanism that provides (i.e., stores) information in a form accessible by a machine (i.e., a computing device, which may be included, e.g., in a communication device, a network device, a personal digital assistant, a mobile communication device, whether or not able to download and run applications from the communication network, such as the Internet, e.g., an I-phone, Blackberry, Droid or the like, a manufacturing tool, or any other device including a computing device, comprising one or more data processors, etc.

In one embodiment, a user terminal can be a computing device, such as a in the form of or included within a PDA, a cellular phone, a notebook computer, a personal desktop computer, etc. Alternatively, the traditional communication client(s) may be used in some embodiments of the disclosed subject matter.

While some embodiments of the disclosed subject matter have been described in the context of fully functioning computing devices and computing systems, those skilled in the art will appreciate that various embodiments of the disclosed subject matter are capable of being distributed, e.g., as a program product in a variety of forms and are capable of being applied regardless of the particular type of computing device machine or computer-readable media used to actually effect the distribution.

The disclosed subject matter is described with reference to block diagrams and operational illustrations of methods and devices to provide a system and methods according to the disclosed subject matter. It is understood that each block of a block diagram or other operational illustration (herein collectively, "block diagram"), and combination of blocks in a block diagram, can be implemented by means of analog or digital hardware and computer program instructions. These computing device software program code/instructions can be provided to the computing device such that the instructions, which executed by the computing device, e.g., on a processor within the computing device or other data processing apparatus, such that, when so executed, the program software code/instructions cause the computing device to perform functions, functionalities and operations of a method(s) according to the disclosed subject matter, as recited in the accompanying claims, with such functions, functionalities and operations specified in the block diagram.

It will be understood that in some possible alternate implementations, the function, functionalities and operations noted in the blocks of a block diagram may occur out of the order noted in the block diagram. For example, the function noted in two blocks shown in succession can in fact be executed substantially concurrently or the functions noted in blocks can sometimes be executed in the reverse order, depending upon the function, functionalities and operations involved. Therefore, the embodiments of methods presented and described as a flowchart(s) in the form of a block diagram in the present application are provided by way of example in order to provide a more complete understanding of the disclosed subject matter. The disclosed flow and concomitantly the method(s) performed as recited in the accompanying claims are not limited to the functions, functionalities and operations illustrated in the block diagram and/or logical flow presented therein. Alternative embodiments are contemplated in which the order of the various functions, functionalities and operations may be altered and in which sub-operations described as being part of a larger operation may be performed independently or performed differently than illustrated or not performed at all.

Although some of the drawings illustrate a number of operations in a particular order, functions, functionalities and/or operations which are not now known to be order dependent or become understood to not be order dependent may be reordered and other operations may be combined or broken out. While some reordering or other groupings may have been specifically mentioned in the present application, others will be or may become apparent to those of ordinary skill in the art and so the disclosed subject matter does not present an exhaustive list of alternatives. It should also be recognized that the aspects of the disclosed subject matter may be implemented in parallel or seriatim in hardware, firmware, software or any combination(s) thereof co-located or remotely located, at least in part, from each other, e.g., in arrays or networks of computing devices, over interconnected networks, including the Internet, and the like.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

Example 1

Evaluation of the Boosted, Multi-field-of-view (Multi-FOV) Classifier to Distinguish Breast Cancer Patients of Differential Grading by Nuclear Architecture Extraction This example demonstrates the ability of the boosted, multi-field-of-view (multi-FOV) classifier of the present invention to distinguish patients with low and high grades in breast cancer (BCa) histopathology images.

Dataset

Hematoxylin and eosin stained histopathology slides from 55 patients (36 low grade, 19 high grade) at the Hospital of the University of Pennsylvania were digitized via a whole slide scanner at 10× magnification (1 µm/pixel resolution). Each slide C is accompanied by (1) annotations from an expert pathologist denoting large regions of interest containing invasive cancer and (2) Bloom-Richardson (BR) grade labels denoting low (BR 3-5) or high (BR 7-9) grade. A wide range of FOV sizes (T={250, 500, 1000, 2000, 4000} pixels) was selected for analysis.

Figure 6:
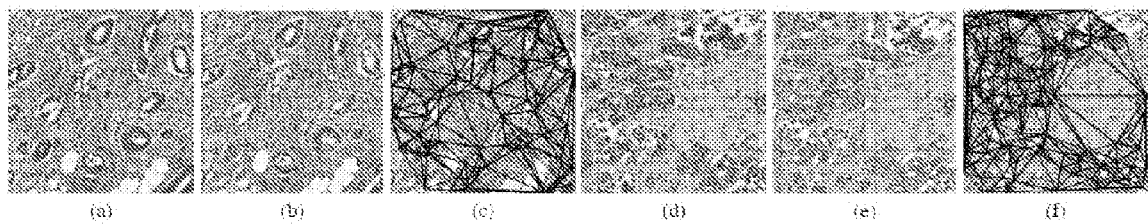
FIG. 6 shows exemplary breast cancer histology images representing (a) Bloom-Richardson (BR) low grade BCa and (d) Bloom-Richardson (BR) high grade BCa with (b), (e) cancer nuclei automatically detected via color deconvolution. Nuclei are used as vertices for construction of graphs such as (c), (f) the Delaunay Triangulation, from which features describing nuclear architecture are extracted.

FIG. 6 shows exemplary breast cancer histology images representing Bloom-Richardson (BR) low grade BCa (a) and Bloom-Richardson (B) high grade BCa (b) and (d), (e) cancer nuclei automatically detected via color deconvolution. Nuclei are used as vertices for construction of graphs such as (c), (f) the Delaunay Triangulation, from which features describing nuclear architecture are extracted.

Architechtectural Feature Extraction

Nuclei are automatically detected (FIGS. 6(b), (e)) in each FOV $d_m^T$ by using color deconvolution, as described by Ruifrok et al. (Ruifrok, A. C. et al., "Quantification of histochemical staining by color deconvolution," Anal Quant Cytol Histol, August 2001, 23(4): 291-299) to isolate the hematoxylin stain channel. FOVs are disqualified from further analysis if (a) at least 50% of the FOV does not fall within the annotation denoting invasive cancer or (b) a minimum of 20 nuclei are not found.

Color deconvolution converts an RGB space g to a new color space a comprising hematoxylin H (i.e. purple), eosin E (i.e. pink), and background K (i.e. white) channels. The relationship between color spaces g and a is defined as f=Ma, where the transformation matrix is given by $$M = \begin{bmatrix} \hat{H}_R & \hat{H}_G & \hat{H}_B \\ \hat{E}_R & \hat{E}_G & \hat{E}_B \\ \hat{K}_R & \hat{K}_G & \hat{K}_B \end{bmatrix},$$

where $\hat{H}_R$, $\hat{H}_G$, and $\hat{H}_B$ denote the pre-defined, normalized red, green, and blue values, respectively, for the H channel. The second and third rows of M are defined analogously for the E and K channels, respectively. The intensity of a pixel c in the new color space is defined as $a(c) = M^{-1}(c)g(c)$, where g and a are 3×1 column vectors.

The detected cancer nuclei then were used as vertices for construction of the Voronoi Diagram, Delaunay Triangulation, and Minimum Spanning Tree graphs (FIGS. 6(c), (f)), from which a total of 50 architectural features $f(d_m^T)$, are extracted from each FOV $d_m^T$.

Table 1 summarizes exemplary image features extracted from the Voronoi Diagram (VD), the Delaunay Triangulation (DT) graph, the Minimum Spanning Tree (MST), and the Nearest Neighbor (NN) graph.

TABLE 1

Summary of 50 architectural features extracted from Voronoi Diagram (VD), Delaunay Triangulation (DT), Minimum Spanning Tree (MST), Nearest Neighbor (NN) statistics

| Type | Name |
| --- | --- |
| VD (13 image features) | Total area of polygons |
| | Polygon area (mean, standard deviation, minimum ratio, maximum ratio, disorder) |
| | Polygon perimeter (mean, standard deviation, minimum ratio, maximum ratio, disorder |
| | Polygon chord length (mean, standard deviation, minimum ratio, maximum ratio, disorder) |
| DT (8 image features) | Triangle side length (mean, standard deviation, minimum ratio, maximum ratio, disorder) |
| | Triangle area length (mean, standard deviation, minimum ratio, maximum ratio, disorder) |
| MST (4 image features) | Edge length (mean, standard deviation, minimum ratio, maximum ratio, disorder) |
| NN (25 image features) | Nuclear density |
| | Distance to 3 nearest nuclei (mean, standard deviation, disorder) |
| | Distance to 5 nearest nuclei (mean, standard deviation, disorder) |
| | Distance to 7 nearest nuclei (mean, standard deviation, disorder) |
| | Number of nuclei is a 10 µm radius (mean, standard deviation, disorder) |
| | Number of nuclei is a 20 µm radius (mean, standard deviation, disorder) |
| | Number of nuclei is a 30 µm radius (mean, standard deviation, disorder) |
| | Number of nuclei is a 40 µm radius (mean, standard deviation, disorder) |
| | Number of nuclei is a 50 µm radius (mean, standard deviation, disorder) |

Comparison with a Multi-scale Framework

A multi-scale framework was used for comparison against the boosted, multi-field-of-view (multi-FOV) framework. In the multi-scale framework, analysis was performed at a single FOV (τ=4000 pixels). A variety of scales $\kappa \in \{0.25, 0.5, 1, 2, 4\}$ µm/pixel were examined concurrently, as illustrated in FIG. 1(a). The extraction of architectural features is analogous to the methods previously described for the multi-FOV framework above, and the construction of a Boosted classifier is according to Algorithms 1, 2 and 3, in which data is aggregated over all spatial resolutions rather than FOV sizes.

Quantitative Results

For comparison with the Boosted classifier, a balanced classifier $\hat{h}_{B_a}(H, T) = H(D^T, T)$ was also defined with equal weighting for predictions made at each τ∈T. For the multi-FOV classifier, Table 2 demonstrates that the balanced consensus scheme $\hat{h}_{B_a}$ produced an area under the receiver operating characteristic curve (AUC) value of 0.776, outperforming three of the five individual FOV sizes ({4000, 2000, 250} pixels). This result supports Proposition 1 since the boosted, multi-field-of-view (multi-FOV) approach leads to improved slide classification without any prior knowledge of the optimal FOV size. Further, the AUC of 0.816 produced by the Boosted scheme $\hat{h}_{B_0}$ is comparable to the performance of the best individual FOV size τ=500 (AUC=0.819). Both the largest (τ=4000 pixels) and smallest (τ=250 pixels) FOV sizes perform poorly, producing AUC values of 0.573 and 0.605, respectively. The result for τ=4000 underscores the limitations of analyzing large FOV sizes in BCa histopathology, namely excessive heterogeneity in the sample leading to misclassification. Similarly, τ=250 represents a FOV size that is too small and thus lacks sufficient data to accurately reflect tumor grade. Area under the curve (AUC) for best individual FOV size is 1.0 and worst (random guessing) is 0.5 or below. Anything 0.5 or below means that there is no classification and hence the classifier is useless.

TABLE 2

Area under the receiver operating characteristic curve (AUC) values for multi-FOV and multi-scale frameworks (using architectural features).

| Multi-FOV | AUC | Multi-Scale | AUC |
|---|---|---|---|
| τ = 4000 | 0.573 | κ = 0.25 | 0.765 |
| τ = 2000 | 0.702 | κ = 0.5 | 0.741 |
| τ = 1000 | 0.787 | κ = 1 | 0.782 |
| τ = 500 | 0.819 | κ = 2 | 0.789 |
| τ = 250 | 0.605 | κ = 4 | 0.640 |
| Consensus: Balanced | 0.776 | Consensus: Balanced | 0.756 |
| Consensus: Boosted | 0.816 | Consensus: Boosted | 0.791 |

The trends from the multi-scale classifier are similar to those from the multi-FOV classifier in that the Boosted classifier outperforms all individual scales with an AUC of 0.791. In contrast, the highest AUC values from individual scales κ=1 μm and κ=2 μm produce the highest AUC values of any individual scales (0.782 and 0.789, respectively). The poor result from κ=4 μM (AUC=0.640) suggests that there is insufficient information to detect and quantify nuclear architecture at such low resolutions.

Example 2

Evaluation of the Boosted, Multi-Field-of-View (Multi-FOV) Classifier to Distinguish Breast Cancer Patients of Differential Grading by Nuclear Architecture Extraction and Nuclear Texture Extraction This example demonstrates the ability of the boosted, multi-field-of-view (multi-FOV) classifier of the present invention to distinguish patients with low vs. high BR grade, low vs. intermediate BR grade, and intermediate vs. high BR grade in breast cancer (BCa) histopathology images.

Dataset

BCa histopathology slides were obtained from 126 patients (46 low BR, 60 intermediate BR, 20 high BR) at the Hospital of the University of Pennsylvania and The Cancer Institute of New Jersey. All slides were digitized via a whole slide scanner at 10× magnification (1 μm/pixel resolution). Each slide was accompanied by BR grade as determined by an expert pathologist. Commonly accepted clinical cutoffs used to define the low (BR 3-5), intermediate (BR 6-7), and high (BR 8-9) grade classes were used as ground truth in this Example. For each experiment, our BCa grading system is evaluated via a series of 2-class classification tasks to distinguish slides with low vs. high BR grade, low vs. intermediate BR grade, and intermediate vs. high BR grade.

Experiment 1: Whole Slide Classification Using Nuclear Architecture

The ability of the boosted, multi-field-of-view (multi-FOV) classifier to discriminate entire BCa histopathology slides based on BR grade via architectural features $\hat{f}_{NA}$ was evaluated. Since the multi-FOV classifier utilizes a trained classifier, it is susceptible to the arbitrary selection of training and testing data. A 3-fold cross-validation scheme was used to mitigate such bias by splitting the data cohort into 3 subsets in a randomized fashion, from which 2 subsets are used for training and the remaining subset is used for evaluation. The subsets were subsequently rotated until a class prediction $H(D; \hat{f}_{NA}) \in \{0,1\}$ was made for each slide. A slide was said to be correctly classified if the class prediction matches the ground truth label (i.e. BR grade) assigned to the slide. The entire cross-validation procedure was repeated 20 times and mean classification results were reported.

Experiment 2: Whole Slide Classification Using Nuclear Texture

Similar to the procedure outlined in Experiment 1, the boosted, multi-field-of-view (multi-FOV) classifier was evaluated using the Haralick co-occurrence texture features $\hat{f}_{NT}$. A class prediction $H(D; \hat{f}_{NT}) \in \{0,1\}$ was made for each slide and compared to the BR grade for evaluation. Mean classification results from 20 trials of 3-fold cross-validation were reported.

Comparison to Multi-resolution (Multi-scale) Classifier

A multi-scale framework was used for comparison against the boosted, multi-field-of-view (multi-FOV) framework. In the multi-scale framework, analysis was performed at a single FOV (τ=1000 μm) at spatial resolutions of κ∈{0.25, 0.5, 1, 2, 4} μm/pixel were examined concurrently, as illustrated in FIG. 1(a). The extraction of architectural features is analogous to the methods previously described for the multi-FOV framework above, and the construction of a Boosted classifier is according to Algorithms 1, 2 and 3, in which data is aggregated over all spatial resolutions rather than FOV sizes.

Quantitative Results

Figure 7:
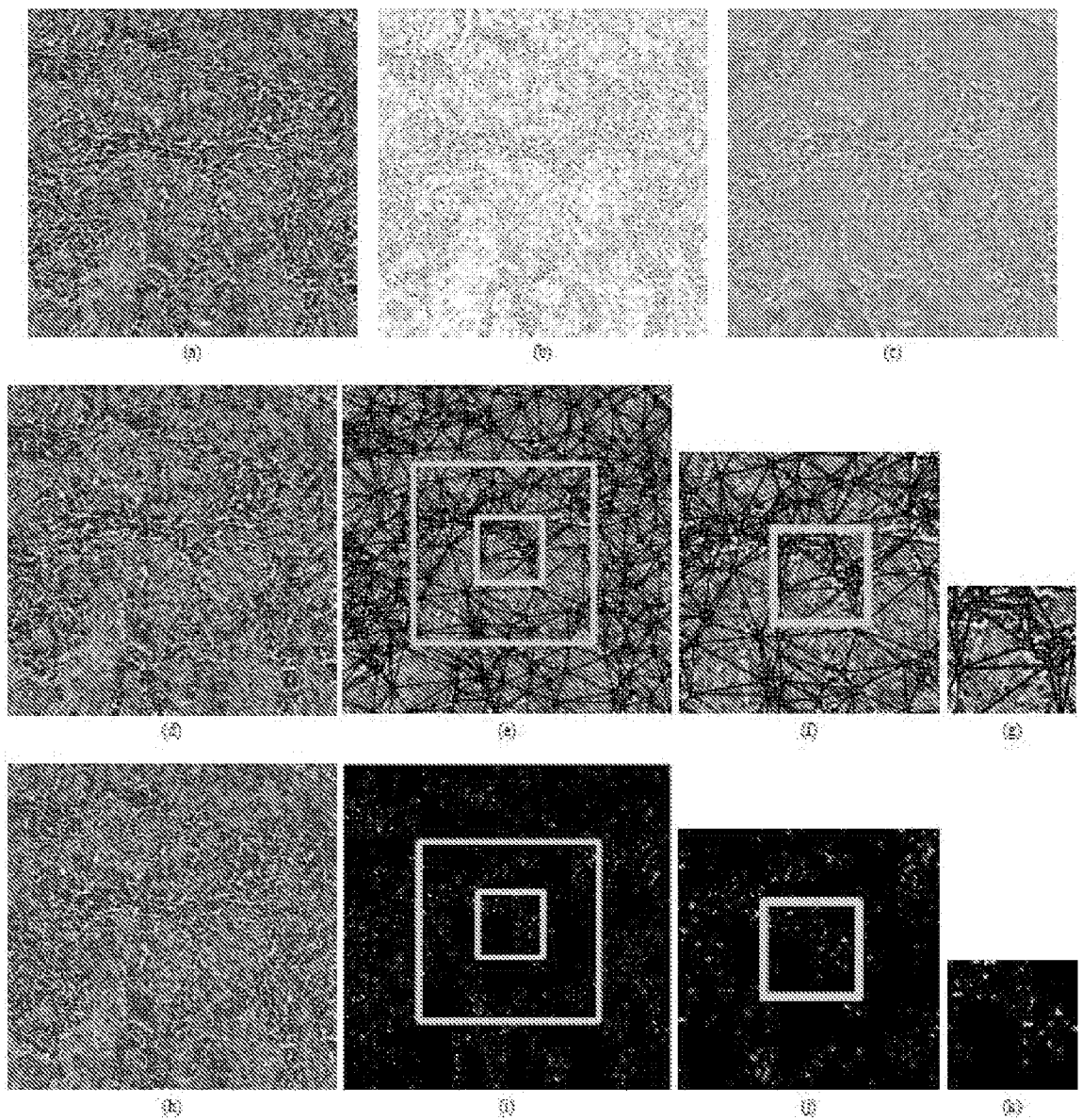
FIG. 7($a$) is an illustration of a high grade histopathology image with its hematoxylin channel shown in FIG. 7($b$) and eosin channel shown in FIG. 7($c$) separated by color deconvolution.
Figure 8:
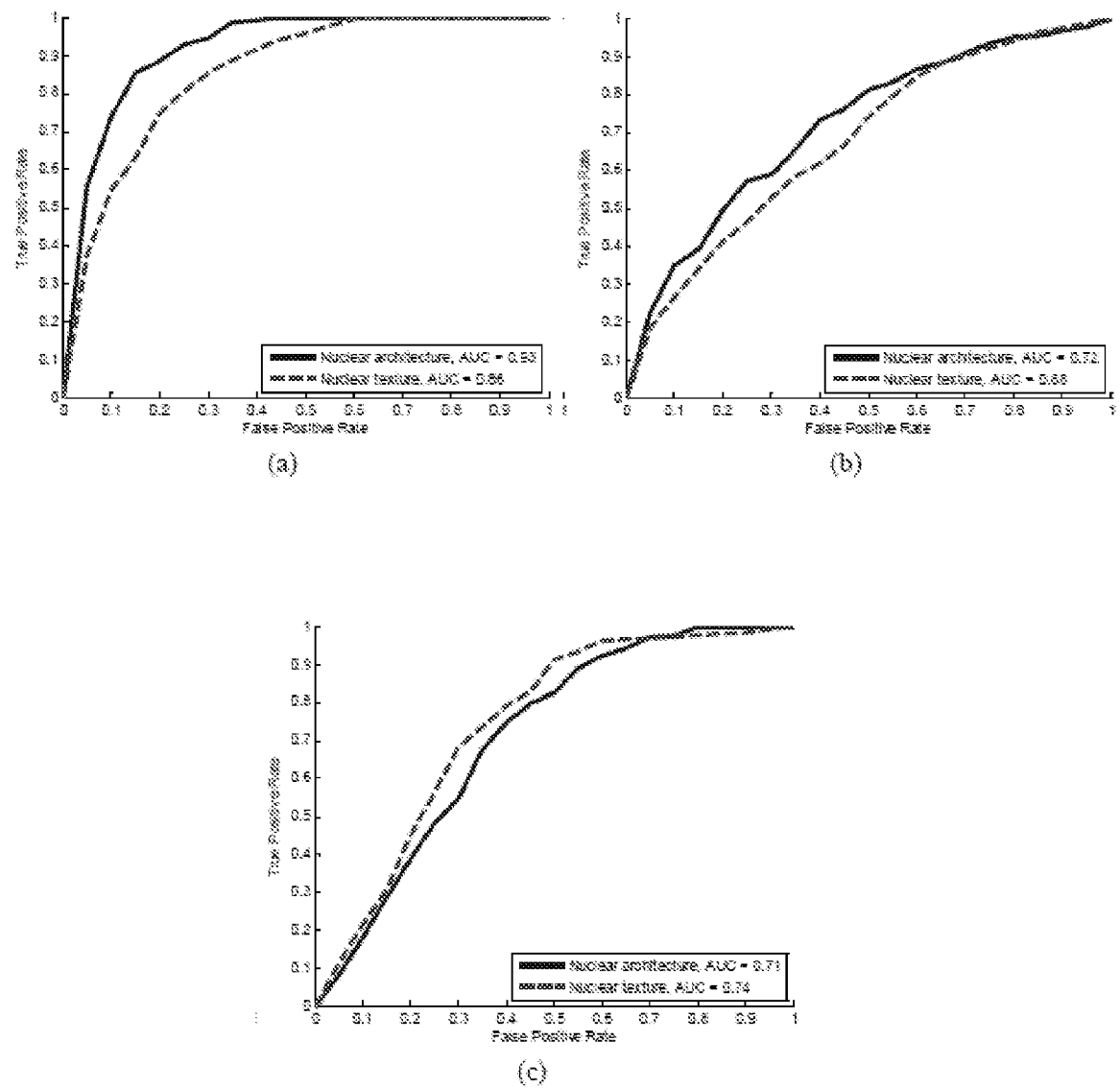
FIG. 8 shows mean receiver operating characteristic (ROC) curves over 20 trials of 3-fold cross-validation for (a) low vs. high grade, (b) low vs. intermediate grade, and (c) intermediate vs. high grade classification tasks. For each task, ROC curves are shown for both nuclear architecture and nuclear texture feature sets along with associated AUC values.

Quantitative results suggest that predictions made by nuclear architecture ($H(D; \hat{f}_{NA})$) and nuclear texture ($H(D; \hat{f}_{NT})$) both performed well in characterizing different aspects of BR grade in BCa histopathology slides. FIG. 7(a) is an illustration of a high BR grade histopathology image with its (b) hematoxylin and (c) eosin channels separated by color deconvolution. FIG. 7(d) shows centroids of nuclei isolated from the hematoxylin channel and used as vertices for the construction of graphs, such as the (e)-(g) Delaunay Triangulation ("DT") at various FOV sizes. Subsequently, features describing nuclear architecture are extracted from each graph. FIG. 8 shows mean receiver operating characteristic (ROC) curves over 20 trials of 3-fold cross-validation for (a) low BR grade vs. high BR grade, (b) low BR grade vs. intermediate BR grade, and (c) intermediate BR grade vs. high BR grade classification tasks. For each task, ROC curves are shown for both nuclear architecture and nuclear texture feature sets along with associated AUC values.

Specifically, nuclear architecture yielded a higher area under the curve (AUC) values (0.93, 0.72) than nuclear texture (0.86, 0.68) in terms of discriminating low vs. high and low vs. intermediate BR grades, respectively. Conversely, nuclear texture (AUC=0.74) was shown to outperform nuclear architecture (AUC=0.71) for distinguishing intermediate vs. high BR grade slides. This suggests that, while the spatial arrangement of nuclei better identifies gross differences in BCa malignancy, other descriptors, such as textural representations of nuclei, could play an important role in differentiating more subtle variations related to intermediate BR grades.

To mitigate the challenges associated with large feature sets, the ROC curves in FIG. 8 were achieved using feature subsets selected by the mRMR algorithm. The minimum Redundancy Maximum Relevance (mRMR) feature selection scheme selects, in a set f comprising reference feature, a subset $\tilde{f} \epsilon f$ that maximizes "relevance" and minimizes "redundancy" between individual image features. According to one embodiment, a reference feature $f_j$ is incrementally included in subset $\tilde{f}$ based on the criteria described in Equation (1):

$$f_j = \underset{f_j \in 1-\tilde{i}}{\mathrm{argmax}}\left[ I(f_j, y) - \frac{1}{|\tilde{f}|-1}\sum_{f_i \in \tilde{f}} I(f_j, f_i) \right], \quad (1)$$

where I is mutual information, y is the class label associated with a given sample, and |$\tilde{f}$| represents cardinality of the selected feature subset $\tilde{f}$. According to one embodiment, the reference feature subset $\tilde{f}_{NT} \epsilon f_{NT}$ comprises features related to nuclear texture based on their ability to distinguish BCa histopathology slides with low, intermediate, and high BR grades.

For each experiment, Tables 3-8 show the features selected at each FOV size along with the cumulative classification accuracy ("Cum. Acc.") of the multi-FOV approach with the inclusion of each additional feature. "Rank" represents the relative importance of the individual features as determined by the mRMR algorithm and τ represents FOV size. Note that some experiments, e.g. nuclear architecture for low vs. high grading (Table 3) and nuclear texture for intermediate vs. high grading (Table 8), demonstrate considerable improvement in classification accuracy with the addition of relevant features while other experiments, e.g. nuclear texture for low vs. intermediate grading (Table 7) reach a plateau with the selection of only one or two features.

In addition to improved classification accuracy, the feature selection process also reveals the specific features that best distinguish low and high grade cancers. For example, Table 3 demonstrates that the average number of neighboring nuclei in a 10 μm radius around each nucleus is the most discriminating feature in smaller FOVs (1000 μm, 500 μm, and 250 μm), but has lesser importance in larger FOV sizes of 2000 μm and 4000 μm, where it is ranked third and fourth, respectively. Table 3 summarizes the most informative nuclear architectural features selected at each FOV size for classification of low vs. high BR grade cancers. Features were selected independently at each FOV size and accuracies are based on cumulative inclusion of features at each rank.

TABLE 3

Most informative nuclear architectural features selected at each FOV size for classification of low vs. high BR grade cancers.

| Rank | τ | Feature Description | Cum. Acc. |
|---|---|---|---|
| 1 | 4000 | VD chord length: min/max ratio | 0.85 ± 0.033 |
|  | 2000 | DT side length: min/max ratio |  |
|  | 1000 | # nuclei in 10 μm radius: mean |  |
|  | 500 | # nuclei in 10 μm radius: mean |  |
|  | 250 | # nuclei in 10 μm radius: mean |  |
| 2 | 4000 | DT area: min/max ratio | 0.86 ± 0.056 |
|  | 2000 | DT area: disorder |  |
|  | 1000 | # nuclei in 10 μm radius: disorder |  |
|  | 500 | DT area: min/max ratio |  |
|  | 250 | Dist. to 5 nearest nuclei: disorder |  |

TABLE 3-continued

Most informative nuclear architectural features selected at each FOV size for classification of low vs. high BR grade cancers.

| Rank | τ | Feature Description | Cum. Acc. |
|---|---|---|---|
| 3 | 4000 | VD area: min/max ratio | 0.88 ± 0.038 |
|  | 2000 | # nuclei in 10 μm radius: mean |  |
|  | 1000 | DT area: min/max ratio |  |
|  | 500 | # nuclei in 10 μm radius: disorder |  |
|  | 250 | DT area: min/max ratio |  |
| 4 | 4000 | # nuclei in 10 μm radius: mean | 0.91 ± 0.023 |
|  | 2000 | MST edge length: min/max ratio |  |
|  | 1000 | MST edge length: min/max ratio |  |
|  | 500 | DT side length: min/max ratio |  |
|  | 250 | Dist. to 7 nearest nuclei: disorder |  |
| 5 | 4000 | VD perimeter: min/max ratio | 0.91 ± 0.015 |
|  | 2000 | # nuclei in 10 μm radius: mean |  |
|  | 1000 | DT side length: min/max ratio |  |
|  | 500 | Dist. to 7 nearest nuclei: disorder |  |
|  | 250 | DT side length: min/max ratio |  |

"Rank" represents the relative importance of the individual features as determined by the mRMR algorithm.

Conversely, Voronoi Diagram (VD) and Delaunay Triangulation (DT) graph-based features appear to play a greater role in larger FOVs, where variations in VD chord length, DT side length, and DT area are more important than nearest neighbor statistics. This pattern is further reinforced in the features selected for distinguishing low vs. intermediate grades (Table 4) and intermediate vs. high grades (Table 5).

Table 4 summarizes the most informative nuclear architectural features selected at each FOV size for classification of low vs. intermediate BR grade cancers. Features were selected independently at each FOV size and accuracies are based on cumulative inclusion of features at each rank. "Rank" represents the relative importance of the individual features as determined by the mRMR algorithm.

TABLE 4

Most informative nuclear architectural features selected at each FOV size for classification of low vs. intermediate BR grade cancers

| Rank | τ | Feature Description | Cum. Acc. |
|---|---|---|---|
| 1 | 4000 | VD perimeter: min/max ratio | 0.71 ± 0.0042 |
|  | 2000 | DT area: disorder |  |
|  | 1000 | DT area: disorder |  |
|  | 500 | # nuclei in 10 μm radius: disorder |  |
|  | 250 | DT side length: min/max ratio |  |
| 2 | 4000 | VD chord length: min/max ratio | 0.71 ± 0.011 |
|  | 2000 | DT side length: min/max ratio |  |
|  | 1000 | VD chord length: min/max ratio |  |
|  | 500 | Dist. to 7 nearest nuclei: disorder |  |
|  | 250 | # nuclei in 10 μm radius: mean |  |
| 3 | 4000 | DT area: disorder | 0.73 ± 0.028 |
|  | 2000 | # nuclei in 10 μm radius: mean |  |
|  | 1000 | # nuclei in 10 μm radius: mean |  |
|  | 500 | Dist. to 5 nearest nuclei: disorder |  |
|  | 250 | Dist. to 3 nearest nuclei: disorder |  |
| 4 | 4000 | MST edge length: min/max ratio | 0.74 ± 0.037 |
|  | 2000 | VD perimeter: min/max ratio |  |
|  | 1000 | VD perimeter: min/max ratio |  |
|  | 500 | DT area: min/max ratio |  |
|  | 250 | # nuclei in 10 μm radius: disorder |  |

Table 5 summarizes the most informative nuclear architectural features selected at each FOV size for classification of intermediate vs. high BR grade cancers. Features were selected independently at each FOV size and accuracies are based on cumulative inclusion of features at each rank. "Rank" represents the relative importance of the individual features as determined by the mRMR algorithm.

TABLE 5

Most informative nuclear architectural features selected at each FOV size for classification of intermediate vs. high BR grade cancers

| Rank | τ | Feature Description | Cum. Acc. |
|---|---|---|---|
| 1 | 4000 | VD area: min/max ratio | 0.70 ± 0.035 |
|  | 2000 | DT area: disorder |  |
|  | 1000 | DT area: disorder |  |
|  | 500 | VD area: std. dev. |  |
|  | 250 | DT area: min/max ratio |  |
| 2 | 4000 | DT area: disorder | 0.71 ± 0.054 |
|  | 2000 | VD perimeter: min/max ratio |  |
|  | 1000 | VD chord length: min/max ratio |  |
|  | 500 | # nuclei in 10 μm radius: mean |  |
|  | 250 | Dist. to 7 nearest nuclei: disorder |  |
| 3 | 4000 | DT side length: min/max ratio | 0.72 ± 0.048 |
|  | 2000 | # nuclei in 10 μm radius: mean |  |
|  | 1000 | MST edge length: min/max ratio |  |
|  | 500 | DT area: disorder |  |
|  | 250 | # nuclei in 40 μm radius: mean |  |
| 4 | 4000 | VD chord: min/max ratio | 0.73 ± 0.056 |
|  | 2000 | DT side length: min/max ratio |  |
|  | 1000 | DT side length: min/max ratio |  |
|  | 500 | DT area: min/max ratio |  |
|  | 250 | # nuclei in 10 μm radius: mean |  |

Examining the features selected for nuclear texture (Tables 6-8) demonstrates the importance of contrast statistics (especially, variance and entropy) in histopathology grading. In addition, the information measure of correlation is shown to have importance for discriminating smaller FOVs (τ∈{250, 500}) and data across all three channels (hue, saturation ("Sat"), and intensity value ("Val")) appear to be equally relevant in terms of meaningful feature extraction.

Table 6 summarizes the most informative nuclear texture features selected at each FOV size for classification of low vs. high BR grade cancers. Features were selected independently at each FOV size and accuracies are based on cumulative inclusion of features at each rank. "Rank" represents the relative importance of the individual features as determined by the mRMR algorithm.

TABLE 6

Most informative nuclear texture features selected at each FOV size for classification of low vs. high BR grade cancers.

| Rank | τ | Feature Description | Cum. Acc. |
|---|---|---|---|
| 1 | 4000 | Val: Contrast variance - std. dev. | 0.80 ± 0.047 |
|  | 2000 | Hue: Contrast variance - mean |  |
|  | 1000 | Sat: Contrast variance - std. dev. |  |
|  | 500 | Val: Contrast variance - std. dev. |  |
|  | 250 | Val: Contrast entropy - disorder |  |
| 2 | 4000 | Sat: Contrast variance - std. dev. | 0.81 ± 0.044 |
|  | 2000 | Sat: Contrast variance - mean |  |
|  | 1000 | Hue: Contrast variance - mean |  |
|  | 500 | Hue: Info. measure 1 - std. dev. |  |
|  | 250 | Hue: Info. measure 1 - std. dev. |  |
| 3 | 4000 | Hue: Contrast variance - std. dev. | 0.84 ± 0.040 |
|  | 2000 | Hue: Contrast variance - std. dev. |  |
|  | 1000 | Val: Contrast variance - std. dev. |  |
|  | 500 | Val: Contrast entropy - disorder |  |
|  | 250 | Val: Contrast average - std. dev. |  |

Table 7 summarizes the most informative nuclear texture features selected at each FOV size for classification of low vs. intermediate BR grade cancers. Features were selected independently at each FOV size and accuracies are based on cumulative inclusion of features at each rank. "Rank" represents the relative importance of the individual features as determined by the mRMR algorithm.

TABLE 7

Most informative nuclear texture features selected at each FOV size for classification of low vs. intermediate BR grade cancers

| Rank | τ | Feature Description | Cum. Acc. |
|---|---|---|---|
| 1 | 4000 | Hue: Contrast variance - disorder | 0.69 ± 0.024 |
|  | 2000 | Sat: Contrast variance - mean |  |
|  | 1000 | Val: Contrast average - std. dev. |  |
|  | 500 | Sat: Contrast variance - std. dev. |  |
|  | 250 | Sat: Info. measure 1 - std. dev. |  |
| 2 | 4000 | Val: Contrast variance - std. dev. | 0.69 ± 0.027 |
|  | 2000 | Val: Contrast variance - std. dev. |  |
|  | 1000 | Sat: Contrast inv. moment - std. dev. |  |
|  | 500 | Sat: Info. measure 1 - std. dev. |  |
|  | 250 | Sat: Contrast variance - std. dev. |  |
| 3 | 4000 | Val: Contrast entropy - disorder | 0.70 ± 0.024 |
|  | 2000 | Sat: Contrast average - std. dev. |  |
|  | 1000 | Hue: Intensity average - disorder |  |
|  | 500 | Val: Info. measure 1 - std. dev. |  |
|  | 250 | Sat: Contrast inv. moment - std. dev. |  |

Table 8 summarizes the most informative nuclear texture features selected at each FOV size for classification of intermediate vs. high BR grade cancers. Features were selected independently at each FOV size and accuracies are based on cumulative inclusion of features at each rank. "Rank" represents the relative importance of the individual features as determined by the mRMR algorithm.

TABLE 8

Most informative nuclear texture features selected at each FOV size for classification of intermediate vs. high BR grade cancers

| Rank | τ | Feature Description | Cum. Acc. |
|---|---|---|---|
| 1 | 4000 | Hue: Contrast variance - std. dev. | 0.68 ± 0.082 |
|  | 2000 | Hue: Contrast variance - mean |  |
|  | 1000 | Sat: Contrast variance - std. dev. |  |
|  | 500 | Val: Contrast variance - std. dev. |  |
|  | 250 | Val: Contrast variance - std. dev. |  |
| 2 | 4000 | Hue: Contrast variance - mean | 0.75 ± 0.044 |
|  | 2000 | Val: Contrast entropy - disorder |  |
|  | 1000 | Hue: Contrast variance - mean |  |
|  | 500 | Sat: Contrast variance - std. dev. |  |
|  | 250 | Sat: Contrast variance - std. dev. |  |
| 3 | 4000 | Sat: Contrast variance - mean | 0.74 ± 0.040 |
|  | 2000 | Hue: Contrast variance - std. dev. |  |
|  | 1000 | Hue: Contrast variance - std. dev. |  |
|  | 500 | Val: Contrast entropy - disorder |  |
|  | 250 | Hue: Info. measure 1 - std. dev. |  |
| 4 | 4000 | Sat: Contrast variance - std. dev. | 0.74 ± 0.03 |
|  | 2000 | Sat: Contrast variance - mean |  |
|  | 1000 | Val: Contrast variance - std. dev. |  |
|  | 500 | Sat: Contrast inv. moment - std. dev. |  |
|  | 250 | Sat: Contrast inv. moment - std. dev. |  |
| 5 | 4000 | Hue: Contrast variance - disorder | 0.75 ± 0.035 |
|  | 2000 | Sat: Contrast variance - std. dev. |  |
|  | 1000 | Sat: Contrast variance - mean |  |
|  | 500 | Val: Entropy - std. dev. |  |
|  | 250 | Val: Contrast entropy - disorder |  |

The comparison of AUC values between the boosted, multi-field-of-view (multi-FOV) framework according to the present invention versus a multi-resolution (multi-scale) approach (Table 9) shows that aggregation of image features at multiple fields-of-view (i.e. multi-FOV classifier) is able to outperform the aggregation of image features at multiple spatial resolutions (ie. multi-resolution classifier) for the grading of BCa histopathology slides. If AUC =1, that is perfect classification. Anything 0.5 or lower is useless. For nuclear architecture $f_{NA}$, the superiority of the multi-FOV approach in terms of differentiating low vs. high grades (AUC=0.93±0.012), low vs. intermediate grades (AUC=0.72±0.037), and intermediate vs. high grades (AUC=0.71±0.051) is expected since the spatial arrangement of nuclei is invariant to changes in image resolution. In addition, the ability of a nuclear textural features $f_{NT}$ to perform comparably to nuclear architecture in distinguishing low vs. high grades (AUC=0.84±0.036) and low vs. intermediate grades (AUC=0.67±0.074) is also unsurprising, since textural representations of nuclei could reveal different types of class discriminatory information at various image resolutions. These results demonstrate that an intelligent combination of the multi-FOV and multi-resolution approaches can yield improved classification of tumor grade in whole-slide BCa histology.

Table 9 summarizes area under the ROC curve (FIG. 8) (AUC) values for the comparison of low, intermediate and high grade cancers using the boosted, multi-field-of-view (multi-FOV) classifier and a multi-resolution classifier.

TABLE 9

Area under the ROC curve (AUC) values for the comparison of low, intermediate and high grade cancers using the boosted, multi-field-of-view (multi-FOV) classifier and a multi-resolution classifier

|  | Low vs. high | | Low vs. intermediate | | Intermediate vs. high | |
| --- | --- | --- | --- | --- | --- | --- |
|  | $\tilde{f}_{NA}$ | $\tilde{f}_{NT}$ | $\tilde{f}_{NA}$ | $\tilde{f}_{NT}$ | $\tilde{f}_{NA}$ | $\tilde{f}_{NT}$ |
| Multi-FOV | 0.93 ± 0.012 | 0.86 ± 0.036 | 0.72 ± 0.037 | 0.68 ± 0.028 | 0.71 ± 0.051 | 0.74 ± 0.036 |
| Multi-resolution | 0.86 ± 0.035 | 0.84 ± 0.036 | 0.67 ± 0.049 | 0.67 ± 0.074 | 0.65 ± 0.054 | 0.66 ± 0.075 |

To understand the prognostic implications for patients that were misclassified by the computerized grading system, the classification result from Task 1 (i.e. low vs. high grade) was re-examined in the context of the Oncotype DX Recurrence Scores (RS). The Oncotype DX molecular assay, shown to predict patient outcome in early-stage ER+BCa tumors, produces a quantitative RS between 0 and 100, in which larger numbers denote higher risk of recurrence. Commonly used clinical cutoffs separate patients into low (RS<18), intermediate (18≤RS≤30), and high (RS>30) risk categories. For patients with low grade cancers, Table 10 shows that correctly and incorrectly classified tumors have similar mean BR grades of 4.6 and 4.7, respectively. However, the same tumors were found to have greater disparity in Oncotype DX scores, with mean RS values of 14.6 and 16.6, respectively. A similar trend was visible for high grade cancers, where the mean RS values of 33.5 and 29.9 for correctly and incorrectly classified tumors, respectively, actually fell under different risk categories. Such variation between BR grading and Oncotype DX implied a level of uncertainty in BR grading with respect to prognosis.

Table 10 summarizes a breakdown of mean BR grade and mean Oncotype DX recurrence score (RS) for all patients with low and high BR grades. Based on classification from Task 1, this Example demonstrates that BR grades remain consistent across correctly and incorrectly classified patient, while RS values showed greater variation.

TABLE 10

A breakdown of mean BR grade and mean Oncotype DX recurrence score (RS) for all patients with low and high BR grades

| Ground Truth | Classification Result | Mean Grade | Mean RS |
| --- | --- | --- | --- |
| Low grade | Collect | 4.6 | 14.6 |
|  | Incorrect | 4.7 | 16.6 |
| High grade | Correct | 8.1 | 33.5 |
|  | Incorrect | 8.2 | 29.9 |

EQUIVALENTS

While the described invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the described invention. All such modifications are intended to be within the scope of the claims appended hereto.

What is claimed:

1. A method for analyzing a large, heterogeneous image, using a boosted multi-field-of-view (FOV) framework, comprising:
(a) inputting, via a computing device, the large, heterogeneous image;
(b) generating, via the computing device, a plurality of field-of-views (FOVs) at a plurality of fixed FOV sizes, the method for generating the plurality of FOVs at a plurality of fixed FOV sizes comprising dividing simultaneously, via the computing device, the large, heterogeneous image into (i) a plurality of field-of-views (FOVs) at a first fixed FOV size from among the plurality of fixed FOV sizes; and (ii) a plurality of field-of-views (FOVs) at a second fixed FOV size from among the plurality of fixed FOV sizes;
(c) producing simultaneously for the large, heterogeneous image, via the computing device, a combined class decision for: (i) the plurality of FOVs at the first fixed FOV size, and (ii) the plurality of FOVs at the second fixed FOV size, by:
(1) detecting simultaneously, via the computing device, (i) at least one object to yield at least one detected object from each FOV at the first fixed FOV size, and (ii), at least one object to yield at least one detected object from each FOV at the second fixed FOV size;
(2) extracting simultaneously, via the computing device, (i) at least one image feature of the at least one detected object from each FOV at the first fixed FOV size, and (ii) at least one image feature of the at least one detected object from each FOV at the second fixed FOV size;
(3) training simultaneously, via the computing device, a classifier from: (i) the at least one image feature from each FOV of the plurality of FOVs at the first fixed FOV size, and (ii) the at least one image feature from each FOV for the plurality of FOVs at the second fixed FOV size;
(4) making simultaneously, via the computing device, using the classifier, (i) a first class prediction for each FOV of the plurality of FOVs at the first fixed FOV size based on the at least one image feature from each FOV of the plurality of FOVs at the first fixed FOV size, and (ii), a second class prediction for each FOV of the plurality of FOVs at the second fixed FOV size based on the at least one image feature from each FOV for the plurality of FOVs at the second fixed FOV size; and (5) producing simultaneously, via the computing device, (i) the combined class decision for the plurality of FOVs at the first fixed FOV size, and (ii) the combined class decision for the plurality of FOVs at the second fixed FOV size;

(d) repeating simultaneously, via the computing device, for each plurality of FOVs at the plurality of fixed FOV sizes to generate a plurality of combined class decisions, detecting step (1), extracting step (2), training step (3), making step (4), and producing step (5);

(e) aggregating, via the computing device, using a boosted multi-FOV classifier, the plurality of combined class decisions at each fixed FOV size of the plurality of fixed FOV sizes to yield an aggregated boosted multi-FOV decision, wherein the boosted, multi-field-of-view (multi-FOV) classifier finds optimal FOV sizes for aggregating the plurality of combined class decisions that are outputs of the ensembles at each of the plurality of fixed FOV sizes; and (f) producing, via the computing device, a consensus classification for the large, heterogeneous image, based on the aggregated multi-FOV decision.

2. The method according to claim 1, wherein the large, heterogeneous image is a microscopic image.

3. The method according to claim 1, wherein the large, heterogeneous image is a histopathologic image.

4. The method according to claim 1, wherein the large, heterogeneous image is a histopathologic image of a cancer.

5. The method according to claim 4, wherein the cancer is a breast cancer.

6. The method according to claim 1, wherein the at least one detected object is a nucleus.

7. The method according to claim 6, wherein the at least one detected object is a cancer nucleus.

8. The method according to claim 1, wherein the at least one image feature describes spatial arrangement of the at least one detected object.

9. The method according to claim 1, wherein the at least one image feature is nuclear architecture.

10. The method according to claim 1, wherein extracting step (2) further comprises:
(I) quantifying simultaneously, via the computing device, (i) the at least one image feature of the at least one detected object from each FOV at the first fixed FOV size to yield a quantifiable signature feature of the at least one detected object from each FOV at the first fixed FOV size, and (ii) the at least one image feature of the at least one detected object from each FOV at the second fixed FOV size to yield a quantifiable signature feature of the at least one detected object from each FOV at the second fixed FOV size;
(II) selecting, via the computing device, at least one reference feature in a dataset comprising reference features according to a minimum Redundancy Maximum Relevance (mRMR) feature selection scheme to identify a selected subset of reference features; and
(III) discriminating simultaneously, via the computing device, (i) the quantifiable signature feature from each FOV at the first fixed FOV size from the selected subset of reference features, and (ii) the quantifiable signature feature from each FOV at the second fixed FOV size from the selected subset of reference features;
wherein the at least one image feature is nuclear architecture.

11. The method according to claim 10, wherein quantifying step (1) of extracting step (2) comprises quantifying the at least one image feature using the at least one detected object as at least one vertex for the construction of a graph, wherein the graph is selected from the group consisting of a Voronoi Diagram (VD), a Delaunay Triangulation (DT) graph, a Minimum Spanning Tree (MST), a Nearest Neighbor (NN) graph, or a combination thereof.

12. The method according to claim 1, wherein the at least one image feature is nuclear texture.

13. The method according to claim 1, wherein extracting step (2) further comprises:
(I) segmenting simultaneously, via the computing device, (i) the at least one detected object from each FOV at the first fixed FOV size to yield at least one segmented object from each FOV at the first fixed FOV size, and (ii) the at least one detected object from each FOV at the second fixed FOV size to yield at least one segmented object from each FOV at the second fixed FOV size;
(II) quantifying simultaneously, via the computing device, (i) the at least one image feature of the at least one segmented object from each FOV at the first fixed FOV size to yield a quantifiable signature feature from each FOV at the first fixed FOV size, and (ii) the at least one image feature of at least one segmented object from each FOV at the second fixed FOV size to yield a quantifiable signature feature from each FOV at the second fixed FOV size;
(III) selecting, via the computing device, at least one reference feature in a dataset comprising reference features according to a minimum Redundancy Maximum Relevance (mRMR) feature selection scheme to identify a selected subset of reference features; and
(IV) discriminating simultaneously, via the computing device, (i) the quantifiable signature feature from each FOV at the first fixed FOV size from the selected subset of reference features, and (ii) the quantifiable signature feature from each FOV at the second fixed FOV size from the selected subset of reference features;
wherein the at least one image feature is nuclear texture.

14. The method according to claim 13, wherein segmenting step (1) of extracting step (2) comprises:
(A) initializing, via the computing device, a color gradient-based geodesic active contour (CGAC) model by simultaneously (i) using the stain color channel for the at least one detected object from each FOV at the first fixed FOV size to compute initial object boundaries, and (ii) using the stain color channel for the at least one detected object from each FOV at the second fixed FOV size to compute initial object boundaries; and
(B) computing simultaneously, via the computing device, (i) final object boundaries based on the initial object boundaries computed in step (A) by defining a mask surrounding the at least one detected object from each FOV at the first fixed FOV size to yield the at least one segmented object from each FOV at the first fixed FOV size, and (ii) final object boundaries based on the initial object boundaries computed in step (A) by defining a mask surrounding the at least one detected object from each FOV at the second fixed FOV size to yield the at least one segmented object from each FOV at the second fixed FOV size.

15. The method according to claim 1, wherein the consensus classification of the large, heterogeneous image is selected from the group consisting of a low Bloom-Richardson (BR) grade, an intermediate Bloom-Richardson (BR) grade, or a high Bloom-Richardson (BR) grade.

16. A system for analyzing a large, heterogeneous image, using a boosted multi-field-of-view (FOV) framework, comprising:
(a) a computing device configured to input the large, heterogeneous image;
(b) the computing device configured to generate a plurality of field-of-views (FOVs) at a plurality of fixed FOV sizes by dividing simultaneously the large, heterogeneous image into (i) a plurality of field-of-views (FOVs) at a first fixed FOV size from among the plurality of fixed FOV sizes; and (ii) a plurality of field-of-views (FOVs) at a second fixed FOV size from among the plurality of fixed FOV sizes;
(c) the computing device configured to produce a combined class decision simultaneously for: (i) the plurality of FOVs at the first fixed FOV size, and (ii) the plurality of FOVs at the second fixed FOV size, wherein the computing device is further configured:
  (1) to detect simultaneously (i) at least one object to yield at least one detected object from each FOV at the first fixed FOV size, and (ii), at least one object to yield at least one detected object from each FOV at the second fixed FOV size;
  (2) to extract simultaneously (i) at least one image feature of the at least one detected object from each FOV at the first fixed FOV size, and (ii) at least one image feature of the at least one detected object from each FOV at the second fixed FOV size;
  (3) to train a classifier capable of identifying simultaneously: (i) the at least one image feature from each FOV of the plurality of FOVs at the first fixed FOV size, and (ii) the at least one image feature from each FOV for the plurality of FOVs at the second fixed FOV size;
  (4) to make simultaneously, using the classifier, (i) a first class prediction for each FOV of the plurality of FOVs at the first fixed FOV size based on the at least one image feature from each FOV of the plurality of FOVs at the first fixed FOV size, and (ii), a second class prediction for each FOV of the plurality of FOVs at the second fixed FOV size based on the at least one image feature from each FOV for the plurality of FOVs at the second fixed FOV size; and
  (5) to produce simultaneously (i) the combined class decision for the plurality of FOVs at the first fixed FOV size, and (ii) the combined class decision for the plurality of FOVs at the second fixed FOV size;
(d) the computing device configured to generate a plurality of combined class decisions by repeating simultaneously, for each plurality of FOVs at the plurality of fixed FOV sizes, detecting step (1); extracting step (2), training step (3), making step (4) and producing step (5) in (c);
(e) the computing device configured to aggregate the plurality of combined class decisions at each fixed FOV size of the plurality of fixed FOV sizes to yield an aggregated boosted multi-FOV decision, using a boosted multi-FOV classifier, wherein the boosted multi-FOV classifier finds optimal FOV sizes for aggregating the plurality of combined class decisions that are outputs of the ensembles at each of the plurality of fixed FOV sizes; and
(f) the computing device configured to produce a consensus classification for the large heterogeneous image, based on the aggregated multi-FOV decision.

17. The system according to claim 16, wherein the large, heterogeneous image is a microscopic image.

18. The system according to claim 16, wherein the large, heterogeneous image is a histopathologic image.

19. The system according to claim 16, wherein the large, heterogeneous image is a histopathologic image of a cancer.

20. The system according to claim 19, wherein the cancer is a breast cancer.

21. The system according to claim 16, wherein the at least one detected object is a nucleus.

22. The system according to claim 21, wherein the at least one detected object is a cancer nucleus.

23. The system according to claim 16, wherein the at least one image feature describes spatial arrangement of the at least one detected object.

24. The system according to claim 16, wherein the at least one image feature is nuclear architecture.

25. The system according to claim 16, wherein the computing device (c) configured to produce a combined class decision, further configured (2) to extract simultaneously (i) at least one image feature of the at least one detected object from each FOV at the first fixed FOV size, and (ii) at least one image feature of the at least one detected object from each FOV at the second fixed FOV size is further configured:
  (I) to quantify simultaneously (i) the at least one image feature of the at least one detected object from each FOV at the first fixed FOV size to yield a quantifiable signature feature of the at least one detected object from each FOV at the first fixed FOV size, and (ii) the at least one image feature of the at least one detected object from each FOV at the second fixed FOV size to yield a quantifiable signature feature of the at least one detected object from each FOV at the second fixed FOV size;
  (II) to select at least one reference feature in a dataset comprising reference features according to a minimum Redundancy Maximum Relevance (mRMR) feature selection scheme to identify a selected subset of reference features; and
  (III) to discriminate simultaneously (i) the quantifiable signature feature from each FOV at the first fixed FOV size from the selected subset of reference features, and (ii) the quantifiable signature feature from each FOV at the second fixed FOV size from the selected subset of reference features;
wherein the at least one image feature is nuclear architecture.

26. The system according to claim 25, wherein the computing device (c) configured to produce a combined class decision, further configured (2) to extract simultaneously (i) at least one image feature of the at least one detected object from each FOV at the first fixed FOV size, and (ii) at least one image feature of the at least one detected object from each FOV at the second fixed FOV size and further configured (II) to quantify simultaneously (i) the at least one image feature of the at least one segmented object from each FOV at the first fixed FOV size to yield a quantifiable signature feature from each FOV at the first fixed FOV size, and (ii) the at least one image feature of at least one segmented object from each FOV at the second fixed FOV size to yield a quantifiable signature feature from each FOV at the second fixed FOV size, is further configured to quantify the at least one image feature using the at least one detected object as at least one vertex for the construction of a graph, wherein the graph is selected from the group consisting of a Voronoi Diagram (VD), a Delaunay Triangulation (DT) graph, a Minimum Spanning Tree (MST), a Nearest Neighbor (NN) graph, or a combination thereof, wherein the at least one image feature is nuclear architecture.

27. The system according to claim 16, wherein the at least one image feature is nuclear texture.

28. The system according to claim 16, wherein the computing device (c) configured to produce a combined class decision, and further configured (2) to extract simultaneously (i) at least one image feature of the at least one detected object from each FOV at the first fixed FOV size, and (ii) at least one image feature of the at least one detected object from each FOV at the second fixed FOV size is further configured:
- (I) to segment simultaneously (i) the at least one detected object from each FOV at the first fixed FOV size to yield at least one segmented object from each FOV at the first fixed FOV size, and (ii) the at least one detected object from each FOV at the second fixed FOV size to yield at least one segmented object from each FOV at the second fixed FOV size;
- (II) to quantify simultaneously (i) the at least one image feature of the at least one segmented object from each FOV at the first fixed FOV size to yield a quantifiable signature feature from each FOV at the first fixed FOV size, and (ii) the at least one image feature of at least one segmented object from each FOV at the second fixed FOV size to yield a quantifiable signature feature from each FOV at the second fixed FOV size;
- (III) to select at least one reference feature in a dataset comprising reference features according to a minimum Redundancy Maximum Relevance (mRMR) feature selection scheme to identify a selected subset of reference features; and
- (IV) to discriminate simultaneously (i) the quantifiable signature feature from each FOV at the first fixed FOV size from the selected subset of reference features, and (ii) the quantifiable signature feature from each FOV at the second fixed FOV size from the selected subset of reference features;

wherein the at least one image feature is nuclear texture.

29. The system according to claim 28, wherein the computing device (c) configured to produce a combined class decision, further configured (2) to extract simultaneously (i) at least one image feature of the at least one detected object from each FOV at the first fixed FOV size, and (ii) at least one image feature of the at least one detected object from each FOV at the second fixed FOV size and further configured (I) to segment simultaneously (i) the at least one detected object from each FOV at the first fixed FOV size to yield at least one segmented object from each FOV at the first fixed FOV size, and (ii) the at least one detected object from each FOV at the second fixed FOV size to yield at least one segmented object from each FOV at the second fixed FOV size; is further configured:
- (A) to initialize a color gradient-based geodesic active contour (CGAC) model by simultaneously (i) using the stain color channel for the at least one detected object from each FOV at the first fixed FOV size to compute initial object boundaries, and (ii) using the stain color channel for the at least one detected object from each FOV at the second fixed FOV size to compute initial object boundaries; and
- (B) to compute simultaneously (i) final object boundaries based on the initial object boundaries computed in step (A) by defining a mask surrounding the at least one detected object from each FOV at the first fixed FOV size to yield the at least one segmented object from each FOV at the first fixed FOV size, and (ii) final object boundaries based on the initial object boundaries computed in step (A) by defining a mask surrounding the at least one detected object from each FOV at the second fixed FOV size to yield the at least one segmented object from each FOV at the second fixed FOV size.

30. The system according to claim 16, wherein (c) the computing device configured to produce a combined class decision simultaneously for: (i) the plurality of FOVs at the first fixed FOV size, and (ii) the plurality of FOVs at the second fixed FOV size, further configured (5) to assign simultaneously, using a second Boosted classifier, (i) a weight to each FOV of the plurality of FOVs at the first fixed FOV size based on the first class prediction for each FOV of the plurality of FOVs at the first fixed FOV size, and (ii) a weight to each FOV of the plurality of FOVs at the second fixed FOV size based on the second class prediction for each FOV of the plurality of FOVs at the second fixed FOV size; is further configured to apply simultaneously (i) the weight to each FOV of the plurality of FOVs at the first fixed FOV size based on relative importance of each FOV of the plurality of FOVs at the first fixed FOV size in discriminating between at least two image classes, and (ii), the weight to each FOV of the plurality of FOVs at the second fixed FOV size based on relative importance of each FOV of the plurality of FOVs at the second fixed FOV size, in discriminating between at least two image classes.

31. The system according to claim 16, wherein the consensus classification of the large, heterogeneous image is selected from the group consisting of a low Bloom-Richardson (BR) grade, an intermediate Bloom-Richardson (BR) grade, and a high Bloom-Richardson (BR) grade.

* * * * *